United States Patent
Stern et al.

(10) Patent No.: US 6,267,294 B1
(45) Date of Patent: Jul. 31, 2001

(54) METHOD OF OPERATING A CHARGE COUPLED DEVICE IN AN ACCELERATED MODE, AND IN CONJUNCTION WITH AN OPTICAL SYMBOLOGY IMAGER

(75) Inventors: Howard Stern, Greenlawn, NY (US); John H. Dowling, Nashua, NH (US)

(73) Assignee: Robotic Vision Systems Inc., Canton, MA (US)

( * ) Notice: Subject to any disclaimer, the term of this patent is extended or adjusted under 35 U.S.C. 154(b) by 0 days.

(21) Appl. No.: 09/151,767

(22) Filed: Sep. 11, 1998

(51) Int. Cl.[7] .................................................. G06K 7/10
(52) U.S. Cl. ......................................... 235/462.41; 348/314
(58) Field of Search ........................... 235/462.24, 462.41, 235/454, 462.11; 348/311, 312, 314, 317, 319

(56) References Cited

U.S. PATENT DOCUMENTS

| | | | |
|---|---|---|---|
| 5,157,775 | * 10/1992 | Sanger | 364/239.1 |
| 5,196,939 | * 3/1993 | Clabd et al. | 358/231.11 |
| 5,296,690 | * 3/1994 | Chandler et al. | 235/462.1 |
| 5,541,654 | * 7/1996 | Roberts | 348/301 |
| 5,563,431 | * 10/1996 | Ohmni et al. | 257/291 |
| 5,668,631 | * 9/1997 | Norita et al. | 356/376 |
| 5,777,314 | * 7/1998 | Roustaei | 235/462.45 |
| 5,777,671 | * 7/1998 | Maki et al. | 348/312 |
| 5,815,608 | * 9/1998 | Lange et al. | 382/312 |
| 5,992,751 | * 11/1999 | Laser | 235/472.01 |

FOREIGN PATENT DOCUMENTS

| | | | |
|---|---|---|---|
| 0-082616 | * | 6/1983 | (EP) . |
| 547697 A2 | * | 6/1993 | (EP) . |
| 40-7162618 | * | 6/1995 | (JP) . |
| 40-8009269 | * | 1/1996 | (JP) . |
| 97/09673 | * | 3/1997 | (WO) . |

\* cited by examiner

Primary Examiner—Michael G. Lee
Assistant Examiner—Diane I. Lee
(74) Attorney, Agent, or Firm—Hoffman, Wasson & Gitler; Morris I. Pollack

(57) ABSTRACT

A method of operating a charge coupled device in an accelerated mode is provided, and in particular in connection with an optical symbology imager, so as to minimize variations in the position of the imager relative to the code. The CCD has two horizontal shift registers, each receiving every other scan line so that the output of each horizontal shift register equals the number of scan lines for normal television signals 262. The method skips through multiple lines of image data, then provides a black reference signal then images a series of lines at a slower speed, these lines being the lines of interest for focusing and illumination operations in the optical symbology imager. Finally, the remaining lines are passed through quickly. The imager goes back into reset mode after either normal or fast mode operation, and is thereby immediately ready to perform another scan. The fast mode operation enables the imager to obtain the approximately ten lines of image data of concern in only approximately 5.5 milliseconds, a significant time savings. This operation can be performed for some or all of the multiple optical positions.

21 Claims, 89 Drawing Sheets

DATA MATRIX
(MATRIX CODE)

P1 image

P7 image

P8 image

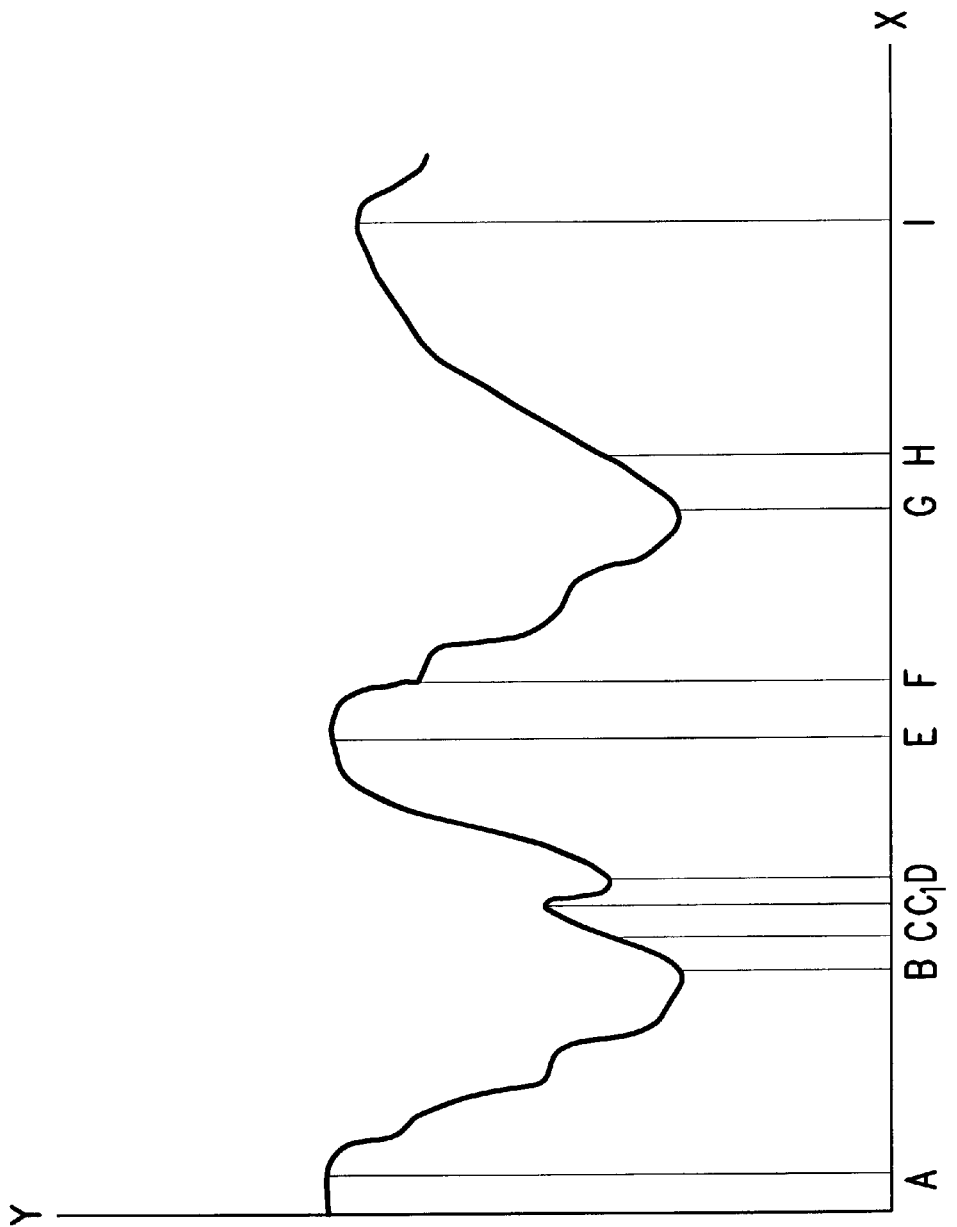

| Location | Confidential P_1 | P_6 | P_11 |
|---|---|---|---|
| 128 | 53 | 148 | 242 |
| 129 | 49 | 147 | 242 |
| 130 | 50 | 149 | 241 |
| 131 | 48 | 149 | 243 |
| 132 | 49 | 145 | 241 |
| 133 | 48 | 148 | 241 |
| 134 | 53 | 149 | 241 |
| 135 | 50 | 149 | 241 |
| 136 | 50 | 145 | 240 |
| 137 | 48 | 148 | 242 |
| 138 | 54 | 148 | 240 |
| 139 | 50 | 147 | 241 |
| 140 | 51 | 146 | 240 |
| 141 | 46 | 147 | 240 |
| 142 | 51 | 146 | 240 |
| 143 | 52 | 150 | 241 |
| 144 | 50 | 151 | 240 |
| 145 | 50 | 149 | 242 |
| 146 | 51 | 145 | 240 |
| 147 | 51 | 147 | 242 |
| 148 | 49 | 147 | 240 |
| 149 | 49 | 146 | 240 |
| 150 | 51 | 145 | 241 |
| 151 | 51 | 149 | 239 |
| 152 | 47 | 149 | 239 |
| 153 | 46 | 148 | 238 |
| 154 | 50 | 143 | 237 |
| 155 | 47 | 146 | 239 |
| 156 | 51 | 144 | 237 |
| 157 | 50 | 144 | 237 |
| 158 | 49 | 144 | 237 |
| 159 | 50 | 146 | 235 |
| 160 | 49 | 142 | 235 |
| 161 | 49 | 143 | 236 |
| 162 | 51 | 144 | 235 |
| 163 | 46 | 151 | 237 |

FIG.8A

Confidential

| Location | P_1 | P_6 | P_11 |
|---|---|---|---|
| 164 | 49 | 150 | 234 |
| 165 | 48 | 144 | 238 |
| 166 | 52 | 149 | 234 |
| 167 | 48 | 148 | 235 |
| 168 | 49 | 145 | 234 |
| 169 | 52 | 144 | 236 |
| 170 | 47 | 142 | 234 |
| 171 | 45 | 148 | 234 |
| 172 | 49 | 146 | 230 |
| 173 | 50 | 144 | 234 |
| 174 | 51 | 147 | 233 |
| 175 | 47 | 140 | 233 |
| 176 | 45 | 145 | 233 |
| 177 | 47 | 141 | 233 |
| 178 | 47 | 142 | 231 |
| 179 | 46 | 139 | 231 |
| 180 | 48 | 140 | 229 |
| 181 | 49 | 140 | 230 |
| 182 | 47 | 140 | 233 |
| 183 | 46 | 137 | 231 |
| 184 | 49 | 141 | 230 |
| 185 | 51 | 141 | 229 |
| 186 | 49 | 141 | 233 |
| 187 | 51 | 143 | 230 |
| 188 | 49 | 142 | 228 |
| 189 | 46 | 142 | 231 |
| 190 | 47 | 138 | 228 |
| 191 | 48 | 139 | 228 |
| 192 | 48 | 138 | 226 |
| 193 | 45 | 138 | 229 |
| 194 | 48 | 141 | 229 |
| 195 | 46 | 141 | 231 |
| 196 | 48 | 141 | 230 |
| 197 | 46 | 141 | 231 |
| 198 | 48 | 142 | 231 |
| 199 | 44 | 139 | 230 |
| 200 | 47 | 140 | 229 |

FIG.8B

| Location | Confidential P_1 | P_6 | P_11 |
|---|---|---|---|
| 201 | 46 | 138 | 227 |
| 202 | 44 | 136 | 227 |
| 203 | 45 | 139 | 225 |
| 204 | 47 | 138 | 224 |
| 205 | 43 | 136 | 223 |
| 206 | 46 | 136 | 221 |
| 207 | 43 | 134 | 218 |
| 208 | 44 | 137 | 218 |
| 209 | 45 | 141 | 215 |
| 210 | 47 | 138 | 214 |
| 211 | 44 | 140 | 211 |
| 212 | 47 | 138 | 207 |
| 213 | 44 | 136 | 204 |
| 214 | 45 | 137 | 200 |
| 215 | 46 | 140 | 199 |
| 216 | 48 | 140 | 196 |
| 217 | 47 | 140 | 188 |
| 218 | 48 | 135 | 182 |
| 219 | 43 | 133 | 179 |
| 220 | 45 | 134 | 171 |
| 221 | 43 | 135 | 170 |
| 222 | 42 | 136 | 163 |
| 223 | 43 | 131 | 162 |
| 224 | 43 | 134 | 154 |
| 225 | 40 | 134 | 149 |
| 226 | 42 | 128 | 146 |
| 227 | 37 | 122 | 145 |
| 228 | 39 | 115 | 139 |
| 229 | 37 | 109 | 137 |
| 230 | 35 | 97 | 128 |
| 231 | 24 | 92 | 124 |
| 232 | 24 | 82 | 120 |
| 233 | 20 | 72 | 115 |
| 234 | 22 | 60 | 110 |
| 235 | 22 | 55 | 106 |
| 236 | 21 | 44 | 102 |
| 237 | 17 | 41 | 100 |

FIG.8C

Confidential

| Location | P_1 | P_6 | P_11 |
|---|---|---|---|
| 238 | 16 | 39 | 93 |
| 239 | 15 | 36 | 87 |
| 240 | 16 | 34 | 82 |
| 241 | 15 | 37 | 81 |
| 242 | 16 | 34 | 78 |
| 243 | 18 | 37 | 76 |
| 244 | 18 | 35 | 72 |
| 245 | 17 | 37 | 72 |
| 246 | 17 | 34 | 70 |
| 247 | 16 | 34 | 69 |
| 248 | 17 | 34 | 70 |
| 249 | 17 | 36 | 68 |
| 250 | 17 | 37 | 70 |
| 251 | 18 | 36 | 71 |
| 252 | 19 | 36 | 72 |
| 253 | 20 | 37 | 73 |
| 254 | 19 | 37 | 76 |
| 255 | 19 | 43 | 78 |
| 256 | 23 | 47 | 80 |
| 257 | 22 | 51 | 83 |
| 258 | 25 | 56 | 84 |
| 259 | 27 | 62 | 88 |
| 260 | 29 | 66 | 90 |
| 261 | 30 | 75 | 92 |
| 262 | 31 | 80 | 92 |
| 263 | 33 | 87 | 96 |
| 264 | 35 | 90 | 96 |
| 265 | 32 | 91 | 95 |
| 266 | 34 | 92 | 98 |
| 267 | 35 | 101 | 95 |
| 268 | 37 | 102 | 96 |
| 269 | 36 | 101 | 96 |
| 270 | 37 | 104 | 96 |
| 271 | 36 | 108 | 98 |
| 272 | 38 | 108 | 100 |
| 273 | 40 | 111 | 101 |
| 274 | 37 | 113 | 98 |

FIG.8D

Confidential

| Location | P_1 | P_6 | P_11 |
|---|---|---|---|
| 275 | 34 | 116 | 101 |
| 276 | 38 | 115 | 101 |
| 277 | 35 | 117 | 101 |
| 278 | 36 | 113 | 101 |
| 279 | 34 | 112 | 101 |
| 280 | 37 | 106 | 97 |
| 281 | 33 | 103 | 94 |
| 282 | 36 | 98 | 96 |
| 283 | 36 | 98 | 95 |
| 284 | 37 | 96 | 90 |
| 285 | 34 | 95 | 89 |
| 286 | 33 | 92 | 86 |
| 287 | 32 | 97 | 86 |
| 288 | 34 | 89 | 82 |
| 289 | 34 | 91 | 81 |
| 290 | 36 | 89 | 76 |
| 291 | 32 | 86 | 75 |
| 292 | 35 | 88 | 70 |
| 293 | 32 | 87 | 69 |
| 294 | 35 | 88 | 69 |
| 295 | 31 | 87 | 71 |
| 296 | 33 | 88 | 68 |
| 297 | 31 | 87 | 70 |
| 298 | 30 | 82 | 69 |
| 299 | 28 | 76 | 70 |
| 300 | 28 | 70 | 68 |
| 301 | 27 | 67 | 69 |
| 302 | 23 | 62 | 70 |
| 303 | 20 | 59 | 71 |
| 304 | 20 | 52 | 72 |
| 305 | 18 | 48 | 75 |
| 306 | 18 | 39 | 74 |
| 307 | 16 | 37 | 77 |
| 308 | 15 | 34 | 78 |
| 309 | 16 | 35 | 82 |
| 310 | 15 | 30 | 82 |
| 311 | 14 | 33 | 87 |

FIG.8E

Confidential

| Location | P_1 | P_6 | P_11 |
|---|---|---|---|
| 312 | 15 | 29 | 91 |
| 313 | 14 | 30 | 94 |
| 314 | 14 | 32 | 95 |
| 315 | 16 | 32 | 101 |
| 316 | 15 | 32 | 102 |
| 317 | 16 | 35 | 106 |
| 318 | 16 | 32 | 109 |
| 319 | 16 | 33 | 114 |
| 320 | 17 | 35 | 116 |
| 321 | 16 | 37 | 118 |
| 322 | 17 | 34 | 119 |
| 323 | 15 | 36 | 124 |
| 324 | 16 | 40 | 128 |
| 325 | 18 | 42 | 133 |
| 326 | 22 | 46 | 136 |
| 327 | 22 | 53 | 137 |
| 328 | 25 | 60 | 138 |
| 329 | 32 | 67 | 139 |
| 330 | 35 | 69 | 139 |
| 331 | 33 | 78 | 142 |
| 332 | 34 | 85 | 138 |
| 333 | 37 | 92 | 137 |
| 334 | 40 | 97 | 138 |
| 335 | 38 | 103 | 136 |
| 336 | 37 | 107 | 135 |
| 337 | 37 | 109 | 134 |
| 338 | 41 | 106 | 133 |
| 339 | 42 | 107 | 131 |
| 340 | 39 | 112 | 133 |
| 341 | 36 | 116 | 133 |
| 342 | 39 | 114 | 130 |
| 343 | 37 | 122 | 128 |
| 344 | 39 | 124 | 126 |
| 345 | 38 | 123 | 125 |
| 346 | 39 | 119 | 122 |
| 347 | 40 | 122 | 119 |
| 348 | 43 | 122 | 119 |

FIG.8F

Confidential

| Location | P_1 | P_6 | P_11 |
|---|---|---|---|
| 349 | 40 | 121 | 119 |
| 350 | 42 | 120 | 119 |
| 351 | 38 | 125 | 117 |
| 352 | 39 | 122 | 117 |
| 353 | 36 | 121 | 116 |
| 354 | 36 | 117 | 112 |
| 355 | 36 | 118 | 112 |
| 356 | 37 | 116 | 110 |
| 357 | 35 | 111 | 105 |
| 358 | 35 | 105 | 105 |
| 359 | 33 | 97 | 103 |
| 360 | 31 | 90 | 102 |
| 361 | 22 | 84 | 100 |
| 362 | 22 | 76 | 102 |
| 363 | 16 | 68 | 99 |
| 364 | 19 | 55 | 96 |
| 365 | 17 | 48 | 98 |
| 366 | 17 | 44 | 96 |
| 367 | 18 | 41 | 99 |
| 368 | 22 | 40 | 103 |
| 369 | 16 | 40 | 105 |
| 370 | 19 | 39 | 106 |
| 371 | 16 | 41 | 110 |
| 372 | 18 | 43 | 113 |
| 373 | 20 | 49 | 116 |
| 374 | 22 | 54 | 119 |
| 375 | 22 | 59 | 119 |
| 376 | 27 | 63 | 116 |
| 377 | 30 | 68 | 120 |
| 378 | 31 | 71 | 115 |
| 379 | 32 | 79 | 118 |
| 380 | 31 | 81 | 114 |
| 381 | 30 | 77 | 116 |
| 382 | 28 | 74 | 115 |
| 383 | 28 | 73 | 118 |
| 384 | 25 | 68 | 114 |

FIG.8G

Confidential

| Location | P_1 | P_6 | P_11 |
|---|---|---|---|
| 385 | 20 | 67 | 113 |
| 386 | 19 | 58 | 110 |
| 387 | 18 | 51 | 110 |
| 388 | 18 | 44 | 108 |
| 389 | 18 | 45 | 109 |
| 390 | 18 | 39 | 107 |
| 391 | 16 | 39 | 113 |
| 392 | 21 | 38 | 112 |
| 393 | 18 | 40 | 117 |
| 394 | 19 | 40 | 116 |
| 395 | 18 | 46 | 121 |
| 396 | 23 | 52 | 126 |
| 397 | 22 | 58 | 131 |
| 398 | 25 | 64 | 130 |
| 399 | 27 | 74 | 136 |
| 400 | 33 | 78 | 136 |
| 401 | 34 | 91 | 139 |
| 402 | 35 | 94 | 144 |
| 403 | 35 | 102 | 149 |
| 404 | 39 | 109 | 152 |
| 405 | 36 | 105 | 155 |
| 406 | 32 | 100 | 158 |
| 407 | 28 | 93 | 162 |
| 408 | 25 | 86 | 160 |
| 409 | 22 | 79 | 167 |
| 410 | 22 | 66 | 168 |
| 411 | 22 | 57 | 173 |
| 412 | 21 | 49 | 174 |
| 413 | 18 | 46 | 178 |
| 414 | 21 | 44 | 180 |
| 415 | 20 | 46 | 185 |
| 416 | 19 | 46 | 186 |
| 417 | 22 | 46 | 187 |
| 418 | 23 | 50 | 192 |
| 419 | 24 | 54 | 197 |
| 420 | 29 | 62 | 200 |

FIG.8H

Confidential

| Location | P_1 | P_6 | P_11 |
|---|---|---|---|
| 421 | 26 | 72 | 205 |
| 422 | 31 | 79 | 207 |
| 423 | 34 | 87 | 207 |
| 424 | 39 | 101 | 212 |
| 425 | 40 | 111 | 214 |
| 426 | 43 | 118 | 217 |
| 427 | 44 | 125 | 219 |
| 428 | 44 | 131 | 221 |
| 429 | 45 | 134 | 222 |
| 430 | 47 | 139 | 221 |
| 431 | 44 | 139 | 223 |
| 432 | 47 | 136 | 224 |
| 433 | 44 | 139 | 225 |
| 434 | 47 | 141 | 226 |
| 435 | 46 | 141 | 228 |
| 436 | 48 | 139 | 228 |
| 437 | 48 | 143 | 228 |
| 438 | 50 | 142 | 229 |
| 439 | 44 | 143 | 228 |
| 440 | 49 | 140 | 225 |
| 441 | 47 | 141 | 229 |
| 442 | 51 | 145 | 227 |
| 443 | 48 | 141 | 225 |
| 444 | 46 | 140 | 224 |
| 445 | 47 | 145 | 228 |
| 446 | 52 | 143 | 226 |
| 447 | 47 | 147 | 228 |
| 448 | 47 | 146 | 226 |
| 449 | 46 | 144 | 228 |
| 450 | 48 | 148 | 229 |
| 451 | 48 | 147 | 227 |
| 452 | 50 | 144 | 226 |
| 453 | 50 | 143 | 229 |
| 454 | 49 | 143 | 223 |
| 455 | 47 | 145 | 226 |
| 456 | 49 | 144 | 226 |
| 457 | 46 | 141 | 229 |

FIG. 81

Confidential

| Location | P_1 | P_6 | P_11 |
|---|---|---|---|
| 458 | 45 | 141 | 226 |
| 459 | 46 | 141 | 228 |
| 460 | 48 | 143 | 226 |
| 461 | 47 | 143 | 229 |
| 462 | 49 | 140 | 226 |
| 463 | 48 | 144 | 226 |
| 464 | 47 | 143 | 225 |
| 465 | 47 | 143 | 228 |
| 466 | 46 | 143 | 225 |
| 467 | 45 | 142 | 223 |
| 468 | 45 | 144 | 224 |
| 469 | 45 | 145 | 227 |
| 470 | 45 | 142 | 228 |
| 471 | 46 | 145 | 228 |
| 472 | 49 | 142 | 226 |
| 473 | 48 | 144 | 228 |
| 474 | 48 | 144 | 229 |
| 475 | 50 | 146 | 229 |
| 476 | 51 | 140 | 228 |
| 477 | 48 | 142 | 230 |
| 478 | 43 | 142 | 228 |
| 479 | 46 | 139 | 228 |
| 480 | 47 | 141 | 226 |
| 481 | 46 | 144 | 227 |
| 482 | 51 | 146 | 226 |
| 483 | 49 | 142 | 228 |
| 484 | 50 | 141 | 229 |
| 485 | 48 | 142 | 225 |
| 486 | 50 | 140 | 224 |
| 487 | 52 | 140 | 224 |
| 488 | 51 | 137 | 224 |
| 489 | 48 | 139 | 227 |
| 490 | 50 | 142 | 225 |
| 491 | 45 | 145 | 224 |
| 492 | 47 | 146 | 225 |
| 493 | 46 | 141 | 227 |

FIG.8J

Confidential

| Location | P_1 | P_6 | P_11 |
|---|---|---|---|
| 494 | 45 | 137 | 225 |
| 495 | 44 | 137 | 227 |
| 496 | 44 | 143 | 223 |
| 497 | 47 | 139 | 227 |
| 498 | 48 | 137 | 227 |
| 499 | 41 | 138 | 226 |
| 500 | 46 | 137 | 227 |
| 501 | 49 | 140 | 227 |
| 502 | 48 | 138 | 226 |
| 503 | 52 | 139 | 227 |
| 504 | 49 | 140 | 227 |
| 505 | 48 | 144 | 226 |
| 506 | 51 | 145 | 228 |
| 507 | 48 | 144 | 229 |
| 508 | 51 | 146 | 228 |
| 509 | 49 | 149 | 229 |
| 510 | 51 | 148 | 228 |
| 511 | 53 | 147 | 227 |

FIG.8K

Confidential

| Delta pk. | P_1 | P_2 | P_3 | P_4 | P_5 | P_6 |
|---|---|---|---|---|---|---|
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 14 | 10 | 7 | 12 | 10 | 11 |
| 13 | 17 | 10 | 3 | 9 | 4 | 10 |
| 14 | 21 | 17 | 8 | 10 | 10 | 9 |
| 15 | 21 | 10 | 9 | 7 | 9 | 7 |
| 16 | 22 | 20 | 8 | 9 | 7 | 9 |
| 17 | 33 | 20 | 12 | 7 | 10 | 6 |
| 18 | 29 | 14 | 9 | 8 | 10 | 4 |
| 19 | 42 | 18 | 3 | 5 | 9 | 5 |
| 20 | 34 | 19 | 15 | 7 | 5 | 10 |
| 21 | 49 | 19 | 13 | 7 | 7 | 6 |
| 22 | 51 | 17 | 16 | 13 | 9 | 8 |
| 23 | 46 | 18 | 9 | 6 | 8 | 5 |
| 24 | 57 | 26 | 16 | 11 | 6 | 5 |
| 25 | 32 | 13 | 12 | 10 | 7 | 3 |
| 26 | 43 | 24 | 18 | 9 | 6 | 5 |
| 27 | 21 | 14 | 10 | 9 | 5 | 8 |
| 28 | 16 | 31 | 11 | 9 | 8 | 8 |
| 29 | 13 | 25 | 9 | 7 | 9 | 6 |
| 30 | 9 | 40 | 12 | 11 | 6 | 4 |
| 31 | 9 | 41 | 7 | 9 | 6 | 9 |
| 32 | 9 | 34 | 15 | 10 | 9 | 7 |
| 33 | 19 | 22 | 12 | 12 | 7 | 5 |
| 34 | 36 | 34 | 12 | 14 | 5 | 8 |
| 35 | 29 | 26 | 9 | 10 | 8 | 5 |
| 36 | 41 | 27 | 18 | 7 | 8 | 5 |

FIG.10A

Confidential

| Delta pk. | P_1 | P_2 | P_3 | P_4 | P_5 | P_6 |
|---|---|---|---|---|---|---|
| 37 | 20 | 19 | 10 | 10 | 9 | 1 |
| 38 | 17 | 20 | 18 | 7 | 4 | 5 |
| 39 | 6 | 8 | 23 | 11 | 11 | 6 |
| 40 | 1 | 8 | 26 | 16 | 8 | 7 |
| 41 | 1 | 7 | 24 | 15 | 10 | 8 |
| 42 | 0 | 10 | 37 | 13 | 8 | 7 |
| 43 | 0 | 8 | 30 | 8 | 6 | 6 |
| 44 | 0 | 10 | 31 | 8 | 4 | 7 |
| 45 | 0 | 7 | 21 | 11 | 8 | 6 |
| 46 | 0 | 14 | 20 | 17 | 11 | 5 |
| 47 | 0 | 14 | 12 | 13 | 10 | 4 |
| 48 | 0 | 26 | 26 | 13 | 9 | 6 |
| 49 | 0 | 18 | 16 | 20 | 11 | 5 |
| 50 | 0 | 22 | 23 | 16 | 13 | 5 |
| 51 | 0 | 16 | 20 | 18 | 10 | 7 |
| 52 | 0 | 8 | 10 | 31 | 2 | 6 |
| 53 | 0 | 5 | 10 | 36 | 9 | 4 |
| 54 | 0 | 6 | 8 | 32 | 13 | 14 |
| 55 | 0 | 1 | 8 | 18 | 7 | 8 |
| 56 | 0 | 0 | 3 | 16 | 8 | 11 |
| 57 | 0 | 0 | 6 | 11 | 16 | 6 |
| 58 | 0 | 0 | 11 | 15 | 15 | 6 |
| 59 | 0 | 0 | 8 | 11 | 15 | 10 |
| 60 | 0 | 0 | 3 | 18 | 13 | 9 |
| 61 | 0 | 0 | 5 | 29 | 12 | 4 |
| 62 | 0 | 0 | 9 | 22 | 11 | 16 |
| 63 | 0 | 0 | 5 | 12 | 14 | 10 |
| 64 | 0 | 0 | 11 | 16 | 23 | 14 |
| 65 | 0 | 0 | 13 | 5 | 11 | 12 |
| 66 | 0 | 0 | 22 | 13 | 26 | 8 |
| 67 | 0 | 0 | 16 | 5 | 16 | 8 |
| 68 | 0 | 0 | 20 | 4 | 17 | 9 |
| 69 | 0 | 0 | 11 | 6 | 18 | 11 |
| 70 | 0 | 0 | 13 | 8 | 20 | 13 |
| 71 | 0 | 0 | 2 | 4 | 12 | 14 |
| 72 | 0 | 0 | 2 | 2 | 18 | 8 |
| 73 | 0 | 0 | 0 | 4 | 10 | 12 |

FIG.10B

Confidential

| Delta pk. | P_1 | P_2 | P_3 | P_4 | P_5 | P_6 |
|---|---|---|---|---|---|---|
| 74 | 0 | 0 | 0 | 3 | 13 | 16 |
| 75 | 0 | 0 | 0 | 7 | 13 | 14 |
| 76 | 0 | 0 | 0 | 6 | 17 | 21 |
| 77 | 0 | 0 | 0 | 9 | 21 | 13 |
| 78 | 0 | 0 | 0 | 18 | 17 | 20 |
| 79 | 0 | 0 | 0 | 11 | 17 | 14 |
| 80 | 0 | 0 | 0 | 26 | 10 | 13 |
| 81 | 0 | 0 | 0 | 10 | 11 | 25 |
| 82 | 0 | 0 | 0 | 8 | 5 | 14 |
| 83 | 0 | 0 | 0 | 8 | 4 | 4 |
| 84 | 0 | 0 | 0 | 3 | 4 | 12 |
| 85 | 0 | 0 | 0 | 1 | 3 | 8 |
| 86 | 0 | 0 | 0 | 0 | 2 | 6 |
| 87 | 0 | 0 | 0 | 0 | 4 | 10 |
| 88 | 0 | 0 | 0 | 0 | 5 | 7 |
| 89 | 0 | 0 | 0 | 0 | 4 | 11 |
| 90 | 0 | 0 | 0 | 0 | 0 | 20 |
| 91 | 0 | 0 | 0 | 0 | 1 | 18 |
| 92 | 0 | 0 | 0 | 0 | 6 | 21 |
| 93 | 0 | 0 | 0 | 0 | 13 | 16 |
| 94 | 0 | 0 | 0 | 0 | 10 | 13 |
| 95 | 0 | 0 | 0 | 0 | 12 | 4 |
| 96 | 0 | 0 | 0 | 0 | 12 | 5 |
| 97 | 0 | 0 | 0 | 0 | 12 | 2 |
| 98 | 0 | 0 | 0 | 0 | 11 | 2 |
| 99 | 0 | 0 | 0 | 0 | 13 | 4 |
| 100 | 0 | 0 | 0 | 0 | 8 | 3 |
| 101 | 0 | 0 | 0 | 0 | 2 | 2 |
| 102 | 0 | 0 | 0 | 0 | 3 | 3 |
| 103 | 0 | 0 | 0 | 0 | 1 | 1 |
| 104 | 0 | 0 | 0 | 0 | 0 | 3 |
| 105 | 0 | 0 | 0 | 0 | 0 | 3 |
| 106 | 0 | 0 | 0 | 0 | 0 | 5 |
| 107 | 0 | 0 | 0 | 0 | 0 | 1 |
| 108 | 0 | 0 | 0 | 0 | 0 | 4 |
| 109 | 0 | 0 | 0 | 0 | 0 | 6 |
| 110 | 0 | 0 | 0 | 0 | 0 | 11 |

FIG.10C

Confidential

| Delta pk. | P_1 | P_2 | P_3 | P_4 | P_5 | P_6 |
|---|---|---|---|---|---|---|
| 111 | 0 | 0 | 0 | 0 | 0 | 9 |
| 112 | 0 | 0 | 0 | 0 | 0 | 18 |
| 113 | 0 | 0 | 0 | 0 | 0 | 14 |
| 114 | 0 | 0 | 0 | 0 | 0 | 13 |
| 115 | 0 | 0 | 0 | 0 | 0 | 9 |
| 116 | 0 | 0 | 0 | 0 | 0 | 8 |
| 117 | 0 | 0 | 0 | 0 | 0 | 1 |
| 118 | 0 | 0 | 0 | 0 | 0 | 1 |
| 119 | 0 | 0 | 0 | 0 | 0 | 0 |
| 120 | 0 | 0 | 0 | 0 | 0 | 0 |
| 121 | 0 | 0 | 0 | 0 | 0 | 0 |
| 122 | 0 | 0 | 0 | 0 | 0 | 0 |
| 123 | 0 | 0 | 0 | 0 | 0 | 0 |
| 124 | 0 | 0 | 0 | 0 | 0 | 0 |
| 125 | 0 | 0 | 0 | 0 | 0 | 0 |
| 126 | 0 | 0 | 0 | 0 | 0 | 0 |
| 127 | 0 | 0 | 0 | 0 | 0 | 0 |
| 128 | 0 | 0 | 0 | 0 | 0 | 0 |
| 129 | 0 | 0 | 0 | 0 | 0 | 0 |
| 130 | 0 | 0 | 0 | 0 | 0 | 0 |
| 131 | 0 | 0 | 0 | 0 | 0 | 0 |
| 132 | 0 | 0 | 0 | 0 | 0 | 0 |
| 133 | 0 | 0 | 0 | 0 | 0 | 0 |
| 134 | 0 | 0 | 0 | 0 | 0 | 0 |
| 135 | 0 | 0 | 0 | 0 | 0 | 0 |
| 136 | 0 | 0 | 0 | 0 | 0 | 0 |
| 137 | 0 | 0 | 0 | 0 | 0 | 0 |
| 138 | 0 | 0 | 0 | 0 | 0 | 0 |
| 139 | 0 | 0 | 0 | 0 | 0 | 0 |
| 140 | 0 | 0 | 0 | 0 | 0 | 0 |
| 141 | 0 | 0 | 0 | 0 | 0 | 0 |
| 142 | 0 | 0 | 0 | 0 | 0 | 0 |
| 143 | 0 | 0 | 0 | 0 | 0 | 0 |
| 144 | 0 | 0 | 0 | 0 | 0 | 0 |
| 145 | 0 | 0 | 0 | 0 | 0 | 0 |
| 146 | 0 | 0 | 0 | 0 | 0 | 0 |

FIG.10D

Confidential

| Delta pk. | P_1 | P_2 | P_3 | P_4 | P_5 | P_6 |
|---|---|---|---|---|---|---|
| 147 | 0 | 0 | 0 | 0 | 0 | 0 |
| 148 | 0 | 0 | 0 | 0 | 0 | 0 |
| 149 | 0 | 0 | 0 | 0 | 0 | 0 |
| 150 | 0 | 0 | 0 | 0 | 0 | 0 |
| 151 | 0 | 0 | 0 | 0 | 0 | 0 |
| 152 | 0 | 0 | 0 | 0 | 0 | 0 |
| 153 | 0 | 0 | 0 | 0 | 0 | 0 |
| 154 | 0 | 0 | 0 | 0 | 0 | 0 |
| 155 | 0 | 0 | 0 | 0 | 0 | 0 |
| 156 | 0 | 0 | 0 | 0 | 0 | 0 |
| 157 | 0 | 0 | 0 | 0 | 0 | 0 |
| 158 | 0 | 0 | 0 | 0 | 0 | 0 |
| 159 | 0 | 0 | 0 | 0 | 0 | 0 |
| 160 | 0 | 0 | 0 | 0 | 0 | 0 |
| 161 | 0 | 0 | 0 | 0 | 0 | 0 |
| 162 | 0 | 0 | 0 | 0 | 0 | 0 |
| 163 | 0 | 0 | 0 | 0 | 0 | 0 |
| 164 | 0 | 0 | 0 | 0 | 0 | 0 |
| 165 | 0 | 0 | 0 | 0 | 0 | 0 |
| 166 | 0 | 0 | 0 | 0 | 0 | 0 |
| 167 | 0 | 0 | 0 | 0 | 0 | 0 |
| 168 | 0 | 0 | 0 | 0 | 0 | 0 |
| 169 | 0 | 0 | 0 | 0 | 0 | 0 |
| 170 | 0 | 0 | 0 | 0 | 0 | 0 |
| 171 | 0 | 0 | 0 | 0 | 0 | 0 |
| 172 | 0 | 0 | 0 | 0 | 0 | 0 |
| 173 | 0 | 0 | 0 | 0 | 0 | 0 |
| 174 | 0 | 0 | 0 | 0 | 0 | 0 |
| 175 | 0 | 0 | 0 | 0 | 0 | 0 |
| 176 | 0 | 0 | 0 | 0 | 0 | 0 |
| 177 | 0 | 0 | 0 | 0 | 0 | 0 |
| 178 | 0 | 0 | 0 | 0 | 0 | 0 |
| 179 | 0 | 0 | 0 | 0 | 0 | 0 |
| 180 | 0 | 0 | 0 | 0 | 0 | 0 |
| 181 | 0 | 0 | 0 | 0 | 0 | 0 |
| 182 | 0 | 0 | 0 | 0 | 0 | 0 |
| 183 | 0 | 0 | 0 | 0 | 0 | 0 |

FIG.10E

Confidential

| Delta pk. | P_1 | P_2 | P_3 | P_4 | P_5 | P_6 |
|---|---|---|---|---|---|---|
| 184 | 0 | 0 | 0 | 0 | 0 | 0 |
| 185 | 0 | 0 | 0 | 0 | 0 | 0 |
| 186 | 0 | 0 | 0 | 0 | 0 | 0 |
| 187 | 0 | 0 | 0 | 0 | 0 | 0 |
| 188 | 0 | 0 | 0 | 0 | 0 | 0 |
| 189 | 0 | 0 | 0 | 0 | 0 | 0 |
| 190 | 0 | 0 | 0 | 0 | 0 | 0 |
| 191 | 0 | 0 | 0 | 0 | 0 | 0 |
| 192 | 0 | 0 | 0 | 0 | 0 | 0 |
| 193 | 0 | 0 | 0 | 0 | 0 | 0 |
| 194 | 0 | 0 | 0 | 0 | 0 | 0 |
| 195 | 0 | 0 | 0 | 0 | 0 | 0 |
| 196 | 0 | 0 | 0 | 0 | 0 | 0 |
| 197 | 0 | 0 | 0 | 0 | 0 | 0 |
| 198 | 0 | 0 | 0 | 0 | 0 | 0 |
| 199 | 0 | 0 | 0 | 0 | 0 | 0 |
| 200 | 0 | 0 | 0 | 0 | 0 | 0 |
| 201 | 0 | 0 | 0 | 0 | 0 | 0 |
| 202 | 0 | 0 | 0 | 0 | 0 | 0 |
| 203 | 0 | 0 | 0 | 0 | 0 | 0 |
| 204 | 0 | 0 | 0 | 0 | 0 | 0 |
| 205 | 0 | 0 | 0 | 0 | 0 | 0 |
| 206 | 0 | 0 | 0 | 0 | 0 | 0 |
| 207 | 0 | 0 | 0 | 0 | 0 | 0 |
| 208 | 0 | 0 | 0 | 0 | 0 | 0 |
| 209 | 0 | 0 | 0 | 0 | 0 | 0 |
| 210 | 0 | 0 | 0 | 0 | 0 | 0 |
| 211 | 0 | 0 | 0 | 0 | 0 | 0 |
| 212 | 0 | 0 | 0 | 0 | 0 | 0 |
| 213 | 0 | 0 | 0 | 0 | 0 | 0 |
| 214 | 0 | 0 | 0 | 0 | 0 | 0 |
| 215 | 0 | 0 | 0 | 0 | 0 | 0 |
| 216 | 0 | 0 | 0 | 0 | 0 | 0 |
| 217 | 0 | 0 | 0 | 0 | 0 | 0 |
| 218 | 0 | 0 | 0 | 0 | 0 | 0 |
| 219 | 0 | 0 | 0 | 0 | 0 | 0 |
| 220 | 0 | 0 | 0 | 0 | 0 | 0 |

FIG.10F

Confidential

| Delta pk. | P_1 | P_2 | P_3 | P_4 | P_5 | P_6 |
|---|---|---|---|---|---|---|
| 221 | 0 | 0 | 0 | 0 | 0 | 0 |
| 222 | 0 | 0 | 0 | 0 | 0 | 0 |
| 223 | 0 | 0 | 0 | 0 | 0 | 0 |
| 224 | 0 | 0 | 0 | 0 | 0 | 0 |
| 225 | 0 | 0 | 0 | 0 | 0 | 0 |
| 226 | 0 | 0 | 0 | 0 | 0 | 0 |
| 227 | 0 | 0 | 0 | 0 | 0 | 0 |
| 228 | 0 | 0 | 0 | 0 | 0 | 0 |
| 229 | 0 | 0 | 0 | 0 | 0 | 0 |
| 230 | 0 | 0 | 0 | 0 | 0 | 0 |
| 231 | 0 | 0 | 0 | 0 | 0 | 0 |
| 232 | 0 | 0 | 0 | 0 | 0 | 0 |
| 233 | 0 | 0 | 0 | 0 | 0 | 0 |
| 234 | 0 | 0 | 0 | 0 | 0 | 0 |
| 235 | 0 | 0 | 0 | 0 | 0 | 0 |
| 236 | 0 | 0 | 0 | 0 | 0 | 0 |
| 237 | 0 | 0 | 0 | 0 | 0 | 0 |
| 238 | 0 | 0 | 0 | 0 | 0 | 0 |
| 239 | 0 | 0 | 0 | 0 | 0 | 0 |
| 240 | 0 | 0 | 0 | 0 | 0 | 0 |
| 241 | 0 | 0 | 0 | 0 | 0 | 0 |
| 242 | 0 | 0 | 0 | 0 | 0 | 0 |
| 243 | 0 | 0 | 0 | 0 | 0 | 0 |
| 244 | 0 | 0 | 0 | 0 | 0 | 0 |
| 245 | 0 | 0 | 0 | 0 | 0 | 0 |
| 246 | 0 | 0 | 0 | 0 | 0 | 0 |
| 247 | 0 | 0 | 0 | 0 | 0 | 0 |
| 248 | 0 | 0 | 0 | 0 | 0 | 0 |
| 249 | 0 | 0 | 0 | 0 | 0 | 0 |
| 250 | 0 | 0 | 0 | 0 | 0 | 0 |
| 251 | 0 | 0 | 0 | 0 | 0 | 0 |
| 252 | 0 | 0 | 0 | 0 | 0 | 0 |
| 253 | 0 | 0 | 0 | 0 | 0 | 0 |
| 254 | 0 | 0 | 0 | 0 | 0 | 0 |
| 255 | 0 | 0 | 0 | 0 | 0 | 0 |

FIG. 10G

IMAGE p6:

ENTROPY SCORE        781
    MAX PIXEL VALUE     153
    MIN PIXEL VALUE      30

IMAGE p7:

ENTROPY SCORE        518
    MAX PIXEL VALUE     149
    MIN PIXEL VALUE      30

IMAGE p8:

ENTROPY SCORE        468
    MAX PIXEL VALUE     172
    MIN PIXEL VALUE      34

IMAGE p9:

ENTROPY SCORE        464
    MAX PIXEL VALUE     189
    MIN PIXEL VALUE      39

IMAGE p10:

ENTROPY SCORE        455
    MAX PIXEL VALUE     212
    MIN PIXEL VALUE      46

IMAGE p11:

ENTROPY SCORE        461
    MAX PIXEL VALUE     243
    MIN PIXEL VALUE      66

FIG.11

Confidential

| Delta pix. | P_6 | P_7 | P_8 | P_9 | P_10 | P_11 |
|---|---|---|---|---|---|---|
| 0 | 0 | 0 | 0 | 0 | 0 | 0 |
| 1 | 258 | 35 | 1 | 0 | 0 | 12 |
| 2 | 170 | 112 | 28 | 23 | 45 | 91 |
| 3 | 143 | 181 | 263 | 301 | 315 | 243 |
| 4 | 68 | 115 | 126 | 78 | 41 | 55 |
| 5 | 63 | 36 | 17 | 19 | 12 | 15 |
| 6 | 50 | 20 | 14 | 20 | 17 | 18 |
| 7 | 29 | 19 | 19 | 23 | 25 | 27 |
| 8 | 16 | 13 | 22 | 24 | 31 | 29 |
| 9 | 7 | 9 | 2 | 2 | 4 | 10 |
| 10 | 10 | 0 | 0 | 0 | 0 | 0 |
| 11 | 6 | 0 | 0 | 0 | 0 | 0 |
| 12 | 6 | 0 | 0 | 0 | 0 | 0 |
| 13 | 17 | 9 | 7 | 7 | 4 | 1 |
| 14 | 27 | 1 | 3 | 3 | 6 | 9 |
| 15 | 23 | 3 | 0 | 0 | 0 | 0 |
| 16 | 19 | 5 | 1 | 0 | 0 | 1 |
| 17 | 19 | 8 | 9 | 4 | 3 | 3 |
| 18 | 8 | 12 | 22 | 26 | 18 | 17 |
| 19 | 1 | 23 | 18 | 24 | 25 | 31 |
| 20 | 1 | 14 | 16 | 19 | 26 | 23 |
| 21 | 1 | 22 | 19 | 14 | 14 | 13 |
| 22 | 2 | 3 | 5 | 3 | 4 | 2 |
| 23 | 3 | 0 | 0 | 0 | 0 | 0 |
| 24 | 2 | 0 | 0 | 0 | 0 | 0 |
| 25 | 1 | 0 | 0 | 0 | 0 | 0 |
| 26 | 2 | 0 | 0 | 0 | 0 | 0 |
| 27 | 1 | 0 | 0 | 0 | 0 | 0 |
| 28 | 3 | 0 | 0 | 0 | 0 | 0 |
| 29 | 1 | 0 | 0 | 0 | 0 | 0 |
| 30 | 3 | 0 | 0 | 0 | 0 | 0 |
| 31 | 3 | 0 | 0 | 0 | 0 | 0 |
| 32 | 1 | 0 | 0 | 0 | 0 | 0 |
| 33 | 1 | 0 | 0 | 0 | 0 | 0 |
| 34 | 0 | 0 | 0 | 0 | 0 | 0 |
| 35 | 1 | 0 | 0 | 0 | 0 | 0 |
| 36 | 0 | 0 | 0 | 0 | 0 | 0 |

FIG.13A

Confidential

| Delta pix. | P_6 | P_7 | P_8 | P_9 | P_10 | P_11 |
|---|---|---|---|---|---|---|
| 37 | 0 | 0 | 0 | 0 | 0 | 0 |
| 38 | 0 | 0 | 0 | 0 | 0 | 0 |
| 39 | 0 | 0 | 0 | 0 | 0 | 0 |
| 40 | 0 | 0 | 0 | 0 | 0 | 0 |
| 41 | 0 | 0 | 0 | 0 | 0 | 0 |
| 42 | 0 | 0 | 0 | 0 | 0 | 0 |
| 43 | 0 | 0 | 0 | 0 | 0 | 0 |
| 44 | 1 | 0 | 0 | 0 | 0 | 0 |
| 45 | 0 | 0 | 0 | 0 | 0 | 0 |
| 46 | 0 | 0 | 0 | 0 | 0 | 0 |
| 47 | 1 | 0 | 0 | 0 | 0 | 0 |
| 48 | 1 | 0 | 0 | 0 | 0 | 0 |
| 49 | 0 | 0 | 0 | 0 | 0 | 0 |
| 50 | 2 | 0 | 0 | 0 | 0 | 0 |
| 51 | 0 | 0 | 0 | 0 | 0 | 0 |
| 52 | 0 | 0 | 0 | 0 | 0 | 0 |
| 53 | 0 | 0 | 0 | 0 | 0 | 0 |
| 54 | 1 | 0 | 0 | 0 | 0 | 0 |
| 55 | 1 | 0 | 0 | 0 | 0 | 0 |
| 56 | 0 | 0 | 0 | 0 | 0 | 0 |
| 57 | 1 | 0 | 0 | 0 | 0 | 0 |
| 58 | 3 | 0 | 0 | 0 | 0 | 0 |
| 59 | 0 | 0 | 0 | 0 | 0 | 0 |
| 60 | 0 | 0 | 0 | 0 | 0 | 0 |
| 61 | 0 | 0 | 0 | 0 | 0 | 0 |
| 62 | 0 | 0 | 0 | 0 | 0 | 0 |
| 63 | 0 | 0 | 0 | 0 | 0 | 0 |
| 64 | 0 | 0 | 0 | 0 | 0 | 0 |
| 65 | 0 | 0 | 0 | 0 | 0 | 0 |
| 66 | 0 | 0 | 0 | 0 | 0 | 0 |
| 67 | 0 | 0 | 0 | 0 | 0 | 0 |
| 68 | 0 | 0 | 0 | 0 | 0 | 0 |
| 69 | 0 | 0 | 0 | 0 | 0 | 0 |
| 70 | 0 | 0 | 0 | 0 | 0 | 0 |
| 71 | 0 | 0 | 0 | 0 | 0 | 0 |
| 72 | 0 | 0 | 0 | 0 | 0 | 0 |
| 73 | 2 | 0 | 0 | 0 | 0 | 0 |

FIG.13B

Confidential

| Delta pix. | P_6 | P_7 | P_8 | P_9 | P_10 | P_11 |
|---|---|---|---|---|---|---|
| 74 | 1 | 0 | 0 | 0 | 0 | 0 |
| 75 | 0 | 0 | 0 | 0 | 0 | 0 |
| 76 | 0 | 0 | 0 | 0 | 0 | 0 |
| 77 | 0 | 0 | 0 | 0 | 0 | 0 |
| 78 | 0 | 0 | 0 | 0 | 0 | 0 |
| 79 | 0 | 0 | 0 | 0 | 0 | 0 |
| 80 | 0 | 0 | 0 | 0 | 0 | 0 |
| 81 | 0 | 0 | 0 | 0 | 0 | 0 |
| 82 | 0 | 0 | 0 | 0 | 0 | 0 |
| 83 | 0 | 0 | 0 | 0 | 0 | 0 |
| 84 | 0 | 0 | 0 | 0 | 0 | 0 |
| 85 | 0 | 0 | 0 | 0 | 0 | 0 |
| 86 | 0 | 0 | 0 | 0 | 0 | 0 |
| 87 | 0 | 0 | 0 | 0 | 0 | 0 |
| 88 | 0 | 0 | 0 | 0 | 0 | 0 |
| 89 | 0 | 0 | 0 | 0 | 0 | 0 |
| 90 | 0 | 0 | 0 | 0 | 0 | 0 |
| 91 | 0 | 0 | 0 | 0 | 0 | 0 |
| 92 | 0 | 0 | 0 | 0 | 0 | 0 |
| 93 | 0 | 0 | 0 | 0 | 0 | 0 |
| 94 | 0 | 0 | 0 | 0 | 0 | 0 |
| 95 | 0 | 0 | 0 | 0 | 0 | 0 |
| 96 | 0 | 0 | 0 | 0 | 0 | 0 |
| 97 | 0 | 0 | 0 | 0 | 0 | 0 |
| 98 | 0 | 0 | 0 | 0 | 0 | 0 |
| 99 | 0 | 0 | 0 | 0 | 0 | 0 |
| 100 | 0 | 0 | 0 | 0 | 0 | 0 |
| 101 | 0 | 0 | 0 | 0 | 0 | 0 |
| 102 | 0 | 0 | 0 | 0 | 0 | 0 |
| 103 | 0 | 0 | 0 | 0 | 0 | 0 |
| 104 | 0 | 0 | 0 | 0 | 0 | 0 |
| 105 | 0 | 0 | 0 | 0 | 0 | 0 |
| 106 | 0 | 0 | 0 | 0 | 0 | 0 |
| 107 | 0 | 0 | 0 | 0 | 0 | 0 |
| 108 | 0 | 0 | 0 | 0 | 0 | 0 |
| 109 | 0 | 0 | 0 | 0 | 0 | 0 |
| 110 | 0 | 0 | 0 | 0 | 0 | 0 |

FIG.13C

Confidential

| Delta pix. | P_6 | P_7 | P_8 | P_9 | P_10 | P_11 |
|---|---|---|---|---|---|---|
| 111 | 0 | 0 | 0 | 0 | 0 | 0 |
| 112 | 0 | 0 | 0 | 0 | 0 | 0 |
| 113 | 0 | 0 | 0 | 0 | 0 | 0 |
| 114 | 0 | 0 | 0 | 0 | 0 | 0 |
| 115 | 0 | 0 | 0 | 0 | 0 | 0 |
| 116 | 0 | 0 | 0 | 0 | 0 | 0 |
| 117 | 1 | 0 | 0 | 0 | 0 | 0 |
| 118 | 1 | 0 | 0 | 0 | 0 | 0 |
| 119 | 2 | 0 | 0 | 0 | 0 | 0 |
| 120 | 0 | 0 | 0 | 0 | 0 | 0 |
| 121 | 1 | 0 | 0 | 0 | 0 | 0 |
| 122 | 1 | 0 | 0 | 0 | 0 | 0 |
| 123 | 1 | 0 | 0 | 0 | 0 | 0 |
| 124 | 0 | 0 | 0 | 0 | 0 | 0 |
| 125 | 0 | 0 | 0 | 0 | 0 | 0 |
| 126 | 0 | 0 | 0 | 0 | 0 | 0 |
| 127 | 0 | 0 | 0 | 0 | 0 | 0 |
| 128 | 0 | 0 | 0 | 0 | 0 | 0 |
| 129 | 3 | 0 | 0 | 0 | 0 | 0 |
| 130 | 0 | 0 | 0 | 0 | 0 | 0 |
| 131 | 0 | 0 | 0 | 0 | 0 | 0 |
| 132 | 0 | 0 | 0 | 0 | 0 | 0 |
| 133 | 0 | 0 | 0 | 0 | 0 | 0 |
| 134 | 0 | 0 | 0 | 0 | 0 | 0 |
| 135 | 0 | 0 | 0 | 0 | 0 | 0 |
| 136 | 0 | 0 | 0 | 0 | 0 | 0 |
| 137 | 0 | 0 | 0 | 0 | 0 | 0 |
| 138 | 0 | 0 | 0 | 0 | 0 | 0 |
| 139 | 0 | 0 | 0 | 0 | 0 | 0 |
| 140 | 0 | 0 | 0 | 0 | 0 | 0 |
| 141 | 0 | 0 | 0 | 0 | 0 | 0 |
| 142 | 0 | 0 | 0 | 0 | 0 | 0 |
| 143 | 0 | 0 | 0 | 0 | 0 | 0 |
| 144 | 0 | 0 | 0 | 0 | 0 | 0 |
| 145 | 0 | 0 | 0 | 0 | 0 | 0 |
| 146 | 0 | 0 | 0 | 0 | 0 | 0 |
| 147 | 0 | 0 | 0 | 0 | 0 | 0 |

FIG.13D

Confidential

| Delta pix. | P_6 | P_7 | P_8 | P_9 | P_10 | P_11 |
|---|---|---|---|---|---|---|
| 148 | 0 | 0 | 0 | 0 | 0 | 0 |
| 149 | 0 | 0 | 0 | 0 | 0 | 0 |
| 150 | 0 | 0 | 0 | 0 | 0 | 0 |
| 151 | 0 | 0 | 0 | 0 | 0 | 0 |
| 152 | 0 | 0 | 0 | 0 | 0 | 0 |
| 153 | 0 | 0 | 0 | 0 | 0 | 0 |
| 154 | 0 | 0 | 0 | 0 | 0 | 0 |
| 155 | 0 | 0 | 0 | 0 | 0 | 0 |
| 156 | 0 | 0 | 0 | 0 | 0 | 0 |
| 157 | 0 | 0 | 0 | 0 | 0 | 0 |
| 158 | 0 | 0 | 0 | 0 | 0 | 0 |
| 159 | 0 | 0 | 0 | 0 | 0 | 0 |
| 160 | 0 | 0 | 0 | 0 | 0 | 0 |
| 161 | 0 | 0 | 0 | 0 | 0 | 0 |
| 162 | 0 | 0 | 0 | 0 | 0 | 0 |
| 163 | 0 | 0 | 0 | 0 | 0 | 0 |
| 164 | 0 | 0 | 0 | 0 | 0 | 0 |
| 165 | 0 | 0 | 0 | 0 | 0 | 0 |
| 166 | 0 | 0 | 0 | 0 | 0 | 0 |
| 167 | 0 | 0 | 0 | 0 | 0 | 0 |
| 168 | 0 | 0 | 0 | 0 | 0 | 0 |
| 169 | 0 | 0 | 0 | 0 | 0 | 0 |
| 170 | 0 | 0 | 0 | 0 | 0 | 0 |
| 171 | 0 | 0 | 0 | 0 | 0 | 0 |
| 172 | 0 | 0 | 0 | 0 | 0 | 0 |
| 173 | 0 | 0 | 0 | 0 | 0 | 0 |
| 174 | 0 | 0 | 0 | 0 | 0 | 0 |
| 175 | 0 | 0 | 0 | 0 | 0 | 0 |
| 176 | 0 | 0 | 0 | 0 | 0 | 0 |
| 177 | 0 | 0 | 0 | 0 | 0 | 0 |
| 178 | 0 | 0 | 0 | 0 | 0 | 0 |
| 179 | 0 | 0 | 0 | 0 | 0 | 0 |
| 180 | 0 | 0 | 0 | 0 | 0 | 0 |
| 181 | 0 | 0 | 0 | 0 | 0 | 0 |
| 182 | 0 | 0 | 0 | 0 | 0 | 0 |
| 183 | 0 | 0 | 0 | 0 | 0 | 0 |
| 184 | 0 | 0 | 0 | 0 | 0 | 0 |

FIG. 13E

Confidential

| Delta pix. | P_6 | P_7 | P_8 | P_9 | P_10 | P_11 |
|---|---|---|---|---|---|---|
| 185 | 0 | 0 | 0 | 0 | 0 | 0 |
| 186 | 0 | 0 | 0 | 0 | 0 | 0 |
| 187 | 0 | 0 | 0 | 0 | 0 | 0 |
| 188 | 0 | 0 | 0 | 0 | 0 | 0 |
| 189 | 0 | 0 | 0 | 0 | 0 | 0 |
| 190 | 0 | 0 | 0 | 0 | 0 | 0 |
| 191 | 0 | 0 | 0 | 0 | 0 | 0 |
| 192 | 0 | 0 | 0 | 0 | 0 | 0 |
| 193 | 0 | 0 | 0 | 0 | 0 | 0 |
| 194 | 0 | 0 | 0 | 0 | 0 | 0 |
| 195 | 0 | 0 | 0 | 0 | 0 | 0 |
| 196 | 0 | 0 | 0 | 0 | 0 | 0 |
| 197 | 0 | 0 | 0 | 0 | 0 | 0 |
| 198 | 0 | 0 | 0 | 0 | 0 | 0 |
| 199 | 0 | 0 | 0 | 0 | 0 | 0 |
| 200 | 0 | 0 | 0 | 0 | 0 | 0 |
| 201 | 0 | 0 | 0 | 0 | 0 | 0 |
| 202 | 0 | 0 | 0 | 0 | 0 | 0 |
| 203 | 0 | 0 | 0 | 0 | 0 | 0 |
| 204 | 0 | 0 | 0 | 0 | 0 | 0 |
| 205 | 0 | 0 | 0 | 0 | 0 | 0 |
| 206 | 0 | 0 | 0 | 0 | 0 | 0 |
| 207 | 0 | 0 | 0 | 0 | 0 | 0 |
| 208 | 0 | 0 | 0 | 0 | 0 | 0 |
| 209 | 0 | 0 | 0 | 0 | 0 | 0 |
| 210 | 0 | 0 | 0 | 0 | 0 | 0 |
| 211 | 0 | 0 | 0 | 0 | 0 | 0 |
| 212 | 0 | 0 | 0 | 0 | 0 | 0 |
| 213 | 0 | 0 | 0 | 0 | 0 | 0 |
| 214 | 0 | 0 | 0 | 0 | 0 | 0 |
| 215 | 0 | 0 | 0 | 0 | 0 | 0 |
| 216 | 0 | 0 | 0 | 0 | 0 | 0 |
| 217 | 0 | 0 | 0 | 0 | 0 | 0 |
| 218 | 0 | 0 | 0 | 0 | 0 | 0 |
| 219 | 0 | 0 | 0 | 0 | 0 | 0 |
| 220 | 0 | 0 | 0 | 0 | 0 | 0 |
| 221 | 0 | 0 | 0 | 0 | 0 | 0 |

FIG.13F

Confidential

| Delta pix. | P_6 | P_7 | P_8 | P_9 | P_10 | P_11 |
|---|---|---|---|---|---|---|
| 222 | 0 | 0 | 0 | 0 | 0 | 0 |
| 223 | 0 | 0 | 0 | 0 | 0 | 0 |
| 224 | 0 | 0 | 0 | 0 | 0 | 0 |
| 225 | 0 | 0 | 0 | 0 | 0 | 0 |
| 226 | 0 | 0 | 0 | 0 | 0 | 0 |
| 227 | 0 | 0 | 0 | 0 | 0 | 0 |
| 228 | 0 | 0 | 0 | 0 | 0 | 0 |
| 229 | 0 | 0 | 0 | 0 | 0 | 0 |
| 230 | 0 | 0 | 0 | 0 | 0 | 0 |
| 231 | 0 | 0 | 0 | 0 | 0 | 0 |
| 232 | 0 | 0 | 0 | 0 | 0 | 0 |
| 233 | 0 | 0 | 0 | 0 | 0 | 0 |
| 234 | 0 | 0 | 0 | 0 | 0 | 0 |
| 235 | 0 | 0 | 0 | 0 | 0 | 0 |
| 236 | 0 | 0 | 0 | 0 | 0 | 0 |
| 237 | 0 | 0 | 0 | 0 | 0 | 0 |
| 238 | 0 | 0 | 0 | 0 | 0 | 0 |
| 239 | 0 | 0 | 0 | 0 | 0 | 0 |
| 240 | 0 | 0 | 0 | 0 | 0 | 0 |
| 241 | 0 | 0 | 0 | 0 | 0 | 0 |
| 242 | 0 | 0 | 0 | 0 | 0 | 0 |
| 243 | 0 | 0 | 0 | 0 | 0 | 0 |
| 244 | 0 | 0 | 0 | 0 | 0 | 0 |
| 245 | 0 | 0 | 0 | 0 | 0 | 0 |
| 246 | 0 | 0 | 0 | 0 | 0 | 0 |
| 247 | 0 | 0 | 0 | 0 | 0 | 0 |
| 248 | 0 | 0 | 0 | 0 | 0 | 0 |
| 249 | 0 | 0 | 0 | 0 | 0 | 0 |
| 250 | 0 | 0 | 0 | 0 | 0 | 0 |
| 251 | 0 | 0 | 0 | 0 | 0 | 0 |
| 252 | 0 | 0 | 0 | 0 | 0 | 0 |
| 253 | 0 | 0 | 0 | 0 | 0 | 0 |
| 254 | 0 | 0 | 0 | 0 | 0 | 0 |
| 255 | 0 | 0 | 0 | 0 | 0 | 0 |

FIG.13G

IMAGE p1:                                    PTiffInfo.txt
    Entropy Score                         758
    Max Pixel Value                       55
    Min Pixel Value                       14

IMAGE p2:
    Entropy Score                         776
    Max Pixel Value                       73
    Min Pixel Value                       18

IMAGE p3:
    Entropy Score                         806
    Max Pixel Value                       97
    Min Pixel Value                       22

IMAGE p4:
    Entropy Score                         852
    Max Pixel Value                       112
    Min Pixel Value                       24

IMAGE p5:
    Entropy Score                         880
    Max Pixel Value                       133
    Min Pixel Value                       27

IMAGE p6:
    Entropy Score                         894
    Max Pixel Value                       152
    Min Pixel Value                       30

FIG.14

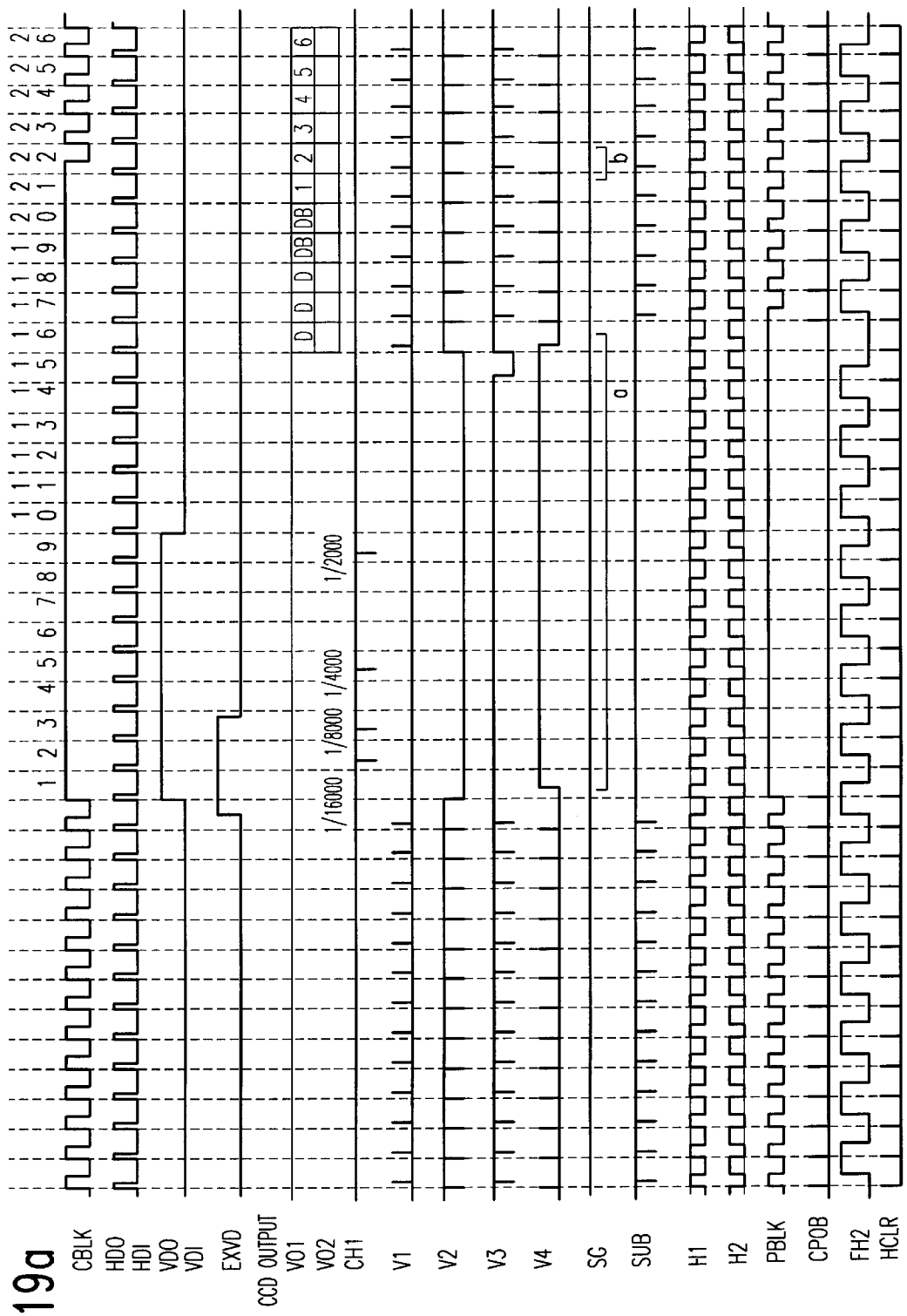

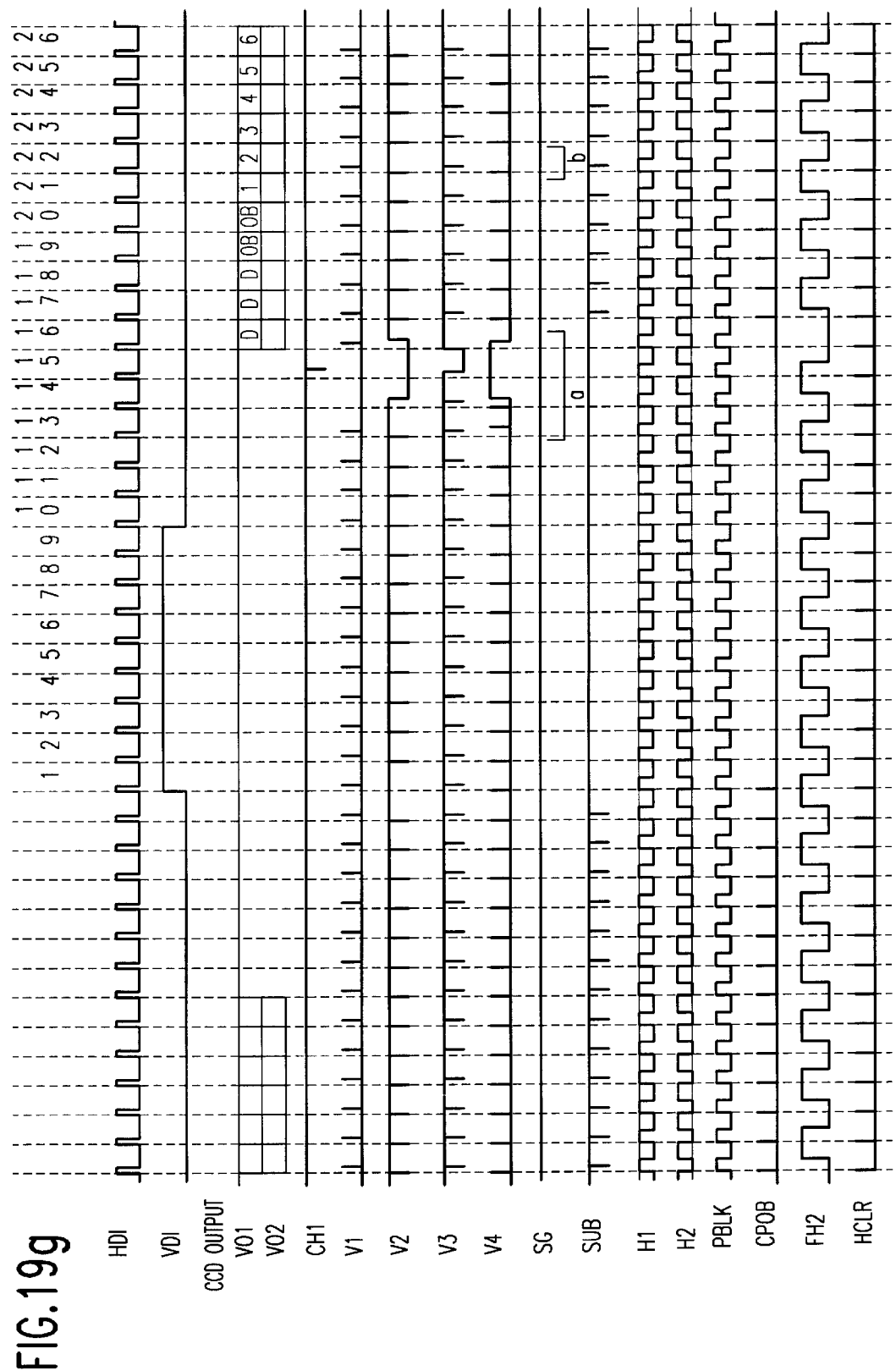

Design.xls          lines

| | type | v pulses 1 2 4 | x pulses 1 2 | frame | line | stby | cpob | clk T | ch1 | num | | | dT |
|---|---|---|---|---|---|---|---|---|---|---|---|---|---|
| power ctrl | off | | | 0 | 0 | 0 | 0 | | 0 | 0 | sim | 24.5098 | |
| start1a | s1a | 1 | 1 | | 1 | 1 | | 834 | 0 | 2 | real | 24.576 | −714 |
| start1b | s1b | 1 | 1 | | 1 | 1 | | 834 | 1 | 2 | MHz | 24.576 | −714 |
| start1c | s1c | 1 | 1 | | 1 | 1 | | 834 | 1 | 2 | uS | 0.041 | −714 |
| pixel | p1 | 1 | 1 | 1 | 1 | 0 | 0 | 1548 | 1 | 2 | pixel ns | 81.3802 | 0 |
| black | b2v | 1 | 1 | 1 | | 1 | 0 | 1548 | 1 | 3 | | | 0 |
| black fast | b4v | 1 | 1 | | | 1 | 0 | 1656 | 1 | 1 | base T | 1,548.0 | 108 |
| skip slow | y2x1 | 1 | 1 | | | 1 | 0 | 1548 | 1 | 3 | x2 | −714.0 | 0 |
| skip med | y2x2 | 1 | 1 | | | 1 | 1 | 834 | 1 | 1 | v4 | 108.0 | −714 |
| skip fast | y4x2 | 1 | 1 | | | 1 | 1 | 942 | 1 | 2 | | | −606 |

| | | 2 3 4 | 5 6 | 7 | 8 | 9 | 10 | 11 | 12 | | | | | |
|---|---|---|---|---|---|---|---|---|---|---|---|---|---|---|
| | type | | | frame | line | stby | cpob | time T | lines | real count | last ccd line count | uS | total T | total uS |
| reset | y2x2 | 0 1 0 | 0 1 | 0 | 0 | 1 | 1 | 834 | 250 | 500 | 250 | 33.9 | 208,500 | 8,483.9 |
| | y2x1 | 0 1 0 | 1 0 | 0 | 0 | 1 | 0 | 1548 | 1 | 502 | 251 | 63.0 | 210,048 | 8,546.9 |
| idle | y2x1 | 0 1 0 | 1 0 | 0 | 0 | 1 | 0 | 1548 | 1 | 2 | 1 | 63.0 | 1,548 | 63.0 |
| normal | s1a | 1 0 0 | 0 1 | 0 | 0 | 1 | 1 | 834 | 1 | | 1 | 33.9 | 834 | 33.9 |
| | s1b | 1 0 0 | 0 1 | 0 | 0 | 1 | 1 | 834 | 1 | | 2 | 33.9 | 1,668 | 67.9 |
| | s1c | 1 0 0 | 0 1 | 0 | 0 | 1 | 1 | 834 | 1 | 1 | 3 | 33.9 | 2,502 | 101.8 |
| | y2x1 | 0 1 0 | 1 0 | 0 | 0 | 1 | 0 | 1548 | 1 | 3 | 4 | 63.0 | 4,050 | 164.8 |
| | b2v | 0 1 0 | 1 0 | 1 | 0 | 1 | 0 | 1548 | 1 | 5 | 5 | 63.0 | 5,598 | 227.8 |
| | p1 | 1 0 0 | 1 0 | 1 | 1 | 0 | 0 | 1548 | 494 | 499 | 494 499 | 63.0 | 770,310 | 31,344.0 |
| | b2v | 0 1 0 | 1 0 | 1 | 0 | 1 | 0 | 1548 | 1 | 501 | 496 500 | 63.0 | 771,858 | 31,407.0 |
| | | | | | | | | | | | | fps | | 31.8401 |
| fast | s1a | 1 0 0 | 0 1 | 0 | 0 | 1 | 1 | 834 | 1 | | 1 | 33.9 | 834 | 33.9 |
| | s1b | 1 0 0 | 0 1 | 0 | 0 | 1 | 1 | 834 | 1 | | 2 | 33.9 | 1,668 | 67.9 |
| | s1c | 1 0 0 | 0 1 | 0 | 0 | 1 | 1 | 834 | 1 | 1 | 3 | 33.9 | 2,502 | 101.8 |
| | b4v | 0 0 1 | 1 0 | 0 | 0 | 1 | 0 | 1656 | 1 | 5 | 4 | 67.4 | 4,158 | 169.2 |
| | y4x2 | 0 0 1 | 0 1 | 0 | 0 | 1 | 1 | 942 | 60 | 245 | 240 64 | 38.3 | 60,678 | 2,469.0 |
| | b2v | 0 1 0 | 1 0 | 1 | 0 | 1 | 0 | 1548 | 1 | 247 | 242 65 | 63.0 | 62,226 | 2,532.0 |
| | p1 | 1 0 0 | 1 0 | 1 | 1 | 0 | 0 | 1548 | 10 | 257 | 252 75 | 63.0 | 77,706 | 3,161.9 |
| | y4x2 | 0 0 1 | 0 1 | 0 | 0 | 1 | 1 | 942 | 61 | 501 | 496 136 | 38.3 | 135,168 | 5,500.0 |
| | | | | | | | | | | | | fps | | 181.818 |
| ntsc | s1a | 1 0 0 | 0 1 | 0 | 0 | 1 | 1 | 1560 | 1 | | 1 | 63.5 | 1,560 | 63.5 |
| | s1b | 1 0 0 | 0 1 | 0 | 0 | 1 | 1 | 1560 | 1 | | 2 | 63.5 | 3,120 | 127.0 |
| | s1c | 1 0 0 | 0 1 | 0 | 0 | 1 | 1 | 1560 | 1 | 1 | 3 | 63.5 | 4,680 | 190.4 |
| | p1 | 1 0 0 | 1 0 | 1 | 1 | 0 | 0 | 1560 | 522 | 523 | 518 525 | 63.5 | 819,000 | 33,325.2 |
| | | | | | | | | | | | | fps | | 30.0073 |

METHOD OF OPERATING A CHARGE
COUPLED DEVICE IN AN ACCELERATED
MODE, AND IN CONJUNCTION WITH AN
OPTICAL SYMBOLOGY IMAGER

CROSS REFERENCE TO RELATED APPLICATIONS

This application is related to copending U.S. patent application Ser. No. (Symbology Imager System) and United States Application No. (Bar Code Illumination System) the entire disclosures of which are incorporated herein by reference. Further, International Application Serial No. WO 97/42756 filed on May 6, 1996, for a Smart Progressive-Scan Charge Coupled Device Camera, and which was filed by CIMatrix, one of the co-applicant's of the present application is also incorporated herein by reference.

BACKGROUND OF THE INVENTION

1. Field of the Invention

The present invention relates to a method of operating a charge coupled device in an accelerated mode. More particularly, the present invention relates to a method of operating a charge coupled device in accelerated mode in conjunction with an optical symbology imager, as set forth in copending application Ser. No. 09/151,766 filed simultaneously with the present application, and incorporated herein by reference.

The charge coupled device is employed in an optical symbology imager for reading optical symbologies such as linear codes including traditional bar codes and 2D symbologies, such as Dot Matrix codes.

2. Description of the Prior Art

The use of bar codes has proliferated to the point where they are used in almost every industry to provide machine readable information about an item or product and to help track such items. Numerous different symbologies have been developed, such as one dimensional linear codes and 2D codes, such as Data Matrix. Typical linear codes comprise a series of parallel lines of varying thickness and spacing which are arranged in a linear configuration to represent a digital code containing information relating to the object. The use of bar codes has expanded due to the fact that the imaging and tracking process eliminates human error and can be performed quickly.

The amount of information a bar code can contain is dependent upon the size of the markings employed in the bar code, which determines the density of the code. Linear bar codes such as UPC codes, are only recorded in one dimension. On the other hand, 2D symbologies are encoded in two dimensions to contain greater information density.

In a typical reading process, a spot of light from a laser is projected and swept across the code, and the reflected light is sensed by a photosensitive element. In conventional imagers, lasers are used as the source illumination. Scanners may be either installed in a fixed location or portable hand-held units.

Hand-held scanners must be designed to operate in situations where the number of varying factors is greater than for fixed scanners. For instance, the distance between the scanner and the bar code, the amount of illumination, the focusing of the scanner, the orientation of the scanner relative to the bar code, and the angle of the scanner relative to the bar code are all factors which must be considered for the scanner to operate correctly. For instance, U.S. Pat. No. 5,296,690 to Chandler et al. discloses a system for locating and determining the orientation of bar codes in a two-dimensional image. The Chandler et al. patent is primarily concerned with making sure that the scan of the bar code is performed correctly with regard to the orientation of the scanner and the bar code.

Some hand-held scanning devices have a wand-like configuration where the device is intended to make contact with the code as it is swept across the code. Such a wand eliminates the variation in the distance between the scanner and the code and therefore requires no focusing.

Two-dimensional arrays such as CCD arrays have been used to create the image of the bar code as it is scanned, but traditionally a laser and a single photodiode are used for scanning a linear bar code. A CCD having dimensions of 640 by 480 pixels provides sufficient resolution for use with VGA monitors, and is widely accepted. The video image is sensed in the CCD, which generates an analog signal representing the variation in intensity of the image, and an analog to digital converter puts the image signal into digital form for subsequent decoding. Two dimensional sensors are used with spatially oriented 2D codes.

For a non-contact hand-held scanner, it is necessary to be able to read the bar code over a reasonable distance, to provide sufficient illumination, to focus the scanner onto the bar code, and perform the entire operation in a reasonable amount of time. While it may be possible to create an imager which can perform all of the desired functions, if the imager does not operate in a manner the user finds comfortable and sufficient, then the imager will not be accepted by end users and will not be commercially viable. For example, if the imager cannot perform the focusing quickly enough, then variations in the position of the scanner, due to the inability of the user to hold the imager steady, will create problems which cannot be easily overcome.

By way of example, if a scanner takes too long to perform a focusing function from the moment the user depresses a trigger, then the position of the scanner relative to the bar code may vary during the focusing operation thereby requiring yet another focusing operation. Similarly, such movement in the position of the scanner relative to the bar code will change the parameters for achieving the desired illumination.

Scanners which have been designed to read linear, or one dimensional, codes are, for the most part, incapable of scanning 2D symbologies. Linear and 2D symbologies may be provided on items by attaching a label to the item, putting the item in a container having a preprinted code, or by directly marking the product, such as by etching. Most conventional scanners may find it difficult to read symbologies which have been etched directly onto a product.

SUMMARY OF THE INVENTION

These and other deficiencies of the prior art are addressed by the present invention which is directed to a method of operating a CCD in an accelerated mode, and in particular in connection with an optical symbology imager, so as to minimize variations in the position of the imager relative to the code.

The CCD has two horizontal shift registers, each receiving every other scan line. The CCD is maintained in a reset mode when not imaging. The method of the present invention uses a total time to shift 500 vertical scan lines in a normal mode of 31.84 milliseconds, and a total time for fast mode of 5.5 milliseconds.

The method skips through multiple lines of image data, then provides a black reference signal, then shifts a series of lines at a slower speed, these lines being the liens of interest for focusing and illumination operations in the optical symbology imager. Finally, the remaining lines are passed through quickly.

The imager goes back into reset mode after either normal or fast mode operation, and is thereby immediately ready to perform another scan. The fast mode operation enables the imager to obtain the approximately ten lines of image data of concern in only 5.5 milliseconds, a significant time savings. This operation can be performed for some or all of the multiple optical positions.

It is an object of the present invention to provide a method of operating a charge coupled device in an accelerated mode.

Another object of the present invention is to provide a method of operating a charge coupled device in an accelerated mode for use in an optical symbology imager.

Yet another object of the present invention is to provide a method of operating a charge coupled device in an accelerated mode to facilitate focusing and illumination adjustment.

Still another object of the present invention is to provide a method of operating a charge coupled device in an accelerated mode to facilitate focusing and illumination adjustment, where only a few scan lines are provided at a normal speed, and the preceding and following data is passed through in an accelerated manner.

BRIEF DESCRIPTION OF THE DRAWINGS

The foregoing and other attributes and objects of the present invention will be described with respect to the following drawings in which:

FIGS. 7 and 7a shows a pixel plot of lien 240 of a CCD for the values between 128 and 508, in the horizontal location, for images p1, p6, and p11, shown in FIGS. 6a, 6f and 6k;

FIGS. 8a–8h show Table A, containing data from which the pixel plots of FIG. 7 are derived;

FIGS. 10a–10e show Table B which contains the population for each peak-to-peak value of each image p1–p6, and illustrated in FIG. 9;

FIG. 11 is a table showing the entropy score, maximum pixel value and minimum pixel value for each image p1–p6;

FIGS. 12a and 12b are frequency histograms for images p6–p11, shown in FIGS. 6f–6k, with FIG. 12b being an enlargement of a portion of FIG. 12a;

FIGS. 13a–13e show Table C which contains the delta peak value of each image p6–p11;

FIG. 14 is a chart showing the entropy score, maximum pixel value and minimum pixel value for each image p6–p11;

FIGS. 19a, 19b and 19c illustrate the timing for Frame Progressive Scan Mode I, for the Panasonic CCD #MN37761AE;

FIG. 19g illustrates the timing for Frame Progressive Scan Mode II, for the Panasonic CCD #MN37761AE;

FIG. 22 is a table illustrating the operation of the CCD and sets forth the operating scan line types and their respective times;

Figure 24A:
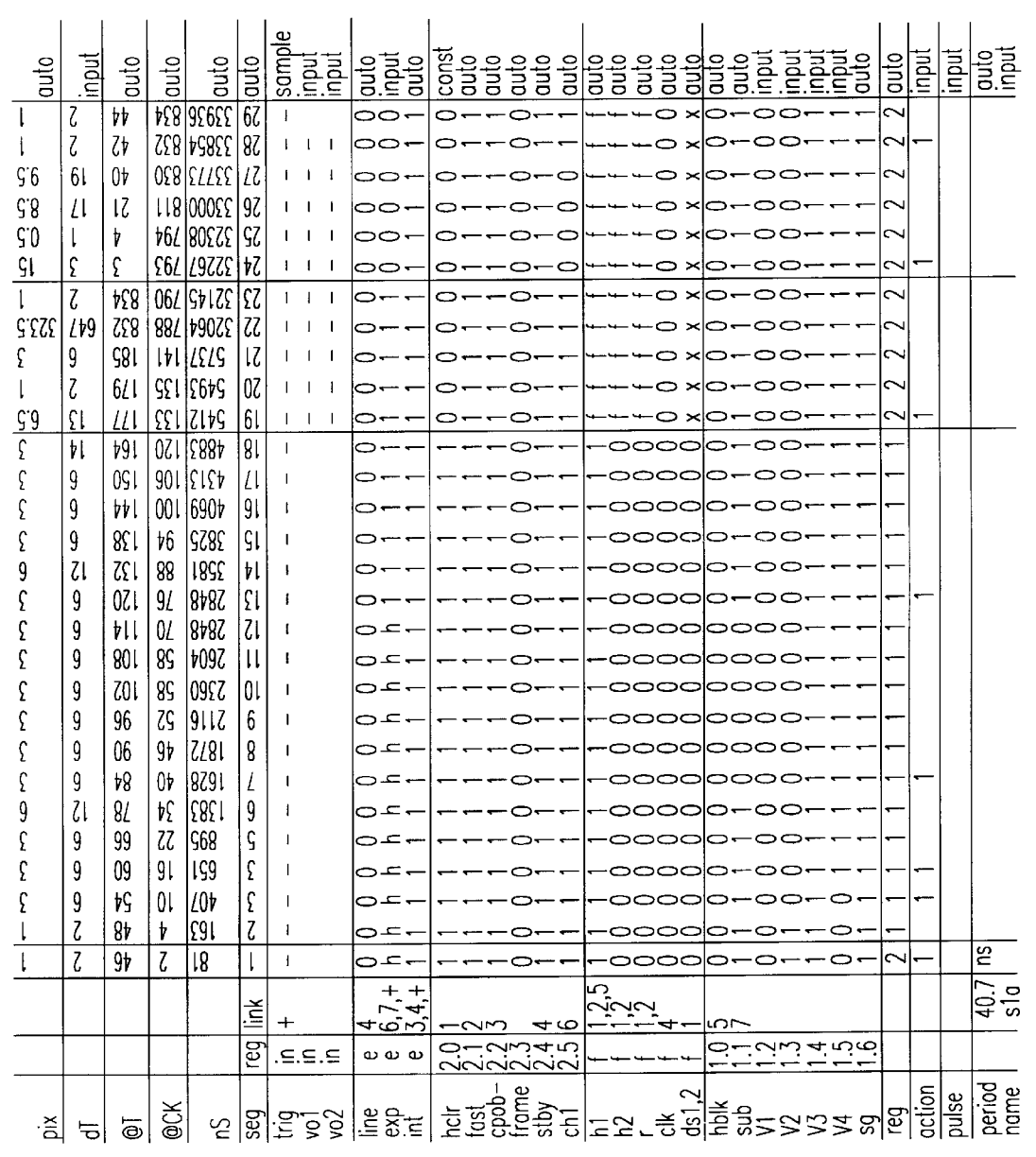
Figure 24B:
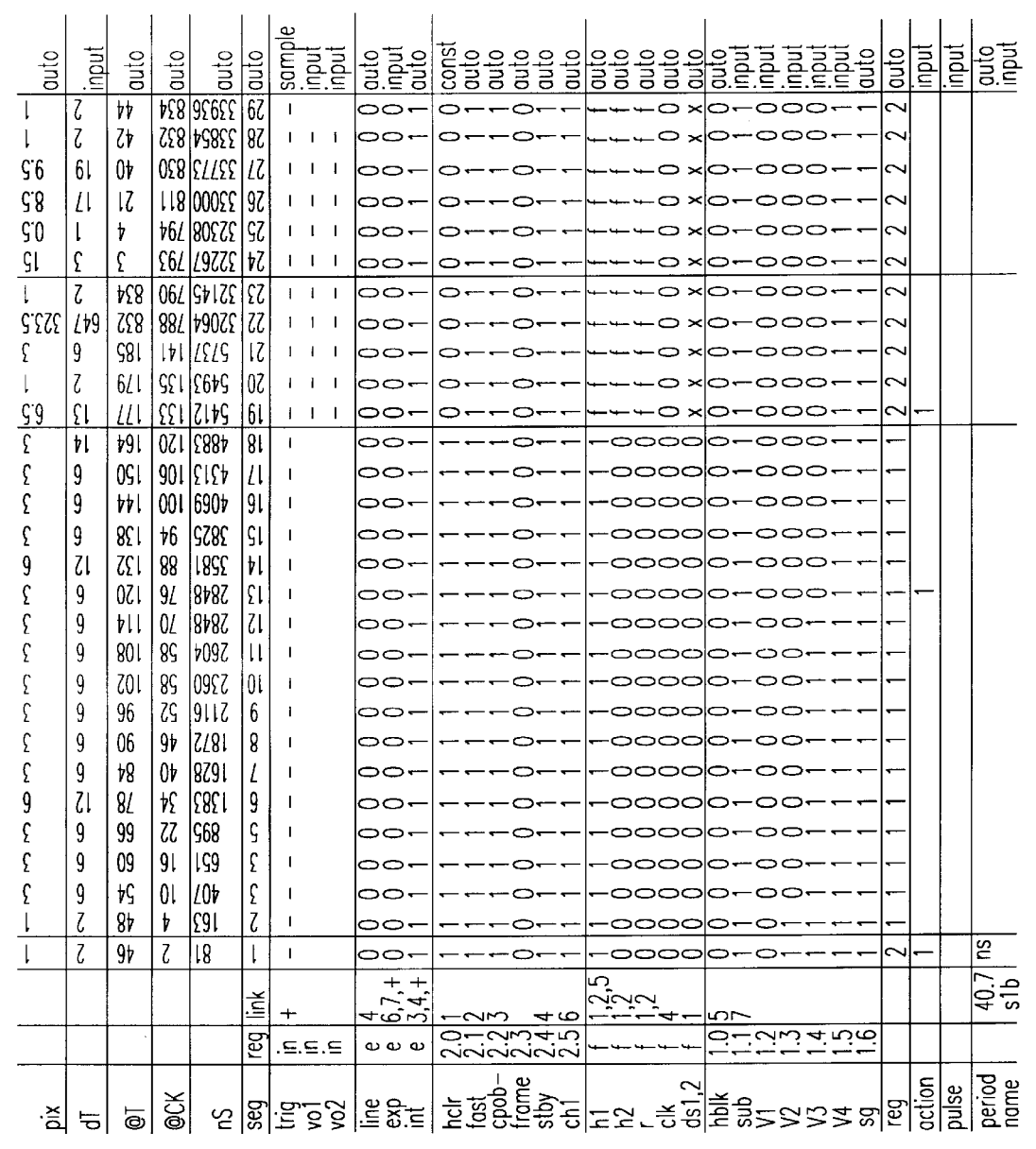
Figure 24C:
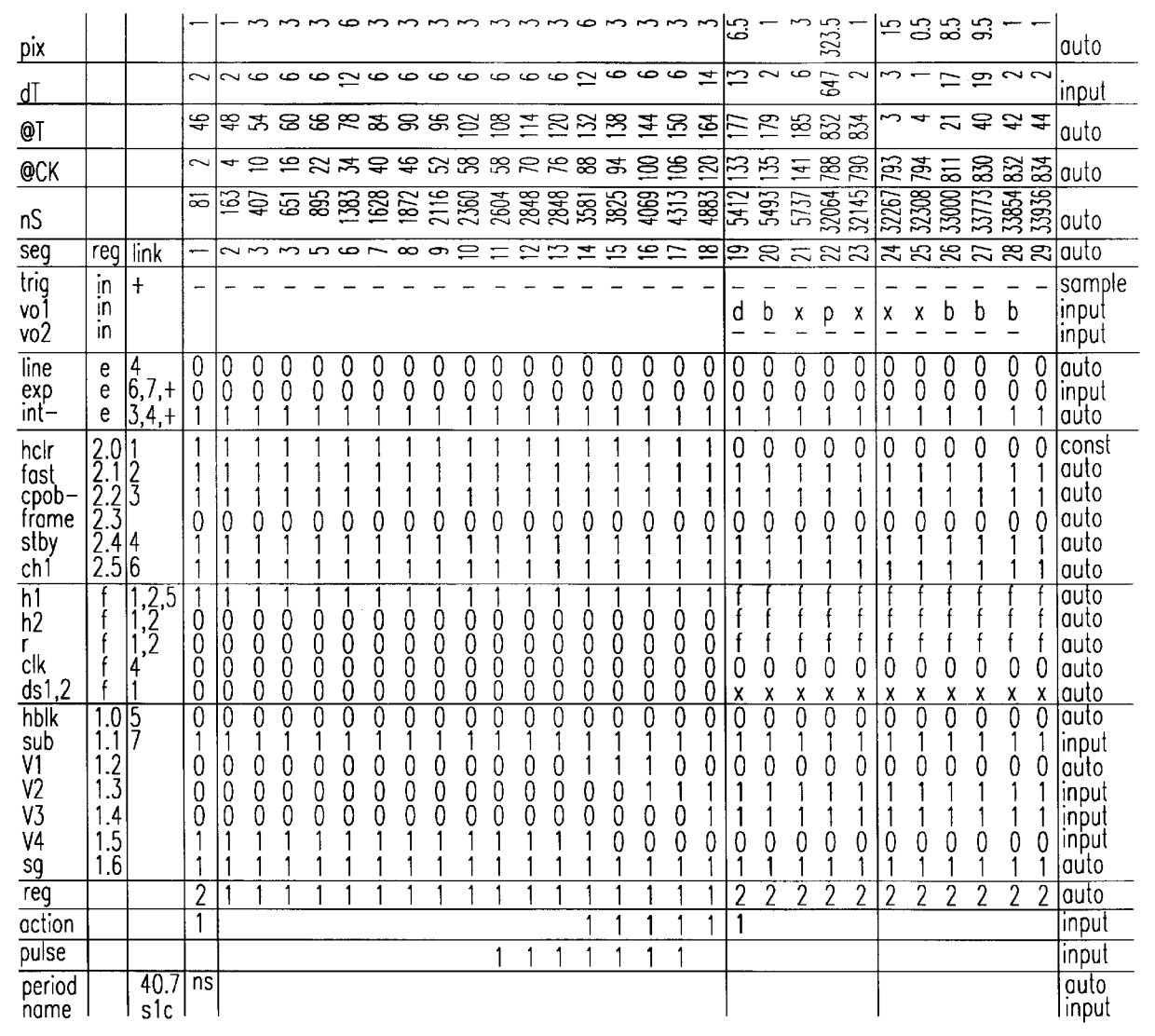
Figure 24D:
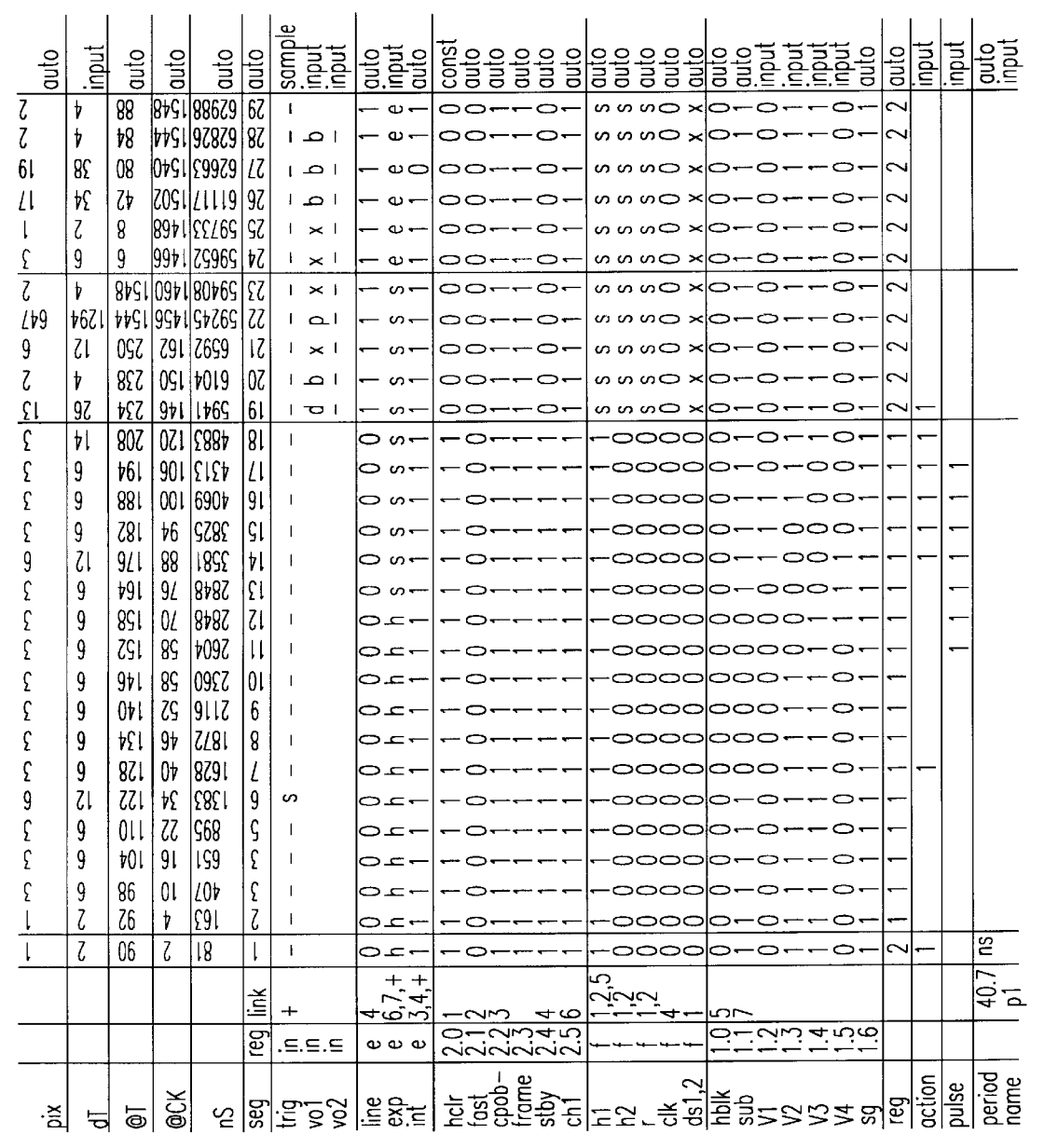
Figure 24E:
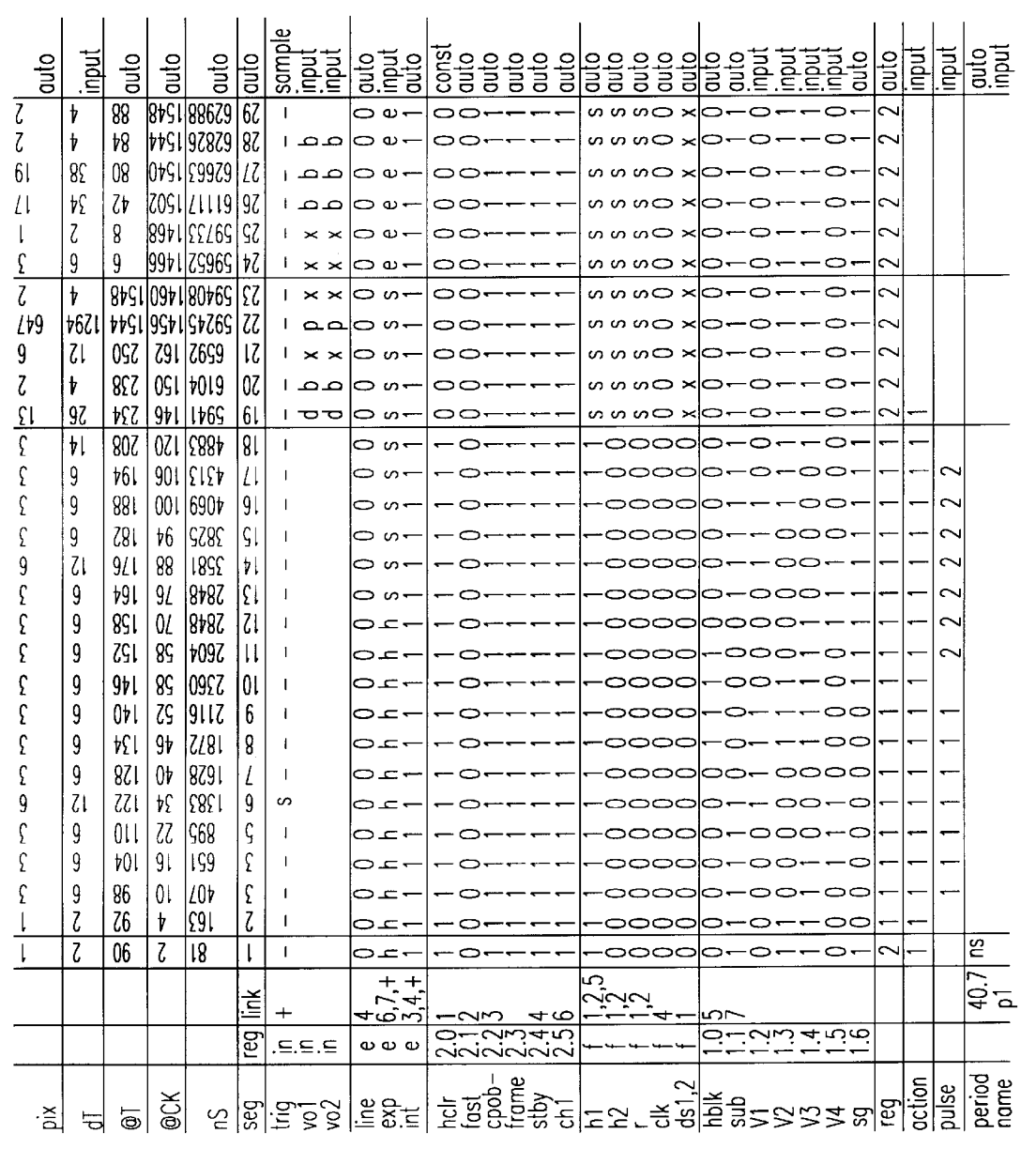
Figure 24F:
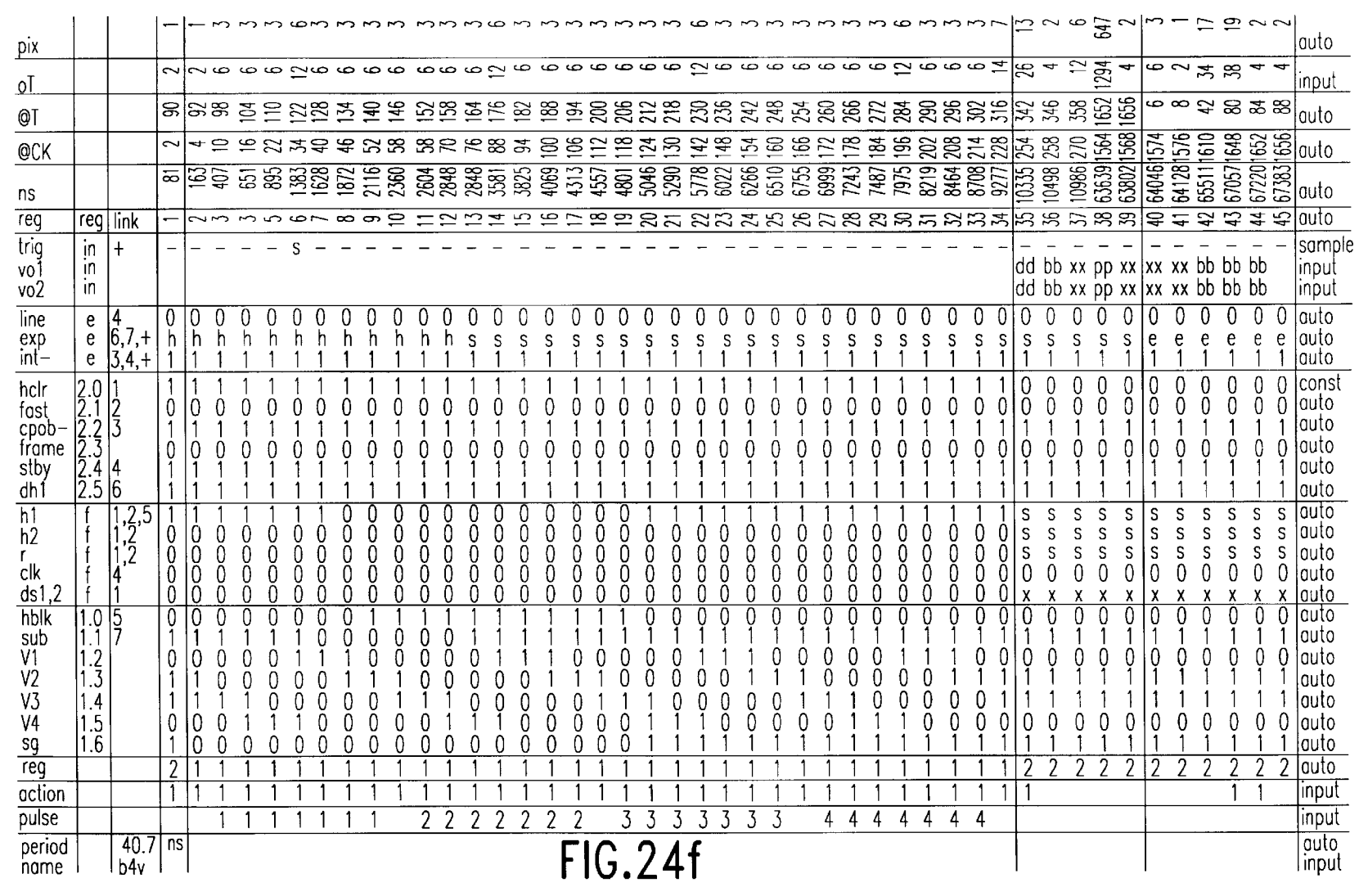
Figure 24G:
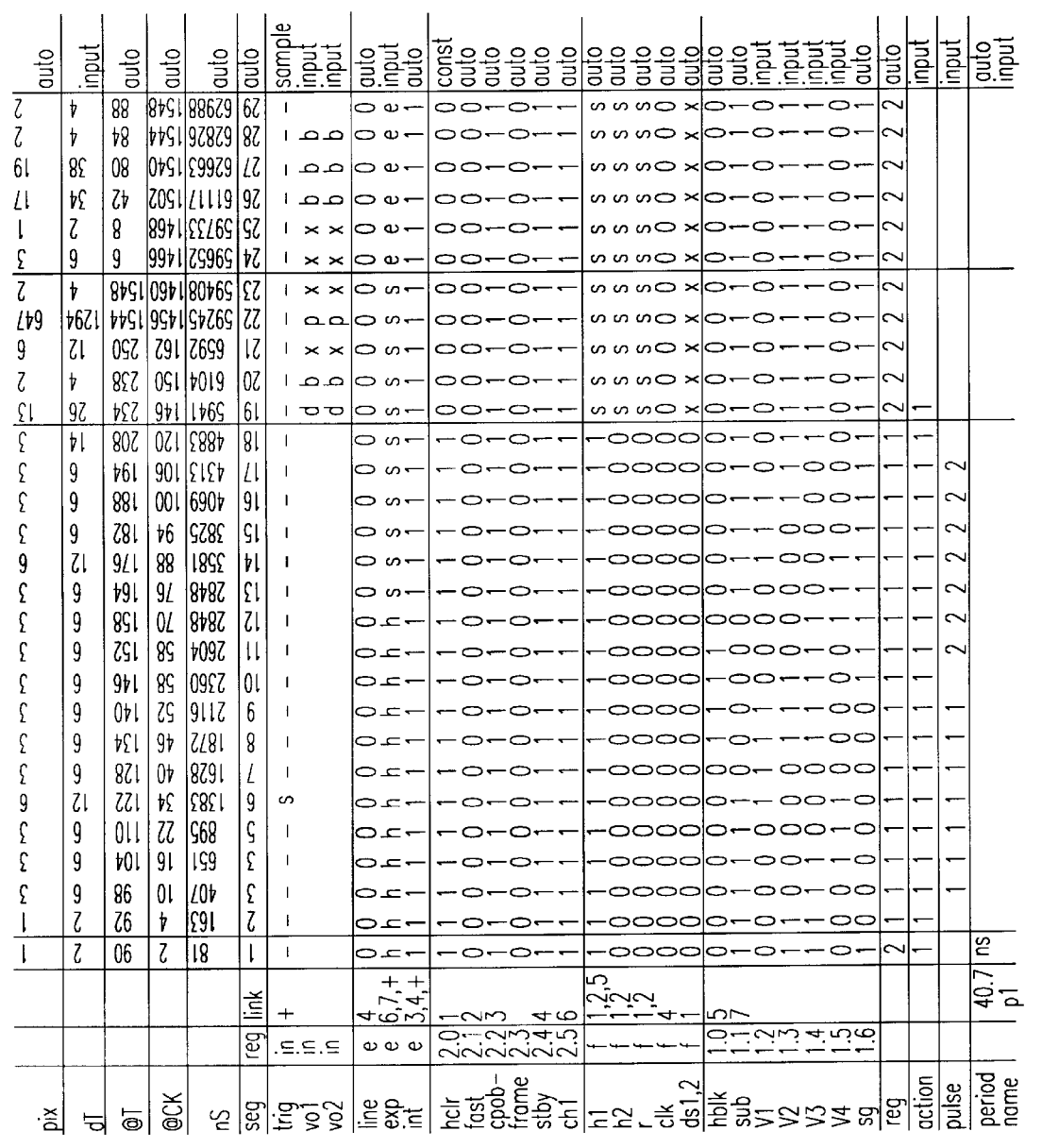
Figure 24H:
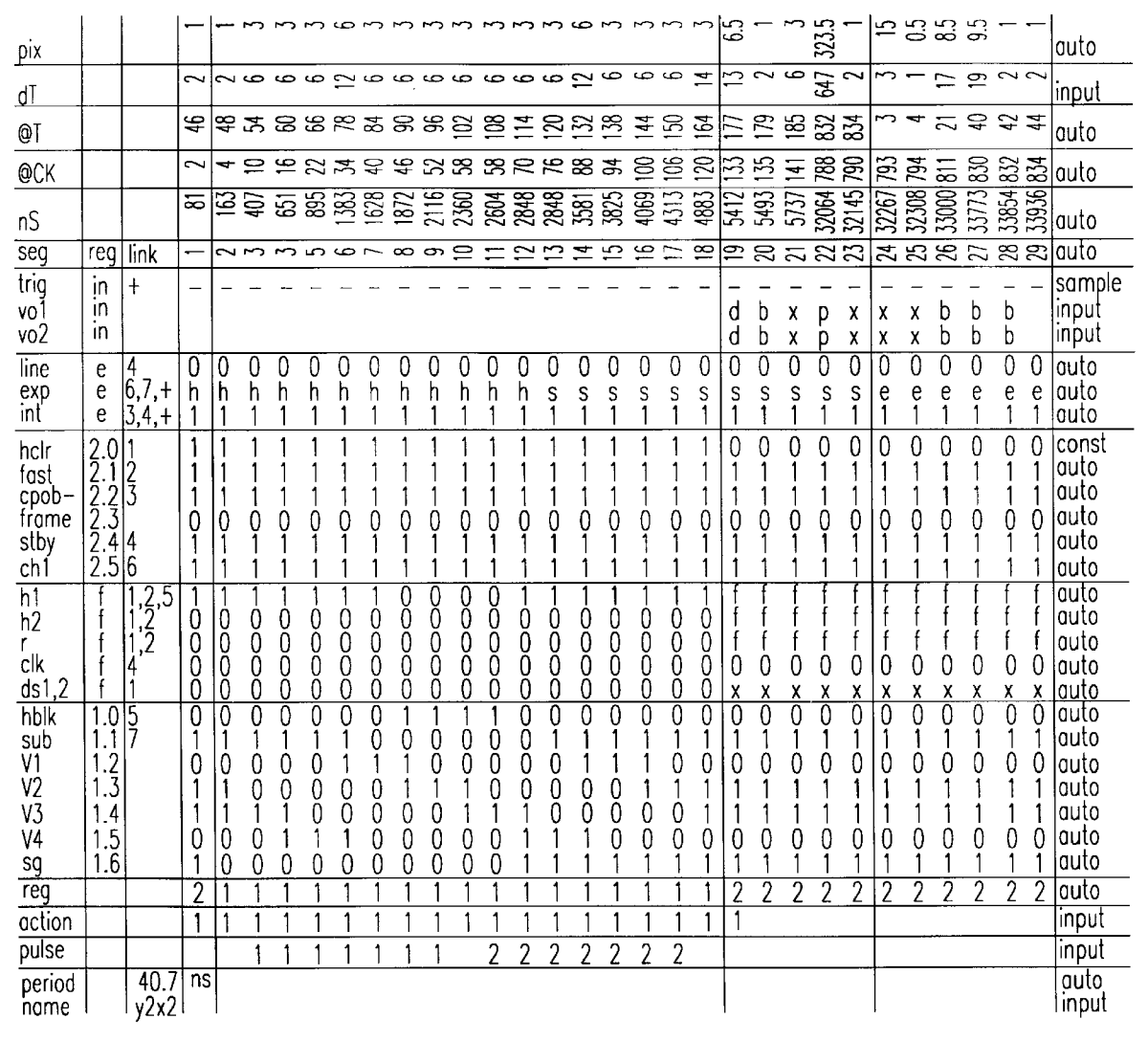
Figure 24I:
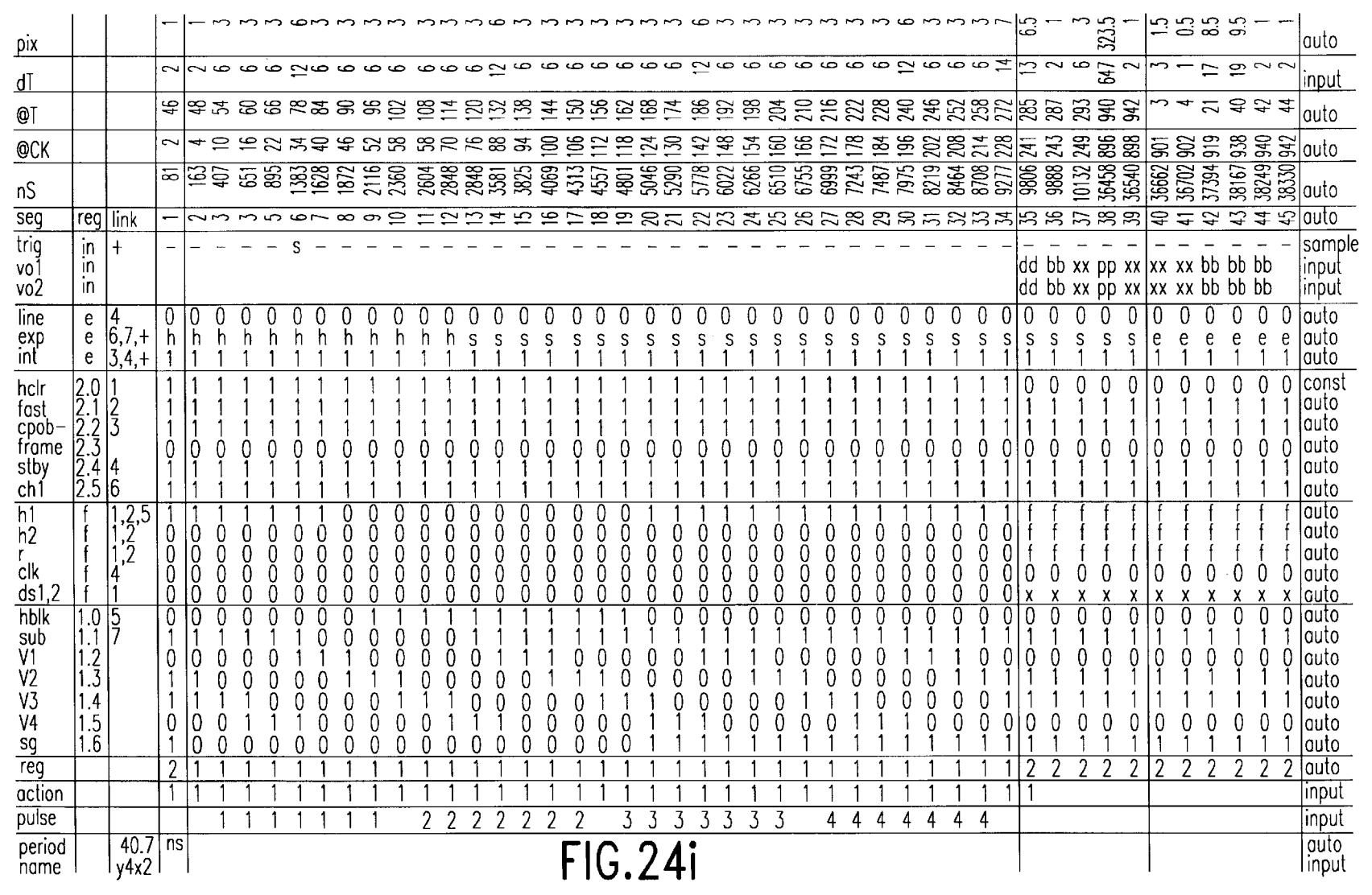

FIGS. 24a–24i show charts of scan line types s1a, s1b, s1c, p1, b2v, b4v, y2x1, y2x2 and y4x2.

DETAILED DESCRIPTION OF THE INVENTION

Figure 1:
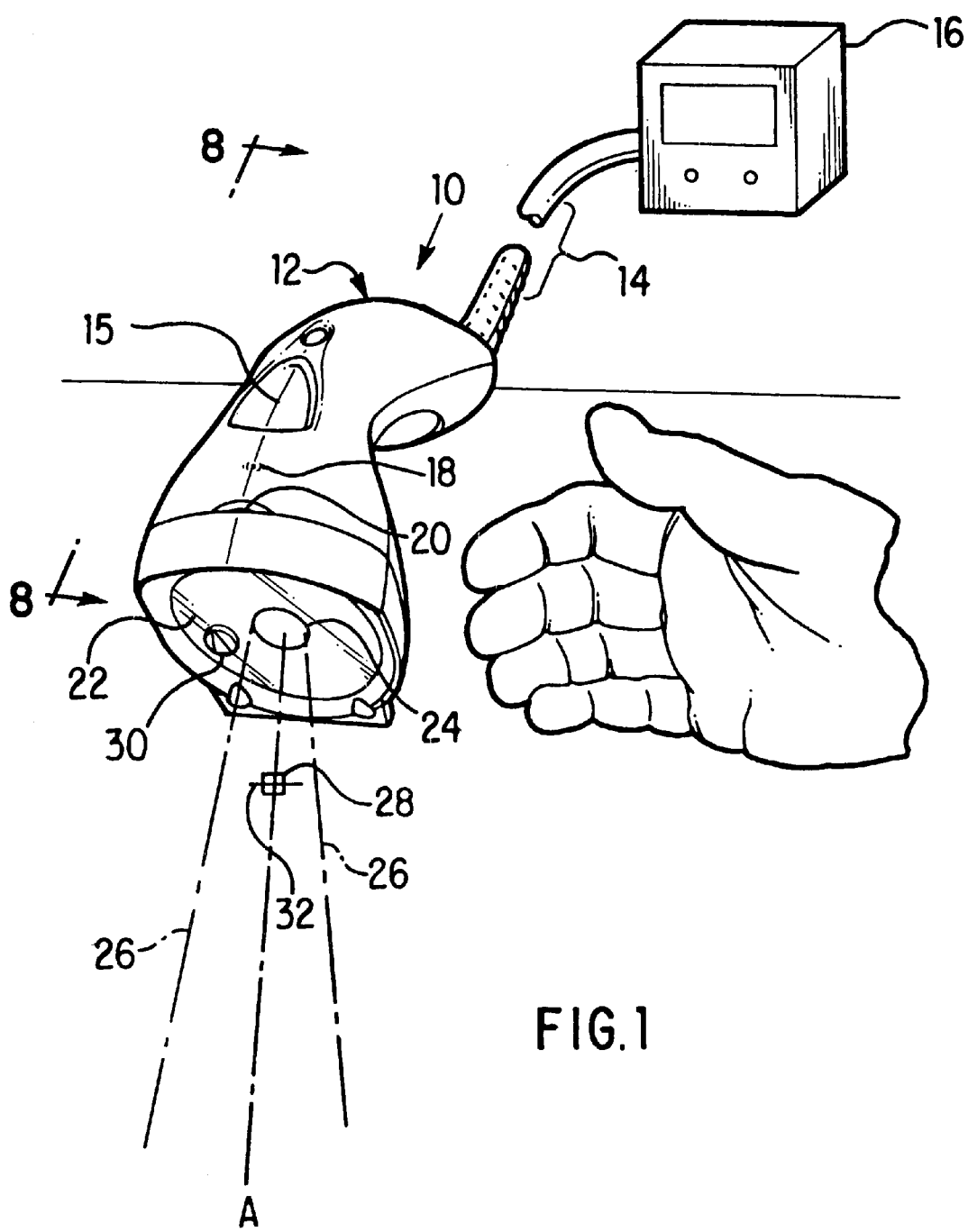
FIG. 1 is a perspective view of the reader according to the present invention.
Figure 2:
FIG. 2 is a plan view of a typical linear type coded symbology.
Figure 3:
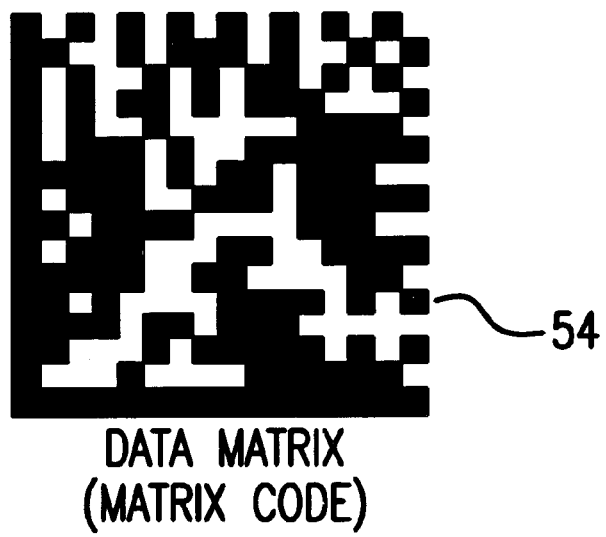
FIG. 3 is a plan view of a Data Matrix symbology.

The hand-held reader 10 shown in FIG. 1 is capable of reading coded symbologies omnidirectionally, and producing decoded data. The scanning device 10 is self-sufficient and does not require an external power source, except for host power provided through an interface cable 14. The scanner 10 can read both linear bar codes 40, as shown in FIG. 2, and matrix or 2D coded symbologies 54 as shown in FIG. 3.

The linear or 2D coded symbologies are standard symbologies well known in the art, and the decoding of them is similarly well known. However, unlike conventional scanners, the reader 10 of the present invention can read both types of symbologies, can operate over a wide range of distances, 1.5 to 16 inches, and is held-held. To achieve these results, the reader 10, upon activation by the user, must be able to target the coded symbology, determine the optimum illumination, determine the optimum focus, and make an image of the targeted coded symbology in an extremely short period of time in order to eliminate possible degrading variations.

For example as the user holds the reader 10 relative to a linear bar code 40 or a 2D coded symbology 54, the reader can move relative to the code thereby changing the focus, illumination and angle of the scanner relative to the code. By performing the entire image capture function as quickly as possible, from the moment targeting is achieved, such variables are minimized. How such rapid image focusing, illumination and capture are performed will be described in detail below.

The reader 10 includes an ergonomic housing 12 designed to fit comfortably in a user's hand. The reader 10 decodes the data, and forwards the decoded data to a computing device platform, such as a PDT, PLC or PC, which performs information gathering as one of its functions. A switch or trigger 15 protrudes through the top of the housing 12 for activation by the user's finger. Lights 18 and 20 are provided on the top of the housing 12 and indicate the active status and successful imaging of the coded symbology, respectively. Audible signals may also be provided.

The hand-held imager 10 utilizes an aiming device to locate the target symbologies in the field of view (FOV). The method of targeting is designed to minimize power consumption. A programmable two-phase trigger is used to acquire the target symbology.

A window 22 having a clear aperture section 24 is provided on the front of the housing 12. A targeting line 32 is produced by a light source in the hand-held imager 10 and is projected onto the targeted coded symbology to ensure that the coded symbology 40 or 54 is within the field of view of the imager 10. The targeting line 32 is preferably a color, such as red, which is discernable from the ambient light sources.

In operation, the user presses the trigger 15 to a first position thereby causing the projection of the targeting line 32 onto the coded symbology. The targeting line 32 is then used to position the imager 10 and the coded symbology relative to one another. The imager 10 then adjusts the illuminating light if necessary, and determines the correct focus. The light 18 is illuminated to indicate to the user that imaging is underway. Upon completion of the imaging process the light 20 turns on to provide the user with an indication of successful scanning.

Referring to FIGS. 2 and 3, a linear code 40 and Data Matrix code 54, respectively, are shown. Typical 2D or Data Matrix symbologies are smaller than linear codes and may be etched directed onto the product. The information is typically encoded in feature sizes of 5, 7.5, or 10 mils. As a result, the imager 10 needs to be much closer when reading 2D symbologies 54 than for linear codes 40.

Figure 4:
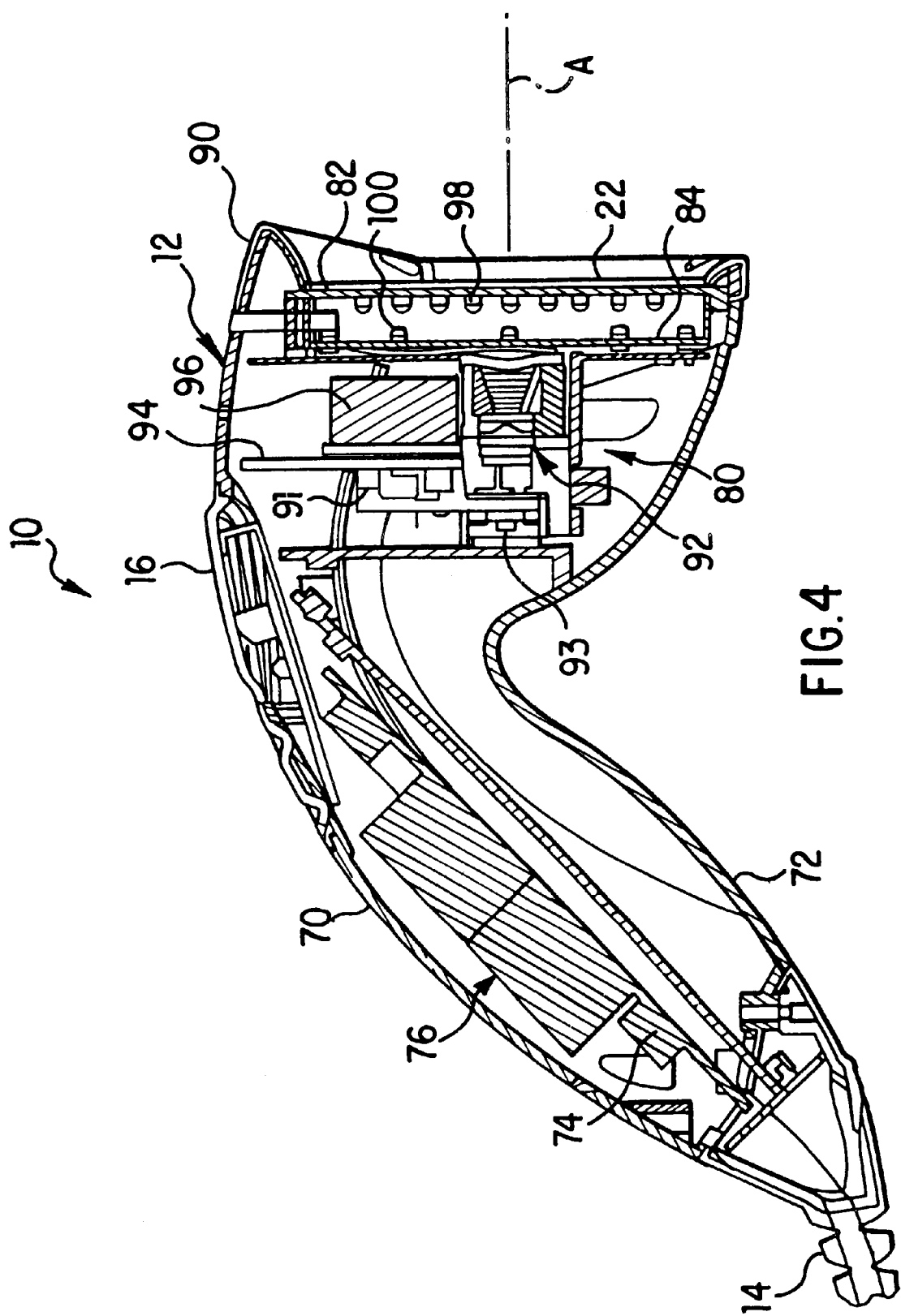
FIG. 4 is a cross-sectional view of the reader shown in FIG. 1 according to the present invention.

The imager 10 is shown in cross-section in FIG. 4, where the optical system 80 is illustrated as including objective taking lens 92 and focusing disk 94. The disk is driven rotational at 600 RPM about axis 91 by the motor 96. The rotational axis 91 is offset from the optical axis $O_A$ of the imaging system 80. A dark field illuminator 82 having multiple light emitting elements 98, such as LEDs, which illuminate rearwardly onto a non-transparent wall, which then provides diffuse light to the window 22. A bright field illuminator 84 is provided with multiple light emitting elements 100 for radiating forward directly through the window 22. Dark field illumination is provided for direct product marking (low contrast), while bright field illumination is used primarily for high contrast label marks.

Built-in bright field and dark field illumination are provided to achieve proper contrast for reading the symbologies on direct product marked parts at close-in distances. Only bright field illumination is used at greater working distances. The details of the illumination system are set forth in co-pending commonly owned patent application Ser. No. 09/151,765 filed on Sep. 11, 1998.

A key aspect of the present invention is the CCD detector 93, positioned along the optical axis $O_A$. The CCD detector 93 is rectangular and has a VGA pixel density. In the preferred embodiment, the CCD detector 93 is an interline 659×494 progressive scan, monochromatic CCD, which may be manufactured by Panasonic Corporation, model #MN37761AE, or a 659×494 pixel CCD manufactured by Sony Corporation, model # ICX084AL. Both of the foregoing CCD's provide 640×480 resolution commonly used in VGA monitors. While the preferred embodiment illustrated herein utilizes a CCD, other array detectors such as CMOS, or other sensors may be used. Furthermore, the CCD need not be limited to 640 by 480 and may have other sizes.

The hand-held imager 10 can decode multiple symbologies on any background, including etched metal and printed ink jet. The paramount reading capability for use on surfaces that are direct product marked is the Data Matrix symbology.

Figure 5A:
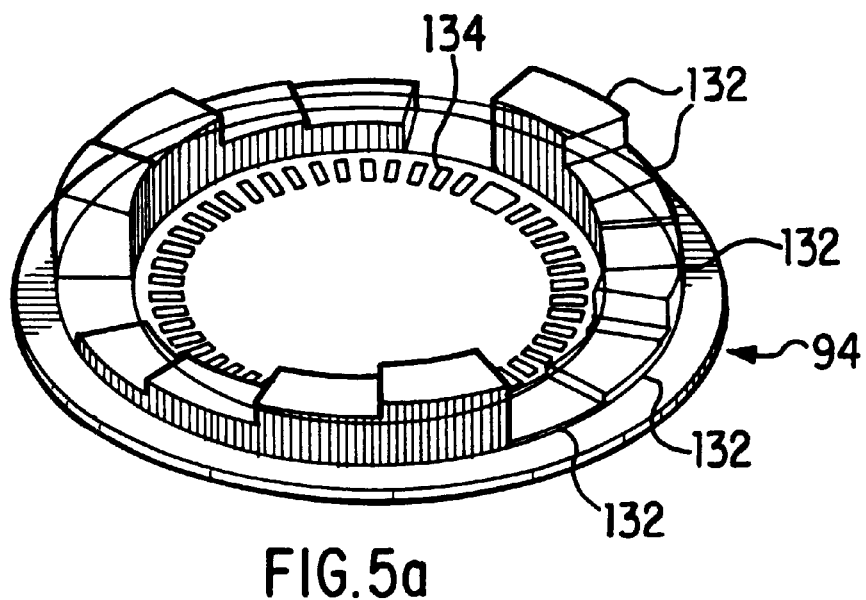
FIGS. 5a–5c is a perspective view of a focusing disk which may be employed in the focusing system of the present invention.

A first embodiment of the focusing disk 94, shown in cross-section in FIG. 4, is shown in greater detail in FIG. 5a. The disk 94 has a series of different thickness optical positions 132. The thickness of the optical positions 132 is varied to focus the objective lens 92 onto the CCD detector 93 during image capture. The illustrated embodiment shows twelve optical positions 132 which thereby provide twelve potential focus ranges. A positional encoding strip 134 is provided on the disk 94 so that the position of the disk can be tracked.

Figure 5B:
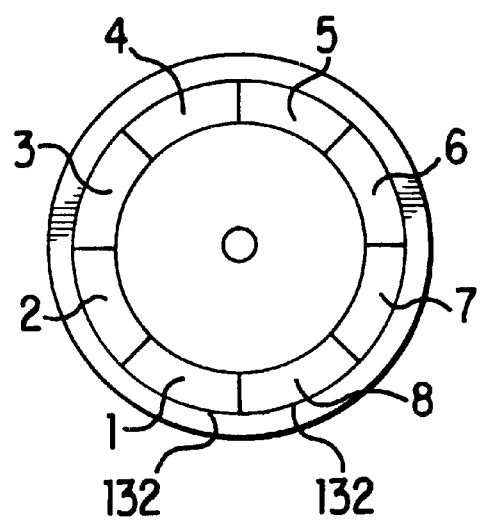
Figure 5C:
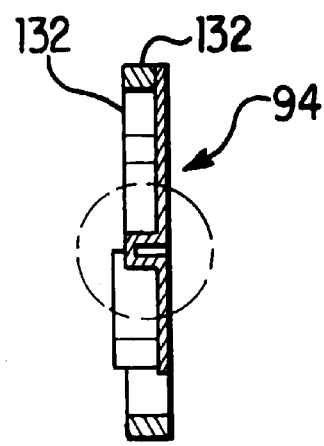

Referring to FIGS. 5b and 5c, planar and cross-sectional views of a second embodiment of the focusing disk 94 is shown. The second embodiment has eight optical positions 132 and further includes an outer circumferential wall 136 which provides additional structural support.

The CCD detector 93 is utilized to determine which optical plate 132, and therefore which focusing zone, is appropriate for a particular coded symbology scan. As the disk 94 is rotated, the illuminating light is reflected back through the objective lens 92 through each of the optical positions 132 and onto the CCD detector 93. In order to minimize the time it takes to focus the imager 10, only a fraction of the pixels of the CCD detector 93 are employed in the determination of the optimum optical plate, and thereby the focused optical plate.

From start up, the imager 10 produces target illumination, then takes approximately 25 to 30 milliseconds to reach the rotational speed of 600 RPM. The CCD then powers up and then resets. Multiple, up to five, images are taken for photometry, and multiple images are taken for focusing. Each image requires exposure time and shift out time, which is in the range of, but no greater than 5.5 mS. After the optimum optical plate is repositioned in the optical path the CCD detector must capture and shift out the entire image in about 31.4 milliseconds. The total time for the entire operation is therefore less than half a second, which is sufficient to minimize the variable factors discussed previously.

The aforementioned variations are more detrimental to photometry than to focus analysis. In order to minimize the variations, the present invention employs a number of techniques to accelerate the operation. First, the imager operates in a "fast mode." A small size slice of an image, 384 by 10, is utilized, 384 being over 60% of the image width, and 10 scan lines is more than two times the minimum cell size requirement (4 pixels). This ensures than a transition will be encountered in the image slice, while having as small a size a feasible. The search for the proper exposure time uses seven images, but the use of only five images is contemplated, which will require no more than 30 mS. The optical disk 94 can be separated into two groups of optical positions 132, for Dark field and Bright Field images.

The maximum time to decode a printed label is 350 milliseconds, while the maximum time to decode a direct product marked code is 400 milliseconds. The foregoing times include the time, from the trigger is activated, to illuminate, focus, acquire the image, decode the symbology, and output the decoded data.

If all 325,546 pixels of the CCD detector 93 were used for each optical plate 132 of the focusing disk 94, the image capture procedure would take far too long. To minimize the time required to obtain data for each optical plate 132, only a portion of the CCD detector 93 is used. In operation, the CCD detector 93 generates image data as 494 lines, one line at a time, each line being 659 pixels long. The first 246 lines, instead of being digitized which would require significant time, are "dumped." Furthermore, to accelerate the process, the speed at which the data is sent through the CCD is much faster than the speed used for normal image capture. Since the information contained in the first 246 lines is not important to the focusing steps, the degradation of such information, due to the accelerated reception, is not a detriment.

The next ten lines, lines 247–256 are utilized in the analysis described below, and then the CCD detector 93 is reset, never reading lines 257–494. In this manner, the focusing time is more than halved.

Figure 15:
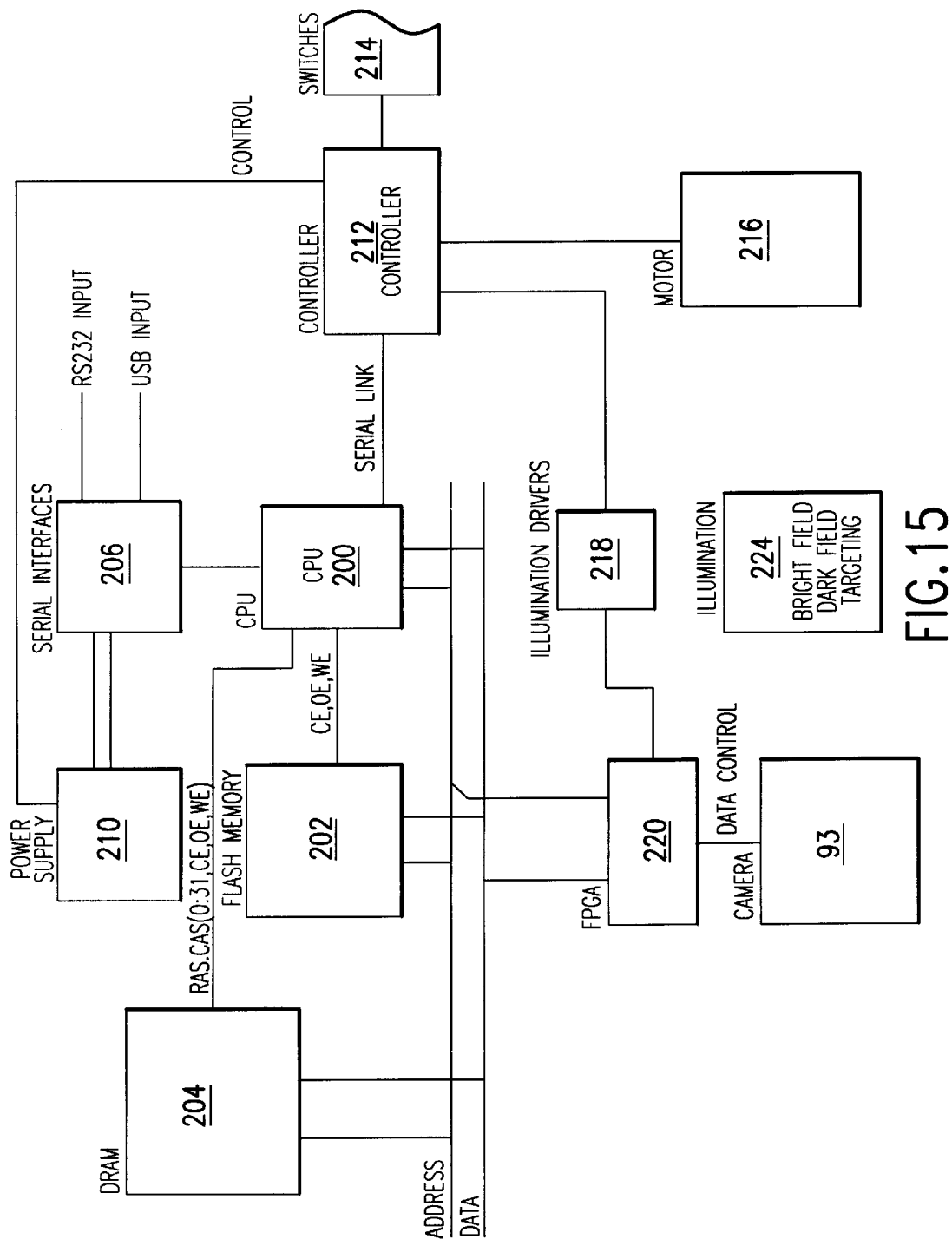
FIG. 15 is a block diagram of the imager according to the present invention.

Referring to FIG. 15, a block diagram of the imager 10 of the present invention is illustrated. The CPU 200 connects to the flash memory 202 and DRAM 204, which together form the computing engine for the imager 10. The CPU 200 further connects to the serial interfaces 206, which in turn is connected to the power supply 210. A microcontroller 212 is connected by serial link to the CPU 200, and in turn is connected to the power supply 210, switches 214, motor 216 and illumination drivers 218. The Illumination drivers 218 are connected to the Bright Field and Dark Field and Targeting Illumination, shown as Illumination 224 in FIG. 15. An FPGA 220 is connected to the CPU 200, the flash memory 202, DRAM 204, illumination drivers 218 and CCD 222. The FPGA 220 controls the CCD and the Illumination 224. The FPGA 220 and microcontroller 212 control the targeting. The Motor 216 drives the focusing disk 94.

In order to evaluate the image data for each optical plate 132, the ten middle lines of data need to be analyzed. The transitions between light and dark areas of the code are critical for such analysis. Furthermore, it is important to note that in the determination of which optical plate provides the best focus and illumination, the quality of the images relative to one another is what is important, not the absolute image quality. The imager 10 is designed to achieve correct decoding of the coded symbology targeted with the minimum necessary focusing, not perfect focusing which would require considerably more time and/or complexity.

As an example we will traverse a scan line from left to right. For the examples in FIGS. 7–14 we used a minimum peak to peak value of 12. This means that a relative white pixel must be greater than a relative black pixel by a magnitude of 12 for it to be considered a white pixel relative to that black pixel, but other values may be used depending on the application. We will first look for a local minimum. We choose a new minimum when the current pixel is less than the previous minimum. We stop looking for a minimum and start looking for a maximum when we find a pixel with a value greater than or equal to the minimum pixel plus 12. We then continue looking for a maximum until we find a pixel that is less than or equal to the current maximum minus 12. When this occurs we have a local minimum, a local maximum, the magnitude of the difference and the number of pixels between the minimum and maximum points. The magnitude of the difference or peak to peak value is used as the index to the bin number of the edge histogram that should be incremented by one. The number of pixels between the peaks is used as the index to the bin number of the frequency histogram that should be incremented by one. This sequence is repeated for the remainder of the scan line.

Referring to FIG. 7a, point A is the first local maxima. Point B is the first local minima. Point C is an inflection recognition point, meaning you know you are done looking for a local minima because you are more than 12 above the value at point B. You can then evaluate the pair AB. For the pair AB, the frequency corresponds to $|X(A)-X(B)|$, while the peak to peak value corresponds to $|Y(A)-Y(B)|$. Point D is not a local minima because it is not at least 12 less than point C1, an inflection point between points B and D. Point E is the second local maxima, pont F is the inflection recognition point for the pair BE. Point G is the second local minima and point H is the third inflection recognition point corresponding to the pair EG. Point I is the third local maxima.

Figure 6A:
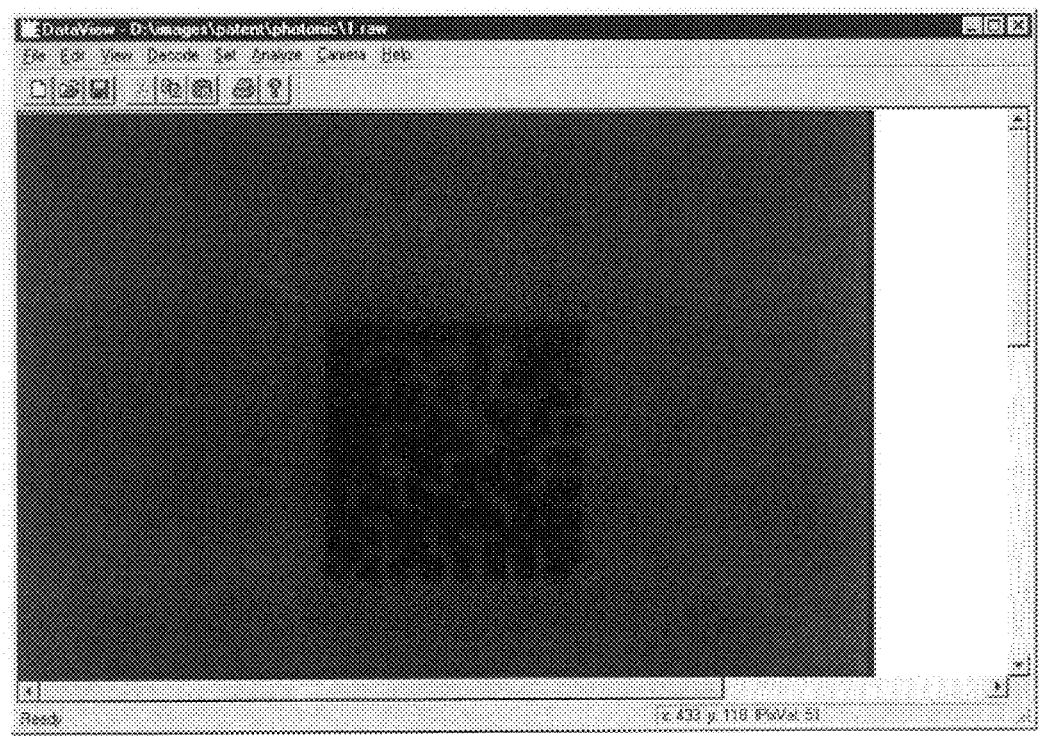
FIGS. 6a–6k are represent eleven images p1–p11, where images p1–p6, shown in FIGS. 6a–6f, are used in the phototonics or photometric analysis, and images p6–p11, shown in FIGS. 6f–6k, are used in the focus analysis.
Figure 6B:
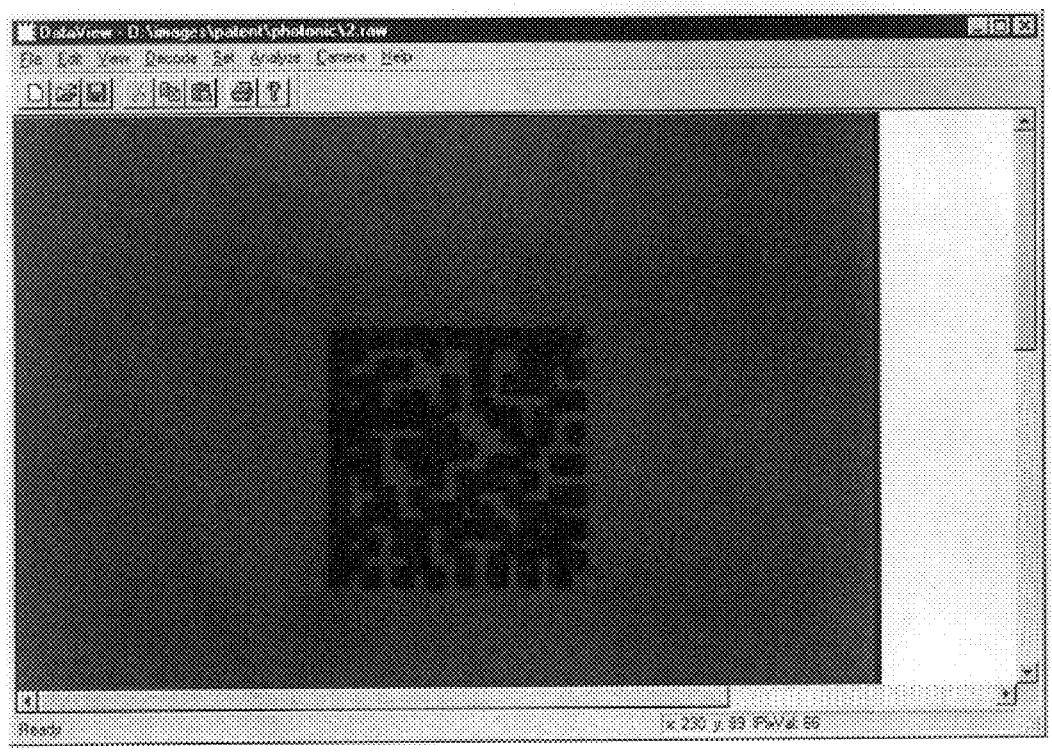
Figure 6C:
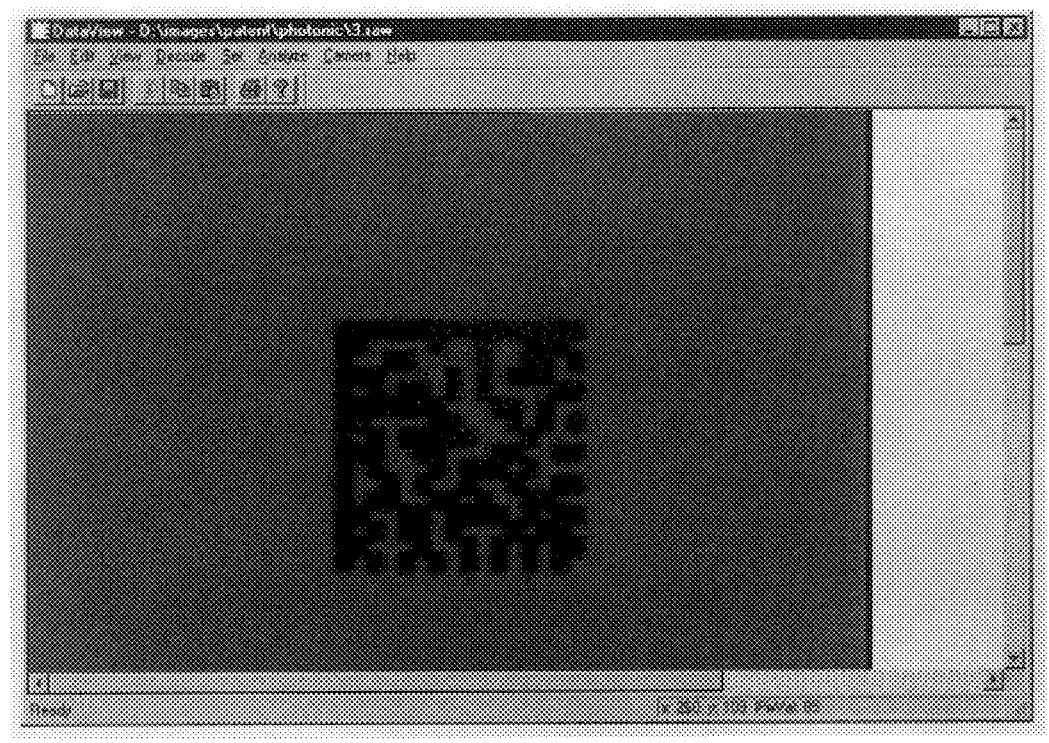
Figure 6D:
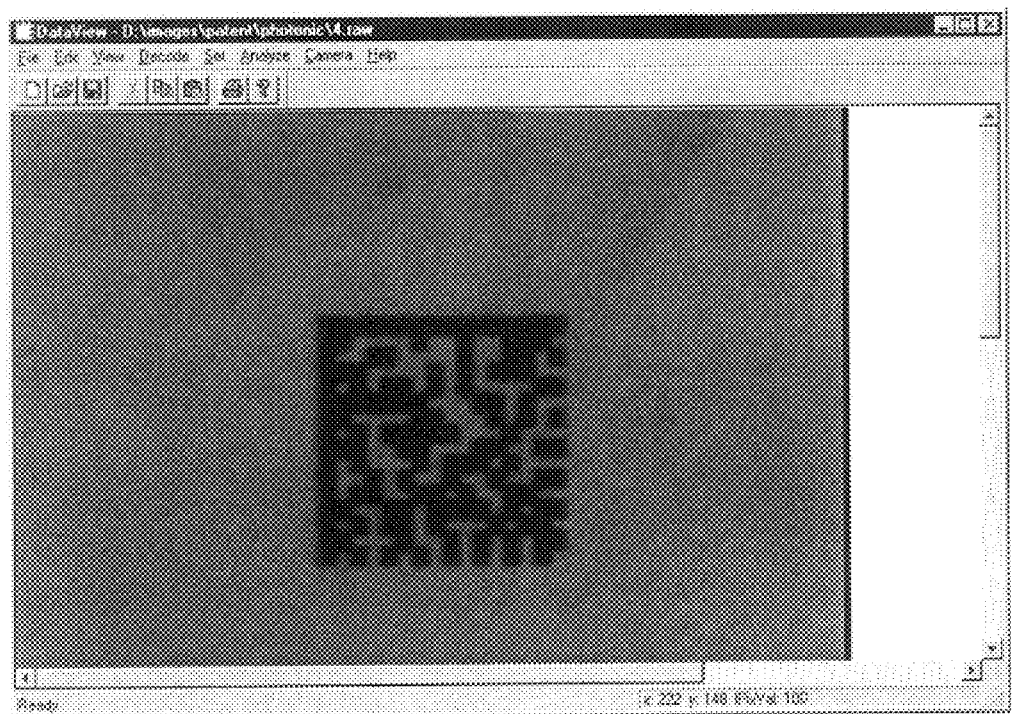
Figure 6E:
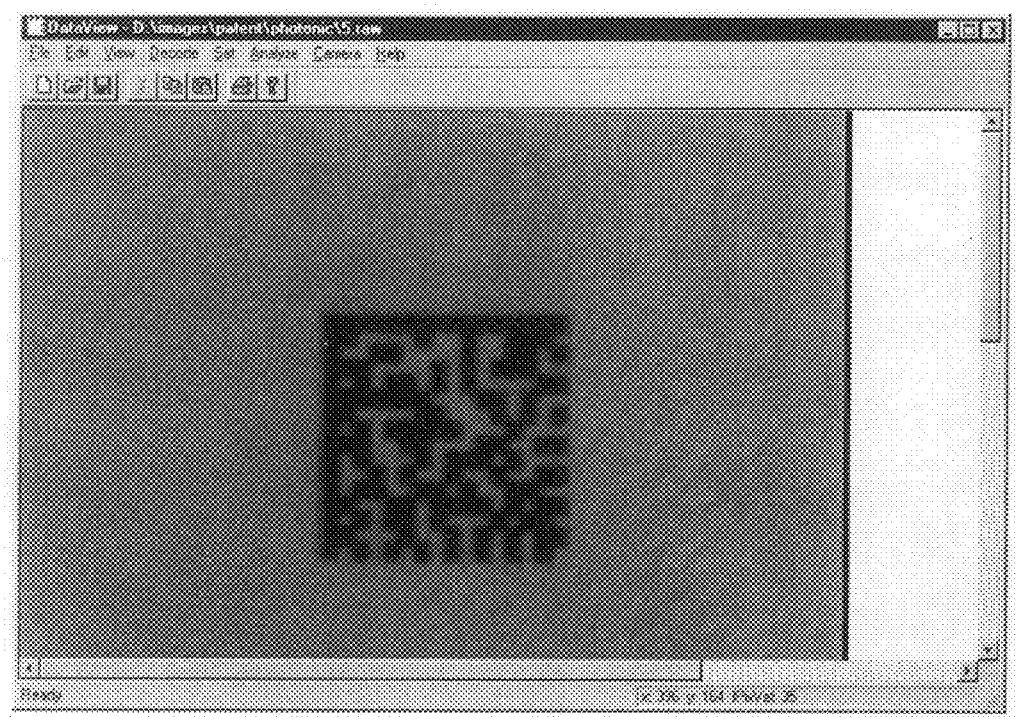
Figure 6F:
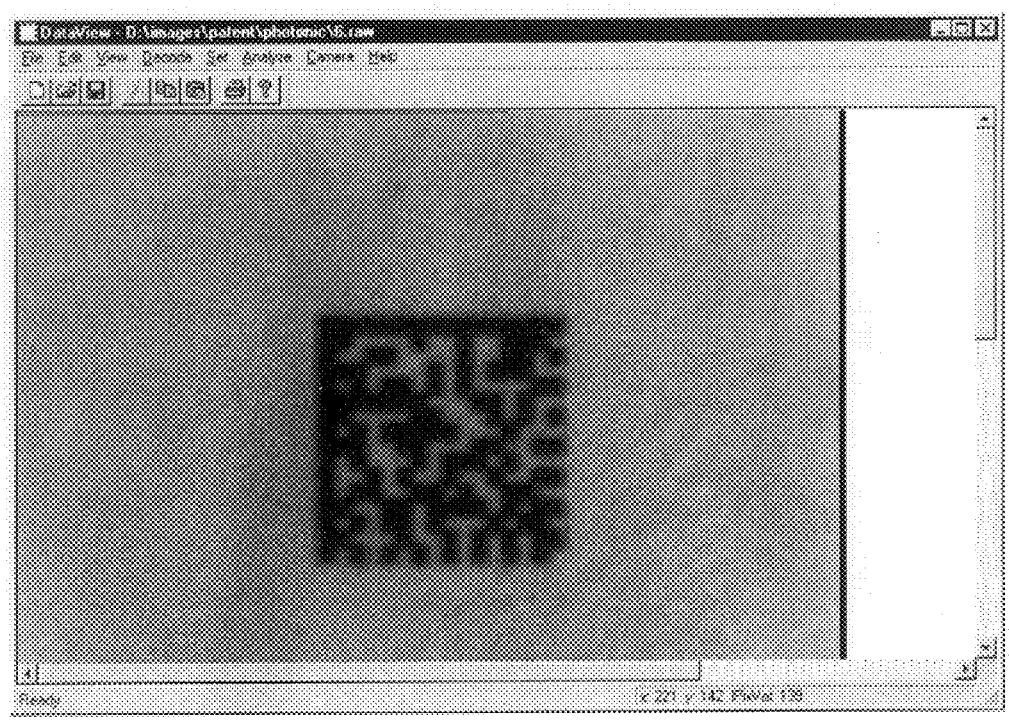
Figure 6G:
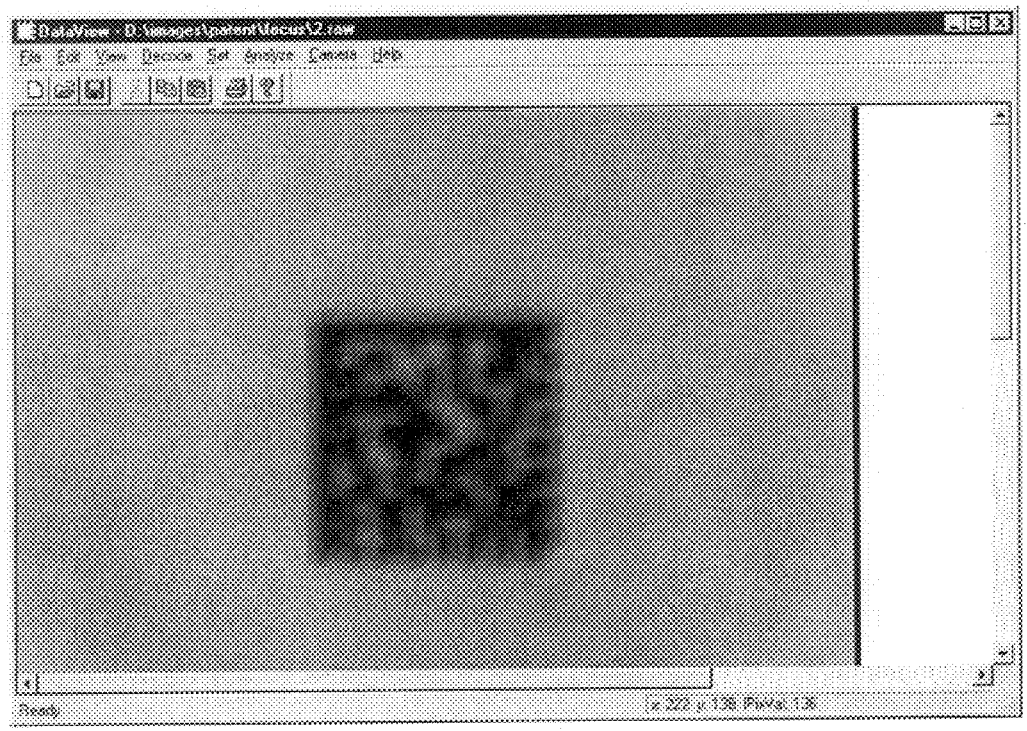
Figure 6H:
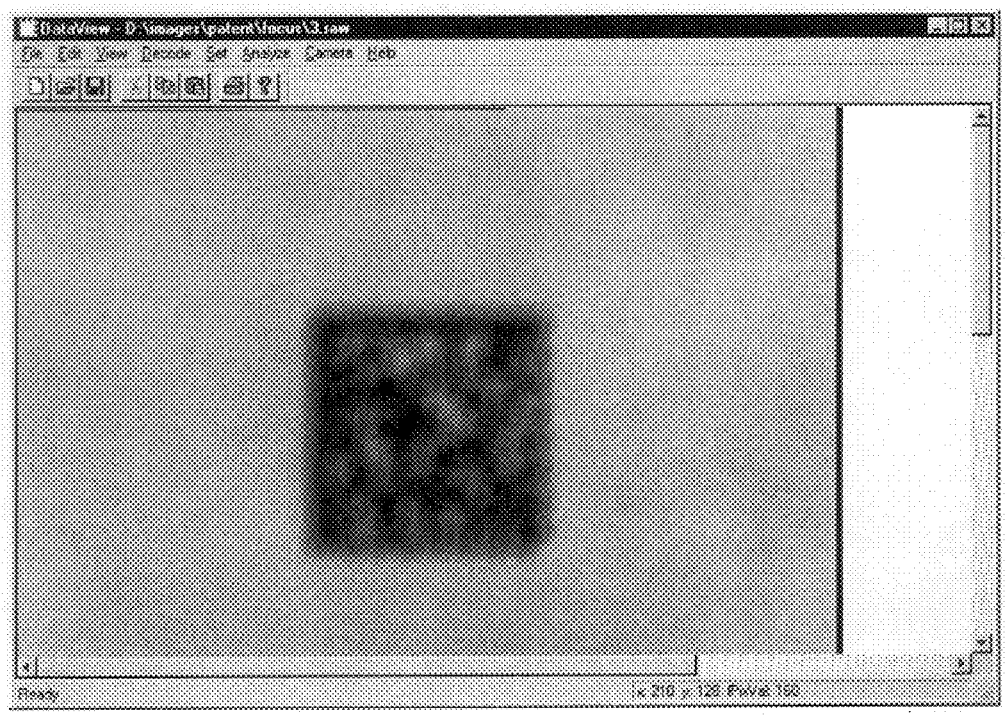
Figure 6I:
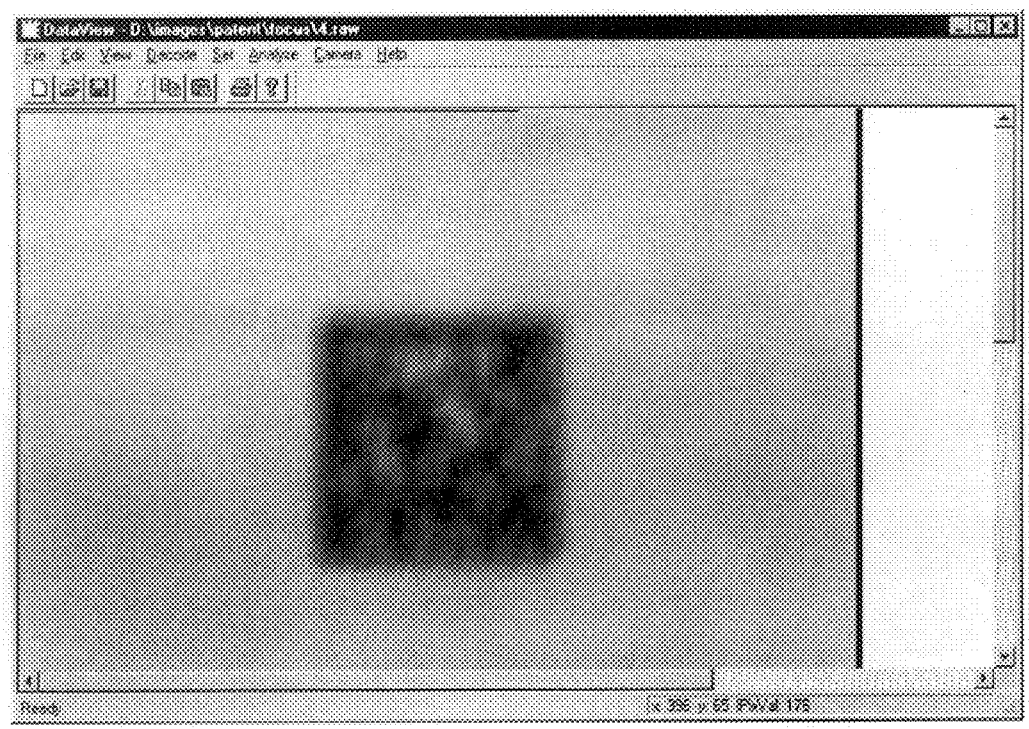
Figure 6J:
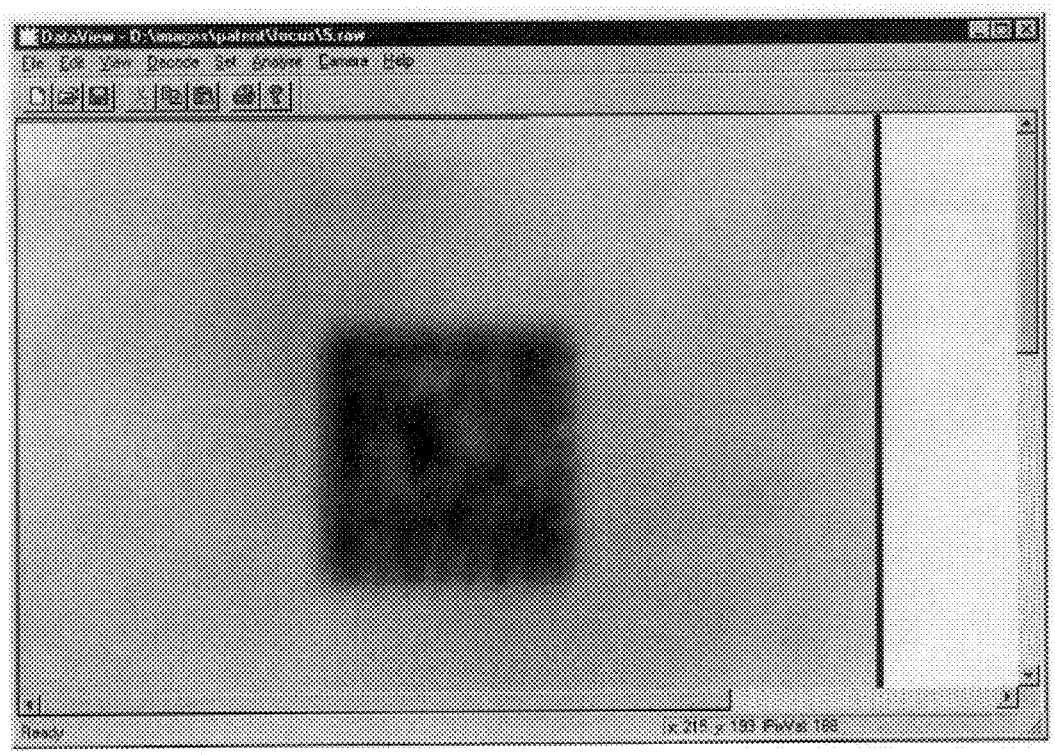
Figure 6K:
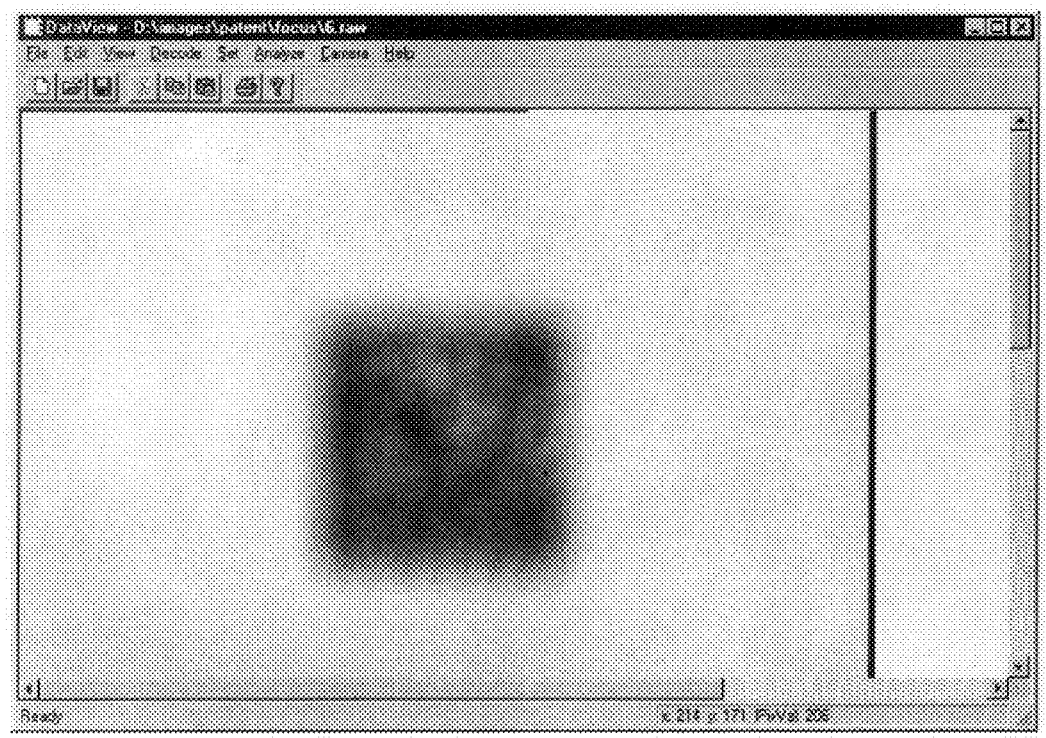
Figure 7:
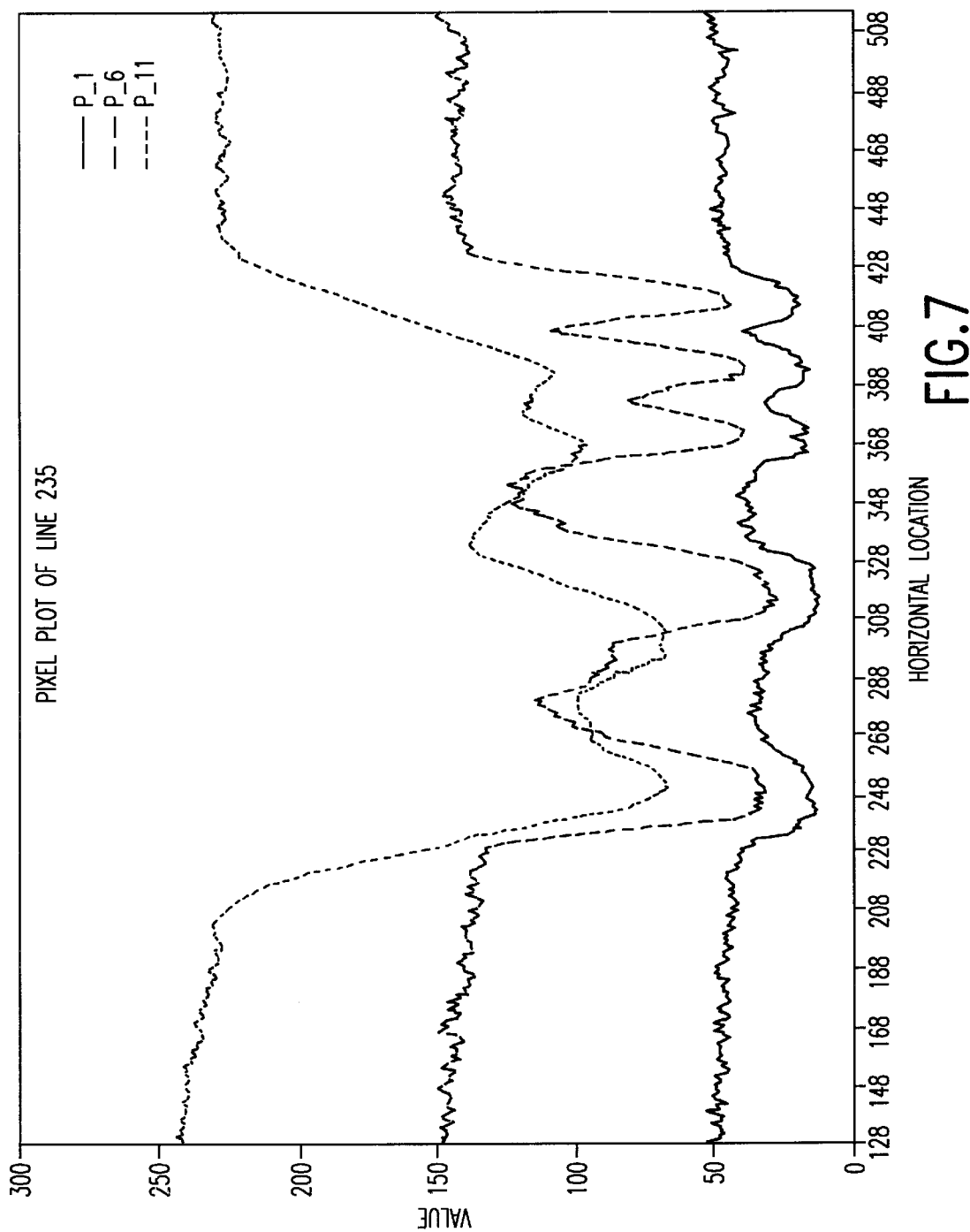

For illustrative purposes, FIG. 7 shows a pixel plot of line 235 of the CCD for the values between 128 and 508, in the horizontal location, for images p1, p6, and p11, shown in FIGS. 6a, 6f and 6k. The three images are shown by three different lines, p1 is shown by the solid line, image p6 is shown by the dashed line, and image p11 is shown by the dotted line.

The data from which the pixel plots of FIG. 7 are drawn is shown in Table A, shown in FIGS. 8a–8h, and includes the values for each horizontal location within the field. From FIG. 7, it can be clearly seen that the image p6 has the best transitions.

Illumination analysis is performed by developing entropy scores for each illuminating condition. The quality or nature of the transitions (peak-to-peak) values are taken into account by this analysis. In an edge histogram the y axis is the population or number of transitions, and the x axis represents the peak-to-peak value.

FIGS. 6a–6k represent eleven images p1–p11. Images p1–p6, shown in FIGS. 6a–6f, are used in the following photonics or photometric analysis, and images p6–p11, shown in FIGS. 6f–6k, are used in the following focus analysis.

Figure 9:
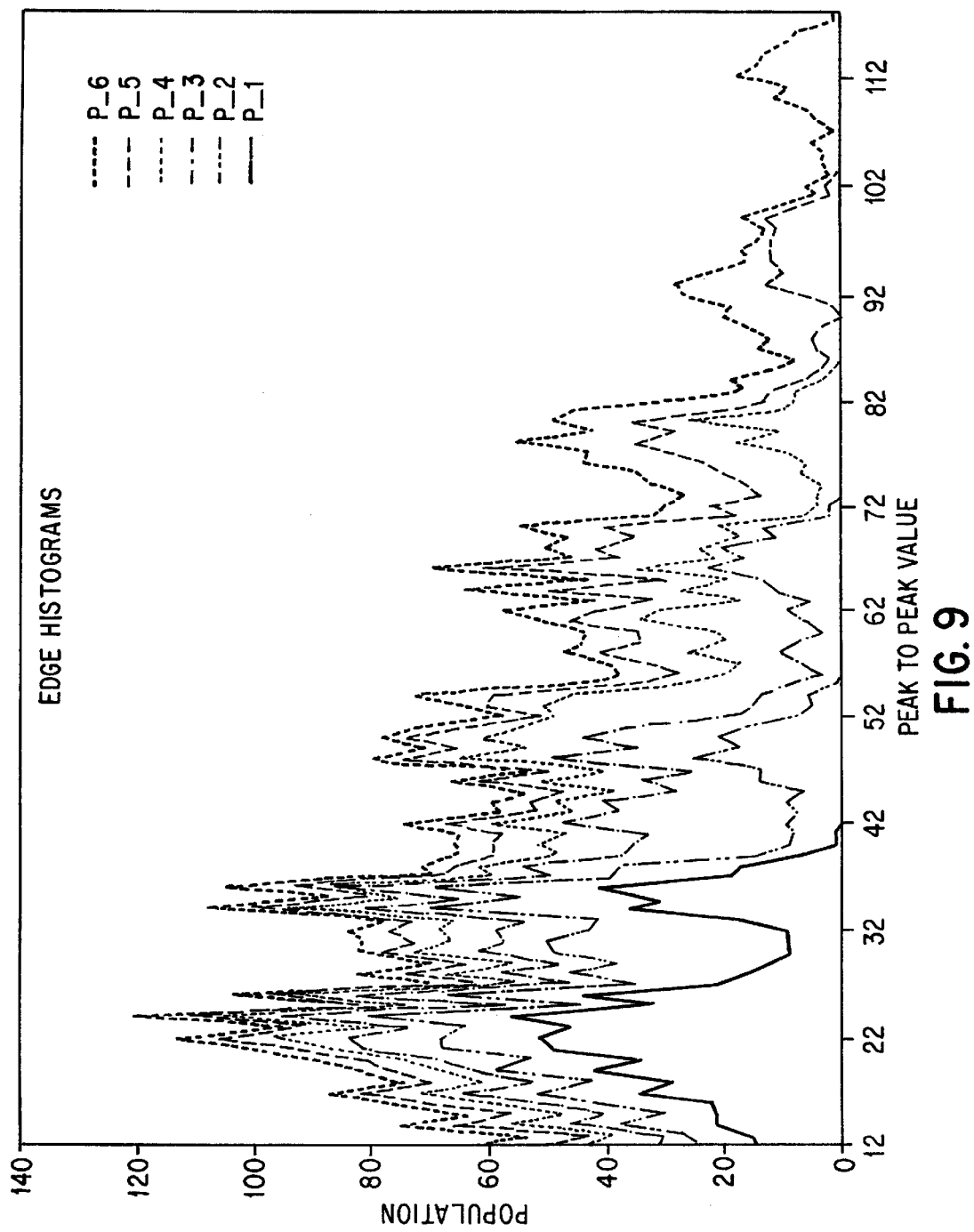
FIG. 9 is an edge histogram for images p1–p6, shown in FIGS. 6a–6f.

Referring to FIG. 9, an edge histogram is illustrated for images p1–p6, shown in FIGS. 6a–6f. FIGS. 10a–10e show Table B which contains the population for each peak-to-peak value of each image p1–p6. The images p1–p6 are illustrated by different shaded areas in FIG. 9. The peak-to-peak values begin at 12, since, as shown in FIG. 10a, the first population value does not occur until 12 for image p1. Similarly, FIG. 9 ends with value 118 for image p6. The remaining values up to 255 are all zeros in the example shown in FIG. 9, and therefore are not illustrated. The entropy score, maximum pixel value and minimum pixel value for each image p1–p6 are shown in FIG. 11, with the entropy score being the total of the population values for each image. The entropy values individually have no meaning. Rather, a comparison of the entropy values with one another shows which image has the highest entropy value. Here it is image p6 with a value of 758. With reference to FIG. 9, it is clear that image p6 has the largest area under its curve, which is represented by the entropy value. From the forgoing, it can be seen that image p6 has the best illumination.

The maximum and minimum pixel values are obtained from the average of the brightest 20 and the average of the dimmest 20 values, respectively. These maximum and minimum pixel values can be used to determine if the image meets minimum criteria for usability.

The entropy score is not used by itself, and in particular when an image is over-saturated. In that instance, the signal has reduced the peak-to-peak values, and has fewer edges than an under-saturated image.

To perform the optical plate focus analysis the microprocessor concerns itself with the rate of change of energy between neighboring pixels of image data. If all transitions are plotted in a two dimensional histogram, a graph can be generated to produce a score for determining the optimum focus. The x axis represents the number of pixels between local maxima and minima, and the y axis represents the population.

Figure 12A:
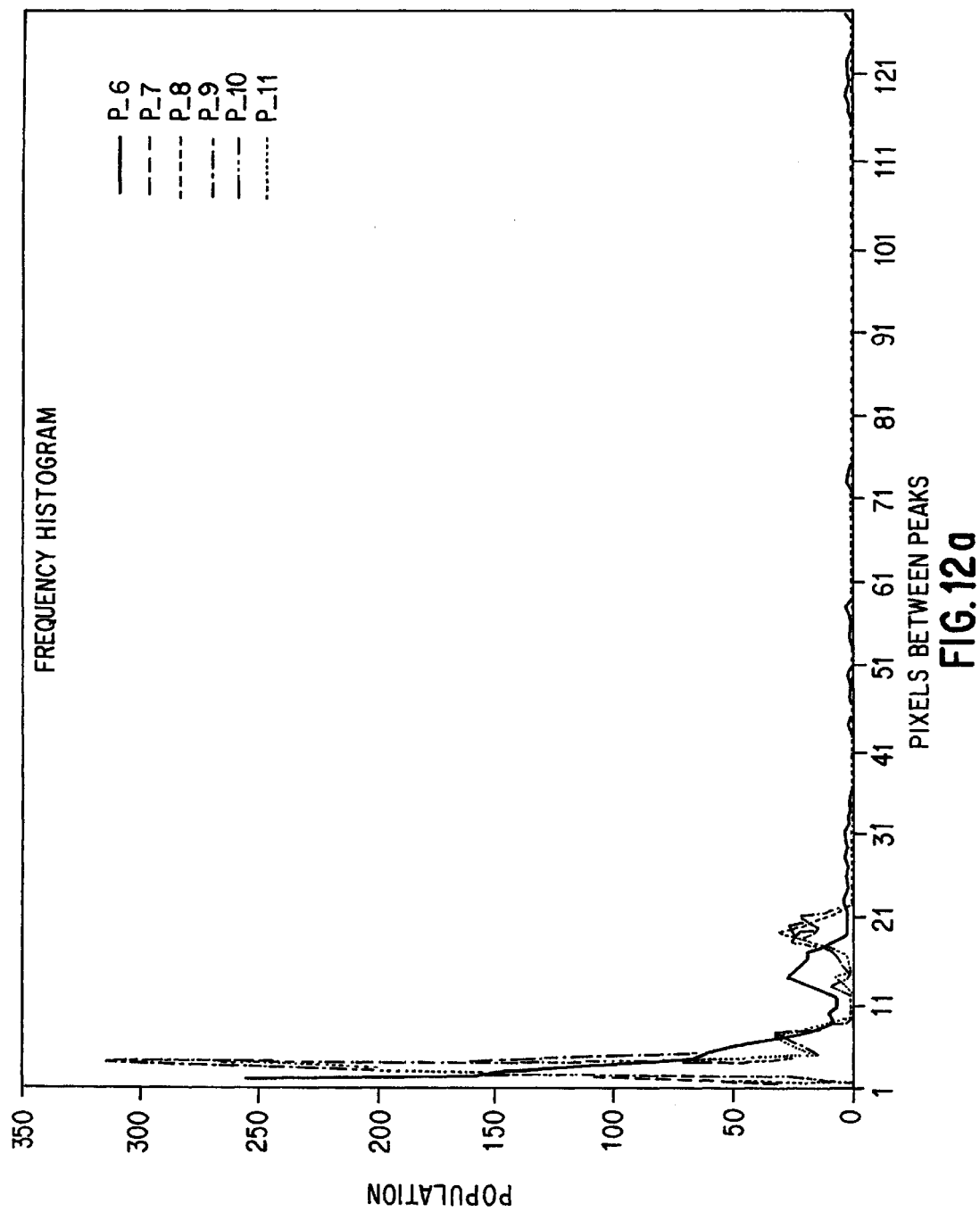
Figure 12B:
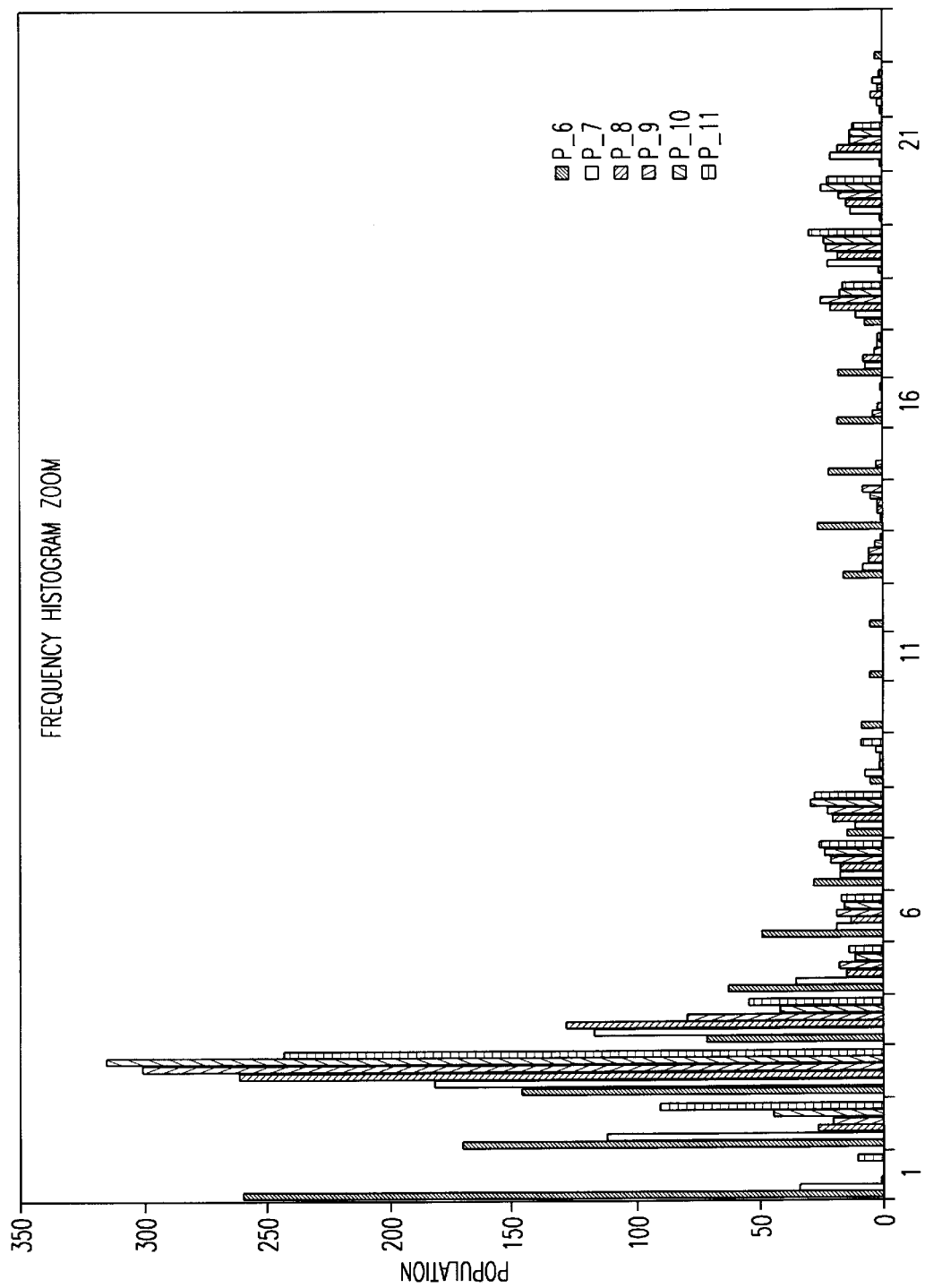

FIGS. 12a–12b are frequency histograms for images p6–p11, shown in FIGS. 6f–6k. The number of pixels between peaks are plotted on the x-axis in a range of 1 to 123. 123 is the highest value having a population, for image p6, as shown in Table C in FIGS. 13a–13e, which provides the population values for the number of pixels between peaks. Reviewing FIG. 12a, it can be clearly seen that most of the data appears in the first 25 values on the x-axis, and therefore these values are shown in the enlarged portion of the histogram shown in FIG. 12b.

A focused image has a sharp contrast between light and dark areas. An out of focus condition is represented by the loss of high frequency components. Therefore, the image with the highest population density at high frequency indicates the best focus. The data represented in FIGS. 12a and 12b is shown in Table C of FIGS. 13a–13e. Unlike illumination, the determination of the optimum focus does not use the entire population. Rather, only the first seven values are used to develop the entropy scores, shown in FIG. 14. Since slow edges are represented by low frequency values, only the first seven values are needed. According to FIG. 14, image p6 has the highest entropy score of 894, indicating that it is the best focused image.

During image capture and decoding operations, the imager 10 draws approximately 200–500 milliamperes of constant power at 4.2–5.25 V. Where the imager 10 interfaces with a portable data terminal (PDT), 4 to 6 V is normally specified at 200–500 mA, while the universal serial bus (USB) interface is specified at 4.2 to 5.25 volts at 100–500 mA.

Figure 16:
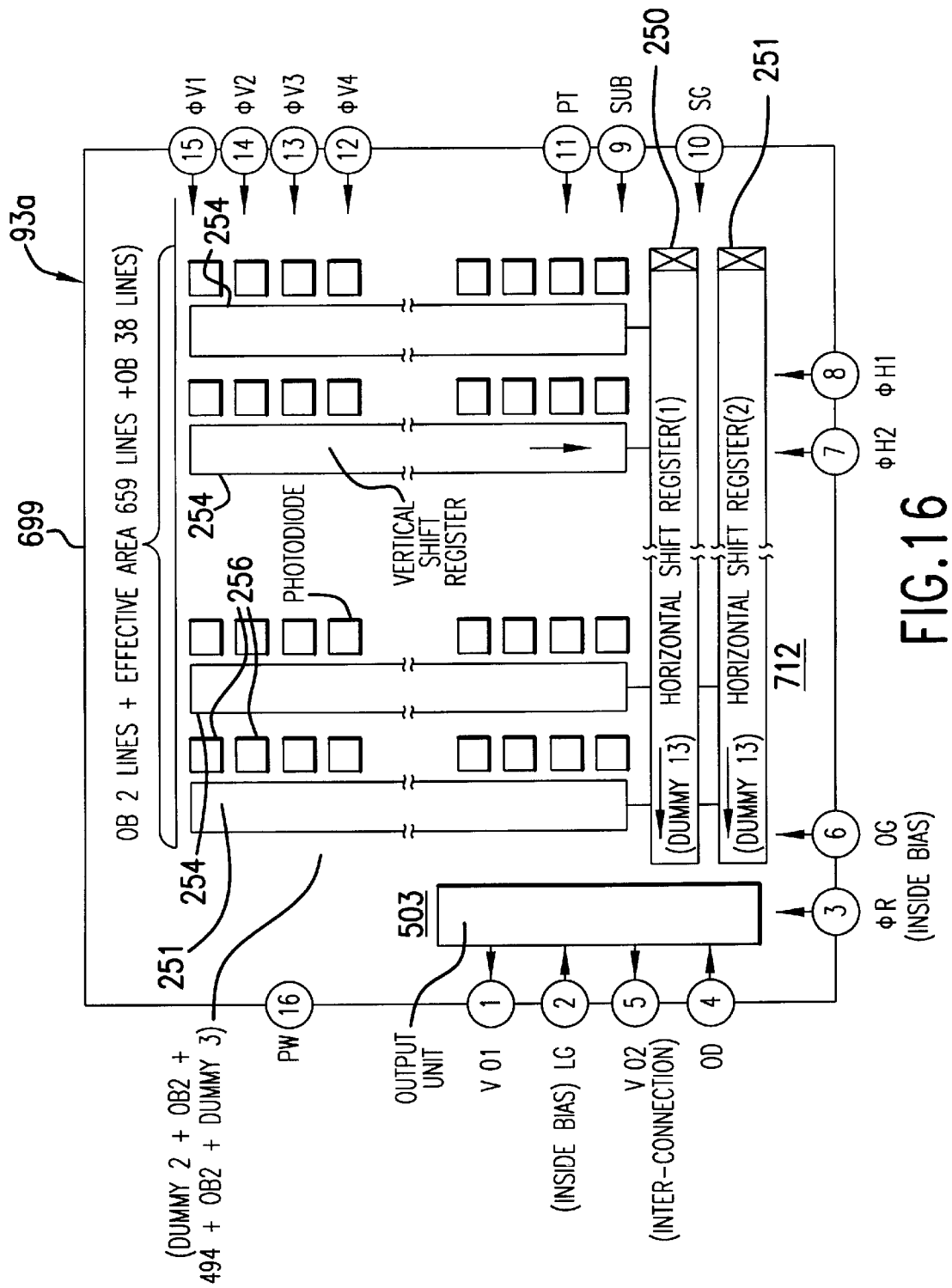
FIG. 16 is a block diagram of a Panasonic Corporation model # MN37761AE CCD.

Referring to FIG. 16, a block diagram of the Panasonic Corporation model # MN37761AE CCD 93a is shown. The CCD 93a comprises two horizontal shift registers 250 and 251, six hundred and ninety nine (699) vertical shift registers 254, and 351,597 photodiodes or pixels 256. Each of the 699 vertical shift registers 254 is connected to five hundred and three (503) of the photodiodes 256. For each vertical shift register 254, the first two of the photodiodes 256 are dummy diodes, the next two are optical black, the next four hundred and ninety four (494) diodes are the useful field, the following two photodiodes 256 are optical black, and the last three (3) photodiodes 256 are dummy diodes.

The first (2) and last thirty eight (38) vertical shift registers 254, are optical black, leaving an effective area of six hundred and fifty nine (659) lines, formed from the central 659 vertical shift registers 254. Each horizontal shift register 250 and 251 is 72 long and receives thirteen (13) dummy inputs, followed by the 699 outputs from the 699 vertical shift registers 254. Thus, the foregoing arrangement yields a resolution of 659 by 494.

The CCD 93a is different from typical CCD's in that it has the two horizontal shift registers 250 and 251, where one such horizontal shift register is the normal. For example the Sony mode # ICX084AL CCD has only one horizontal shift register. The Sony CCD employs vertical clocking to eliminate charge on the vertical CCD. On the other hand, the Panasonic CCD 93a shifts charge from the vertical shift registers 254 to the horizonal shift registers 250 and 251, and then shifts the charge out of the horizontal shift registers 250 and 251.

Figure 17A:
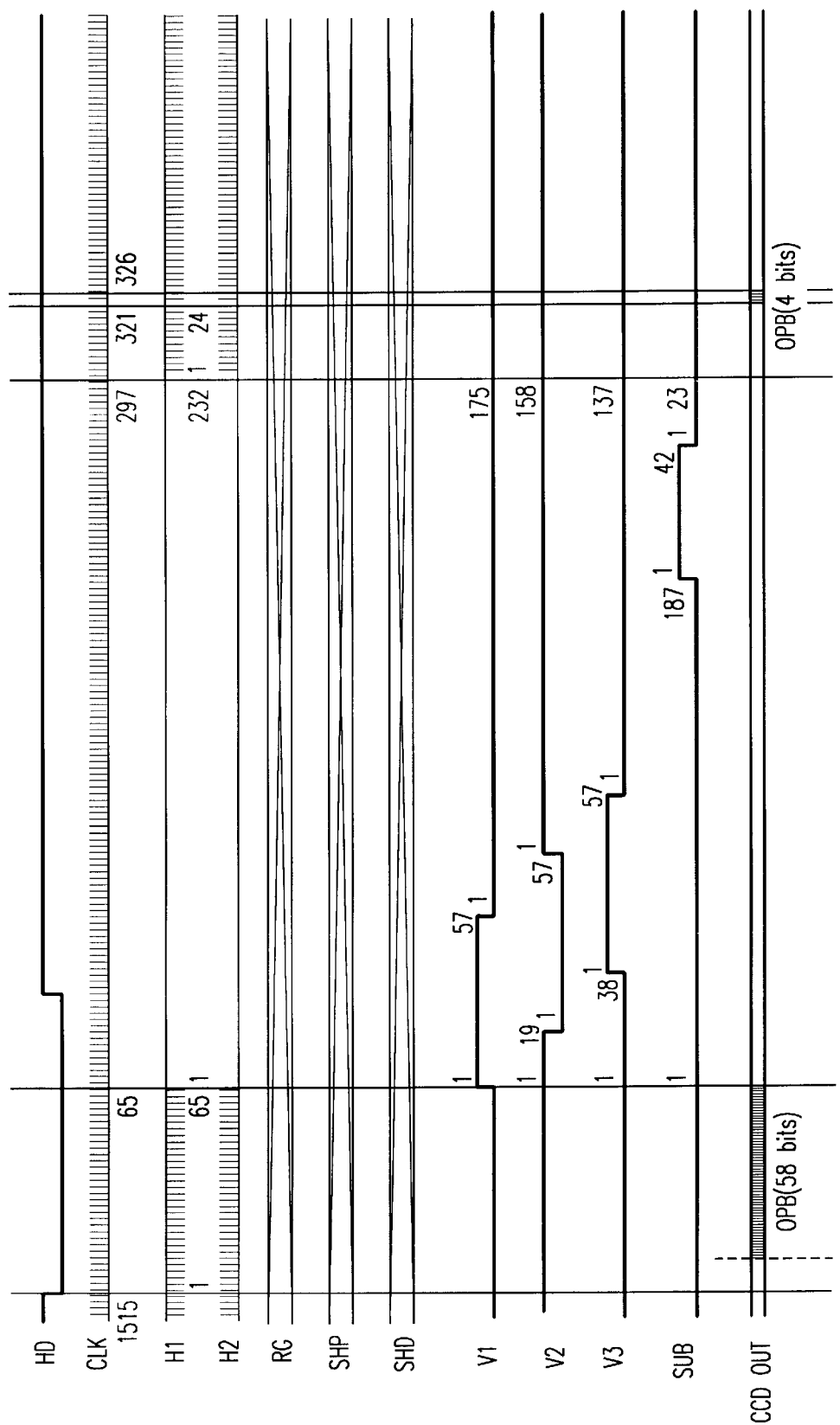
FIGS. 17a and 17b illustrate the vertical drive timing chart for the Sony CCD #ICX084AL in normal speed readout mode.
Figure 17B:
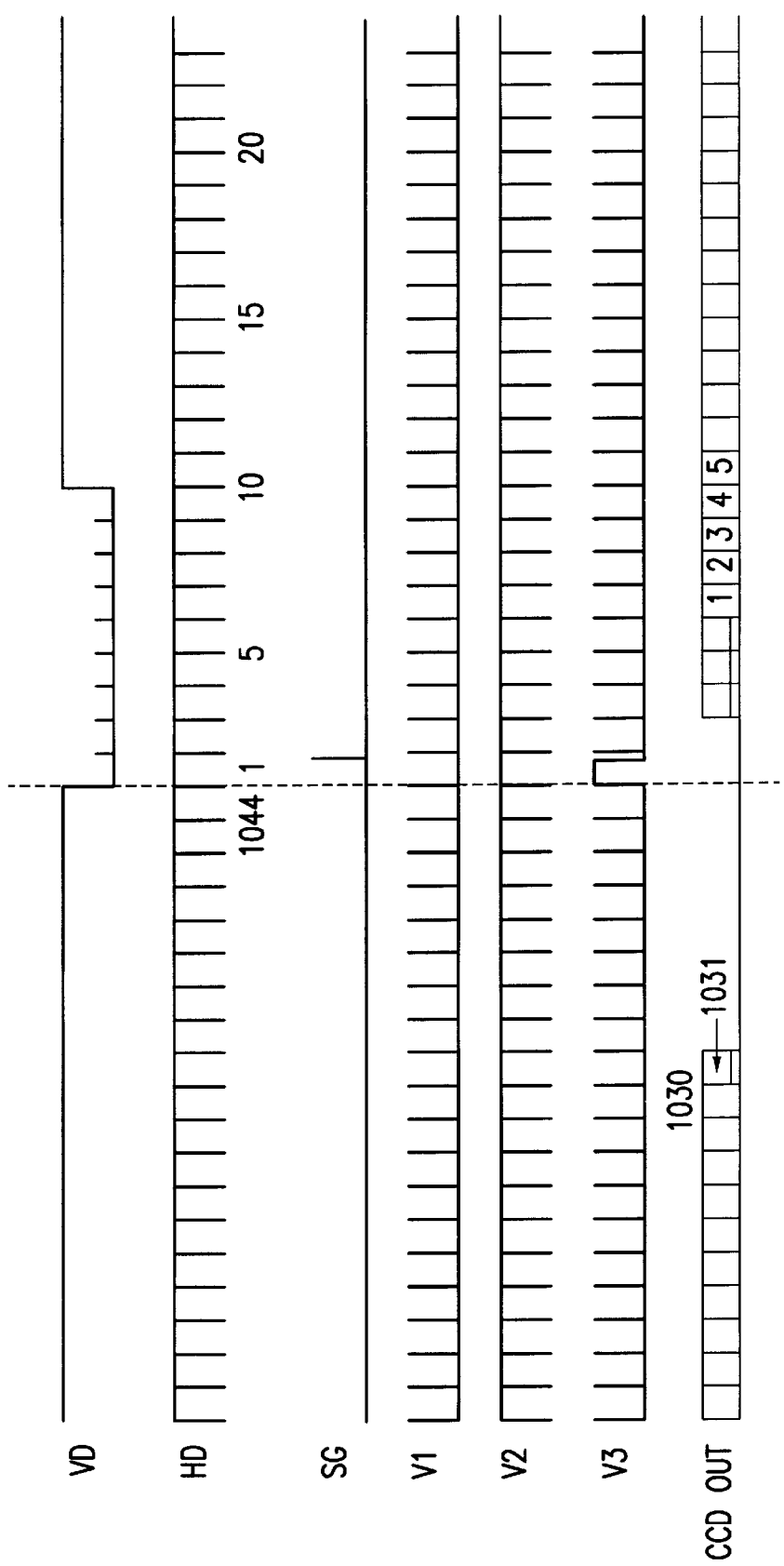
Figure 18A:
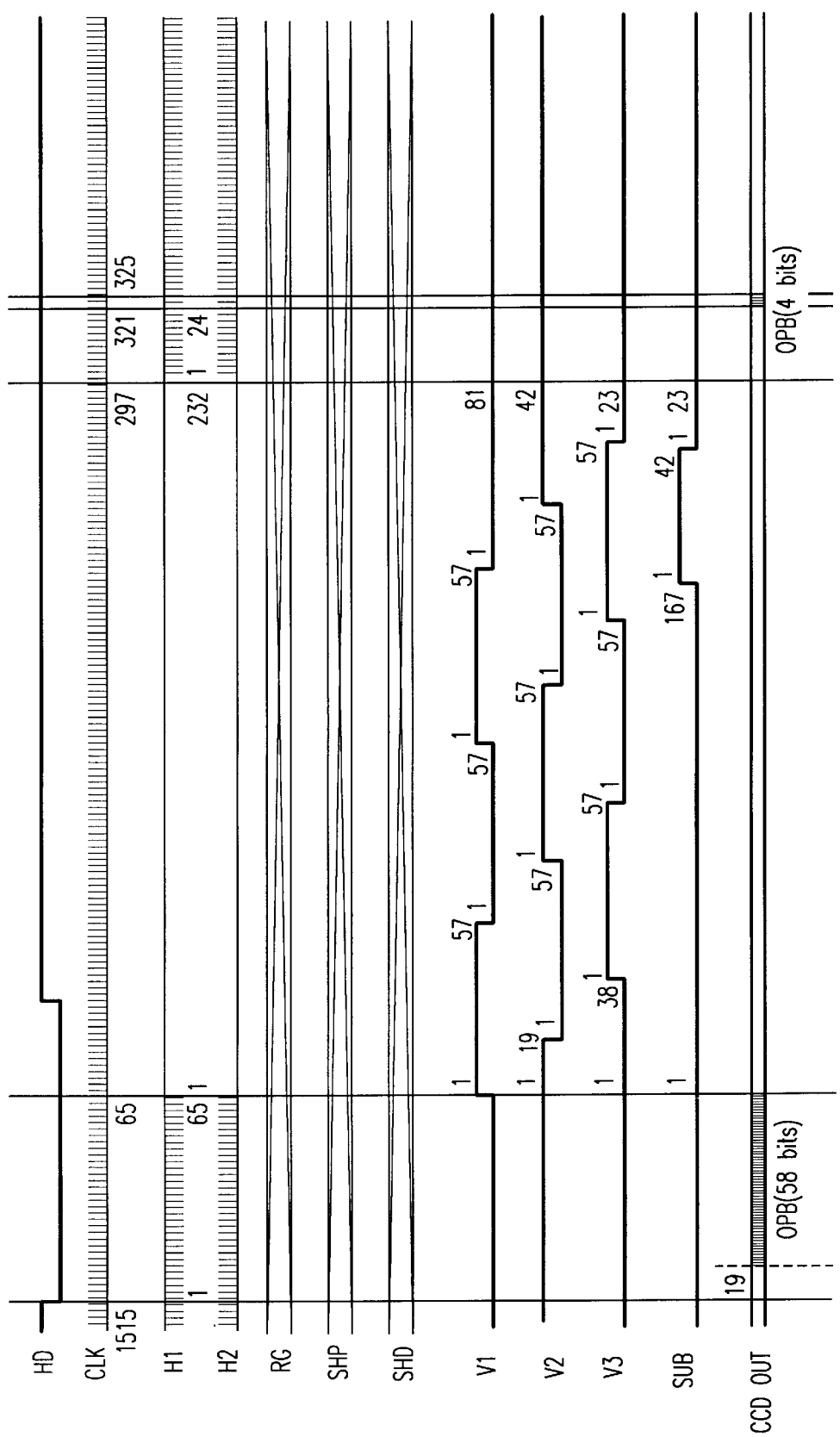
FIGS. 18a and 18b illustrate the vertical drive timing chart for the Sony CCD #ICX084AL in double speed readout mode.
Figure 18B:
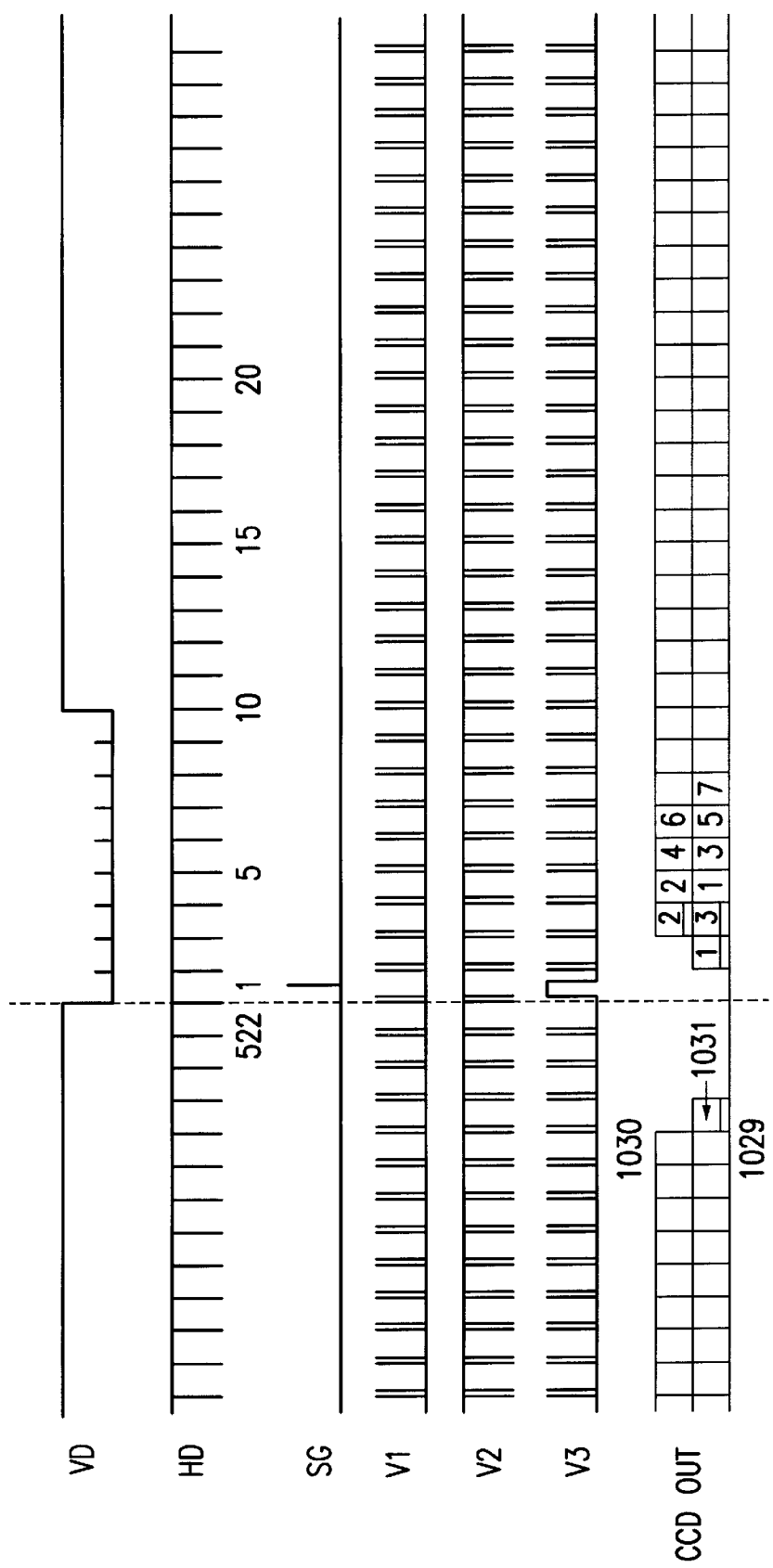

Referring to FIGS. 17a and 17b and 18a and 18b, the vertical drive timing chart for another Sony CCD #ICX085AL is illustrated. FIGS. 17a and 17b show normal speed readout mode, while FIGS. 18a and 18b illustrate double speed readout mode. A comparison of FIGS. 17a and 18a, shows that the three phase clock, which has three vertical drive signals V1, V2, and V3, is a major difference between the normal and double-speed readout modes. Effectively, the three vertical drive signals V1, V2 and V3 are doubled for double speed mode.

The drive timing charts for the Sony CCD in normal-speed readout mode and double-speed readout mode are shown in FIGS. 18a and 18B. Comparing the vertical drive signals V1, V2 and V3 in the two modes, it is clear that these signals are double pulsed in double-speed readout mode, and that the double-speed readout mode takes half the time of normal-speed readout mode for the same amount of information. The CCD OUT signal shows how the output signal is doubled in double-speed readout mode, effectively averaging pixels from each vertical pair of scan lines while cutting the number of vertical scan lines in half. The horizontal timing signals H1 and H2, are the same for both normal-speed readout mode and double-speed readout mode, and therefore the operation of the Sony CCD can not be accelerated beyond the operating speed of the single horizontal shift register.

The Panasonic CCD 93a was designed to be driven with standard signals so that it provides an output that emulates a normal television camera, and has 525 scan lines. Normal television signals have 262 scan lines in each field. Thus, the CCD 93a requires two fields to create a complete picture.

Since the CCD 93a has two horizontal shaft registers 250 and 251, each receives every other scan line so that the output of each horizontal shift register equals the number of scan lines for a normal television field, namely 262.

Figure 19B:
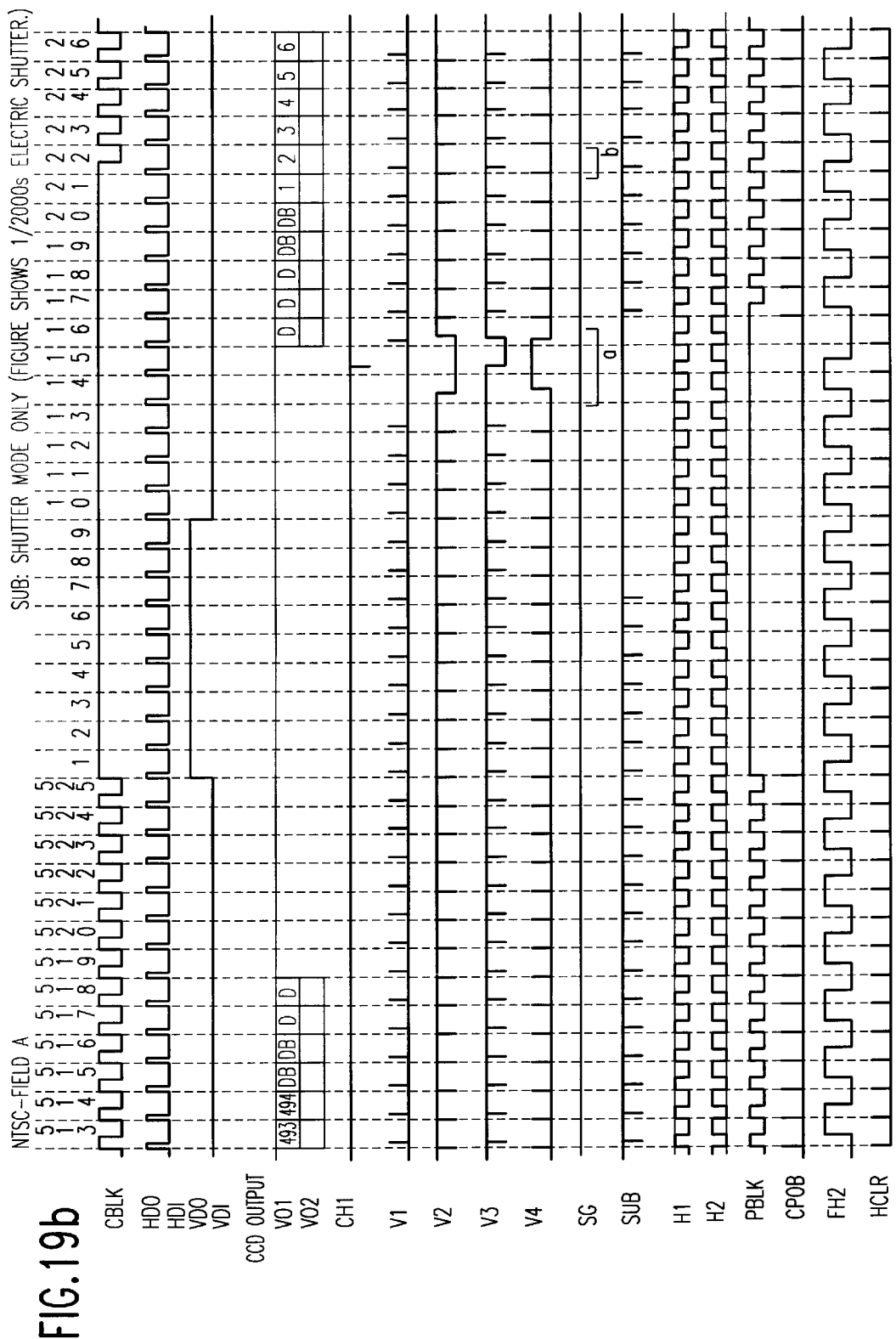
Figure 19C:
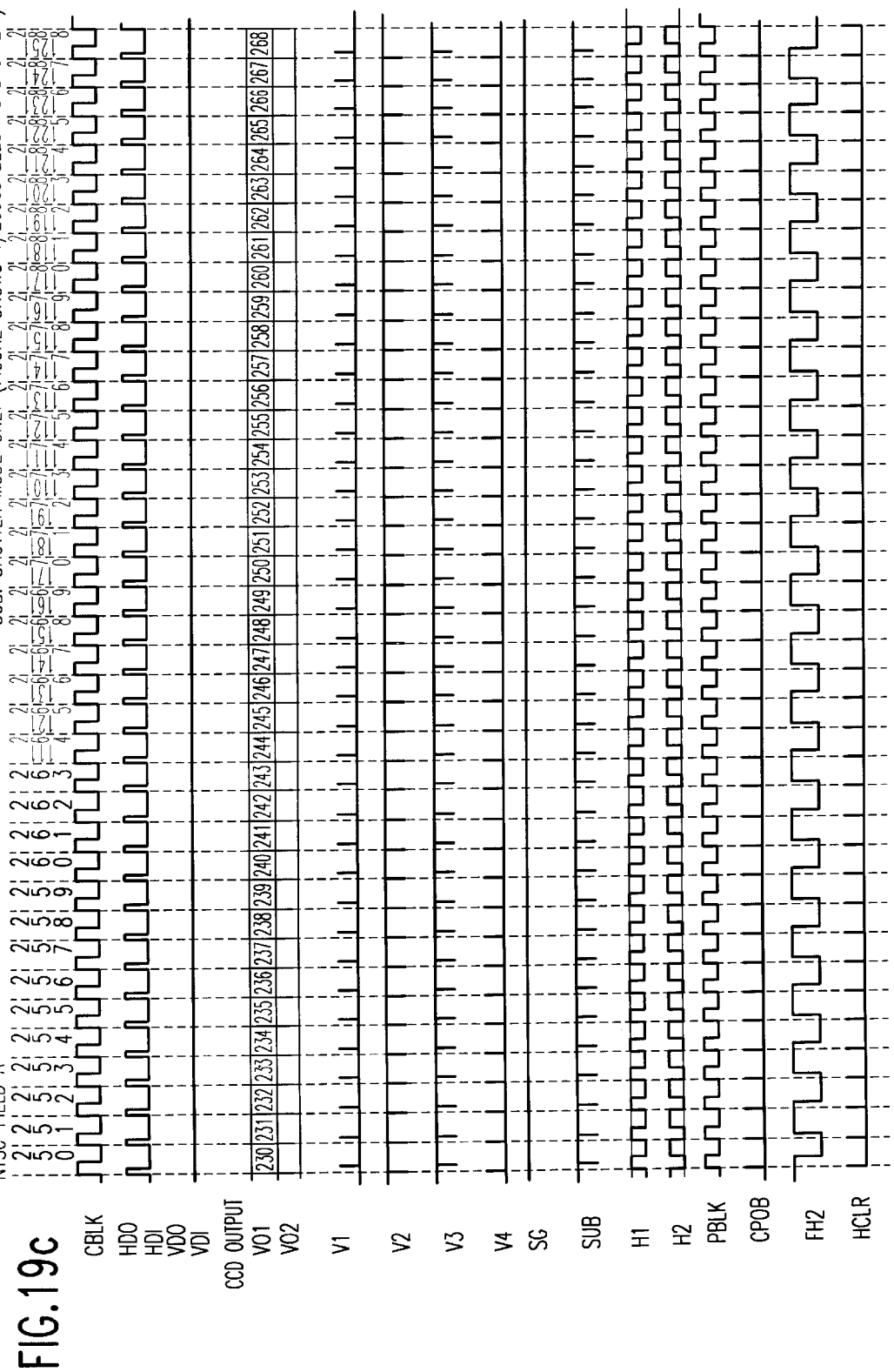
Figure 19D:
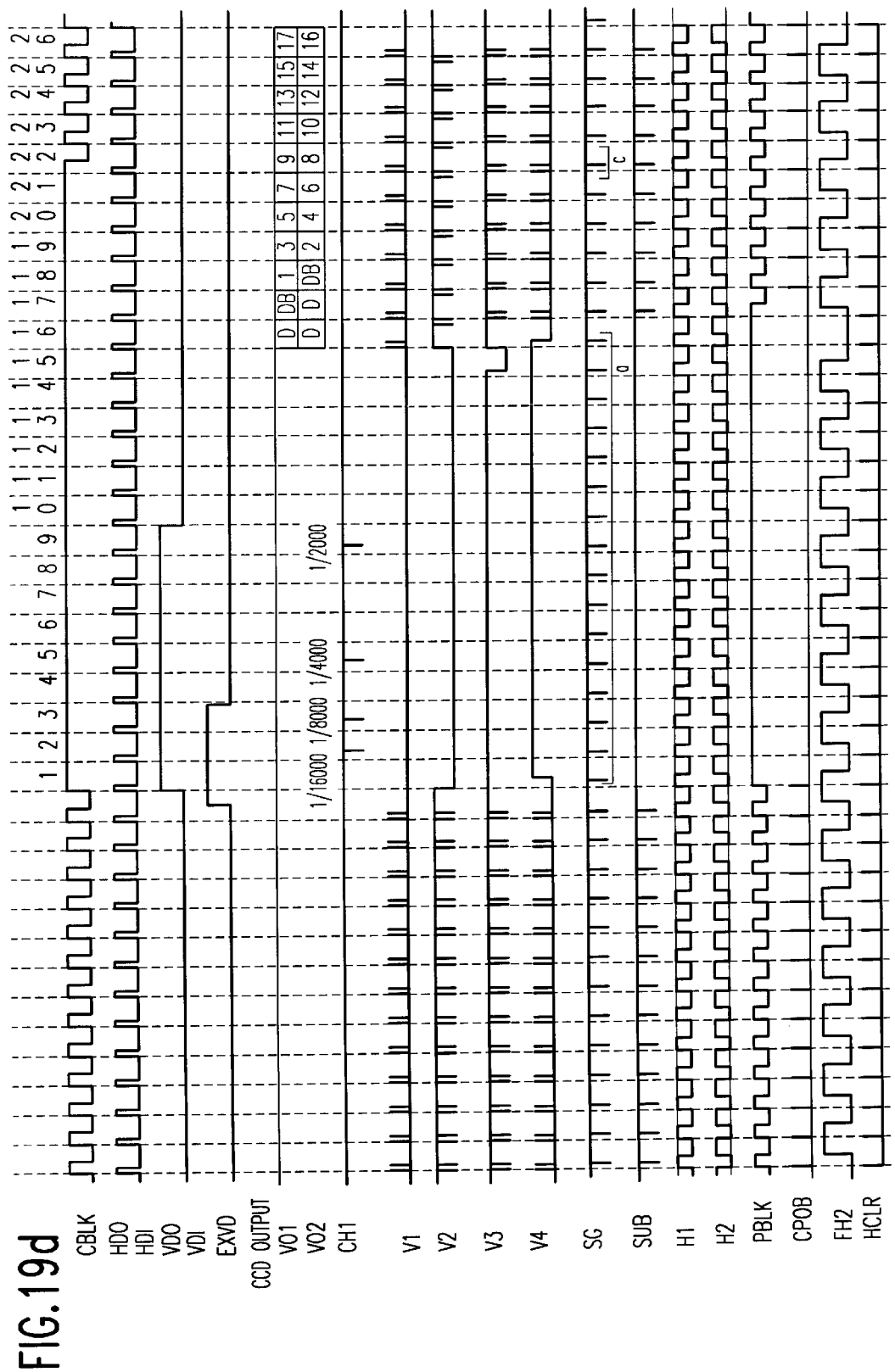
FIGS. 19d, 19e and 19f illustrate the timing for Field Progressive Scan Mode, for the Panasonic CCD #MN37761AE.
Figure 19E:
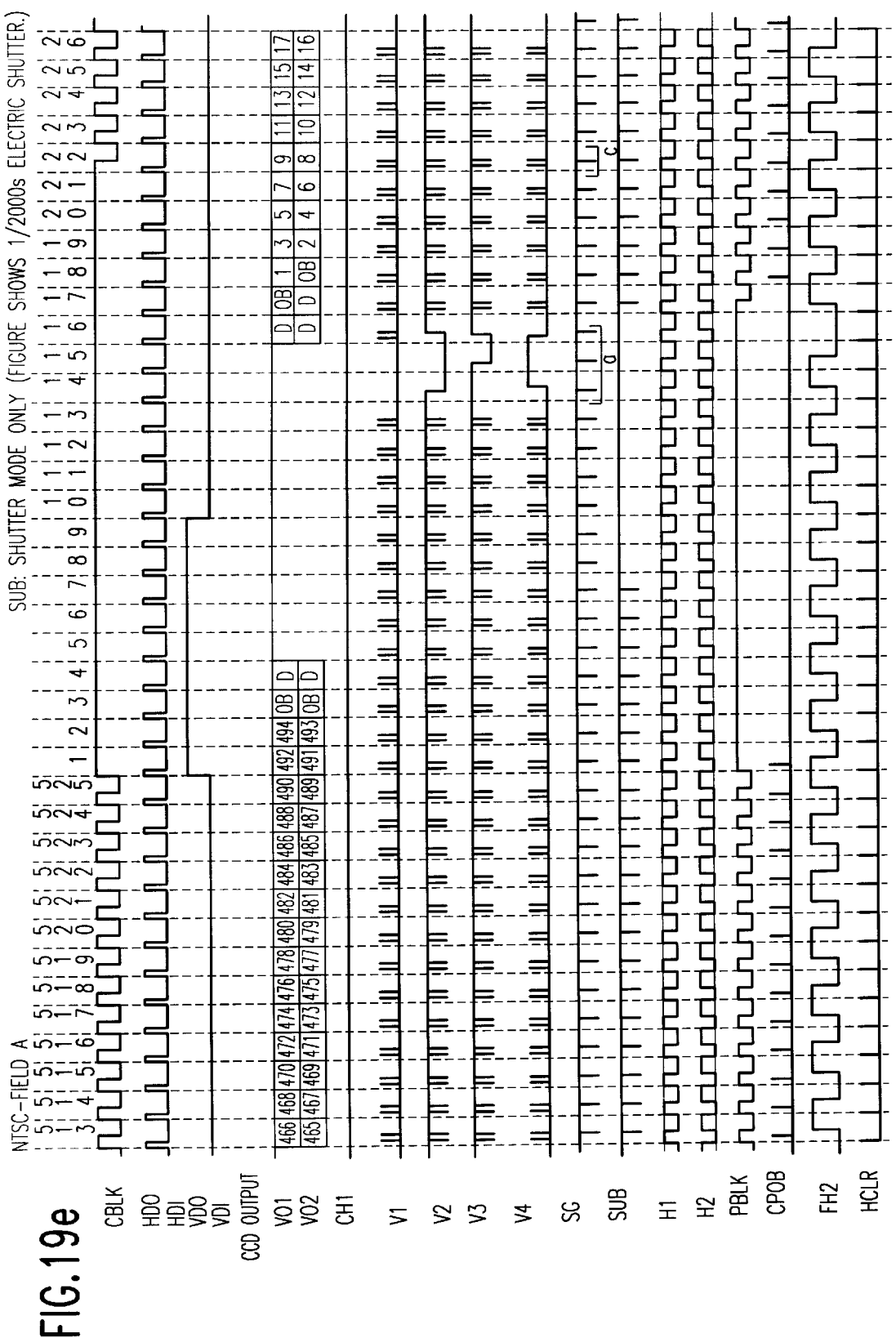
Figure 19F:
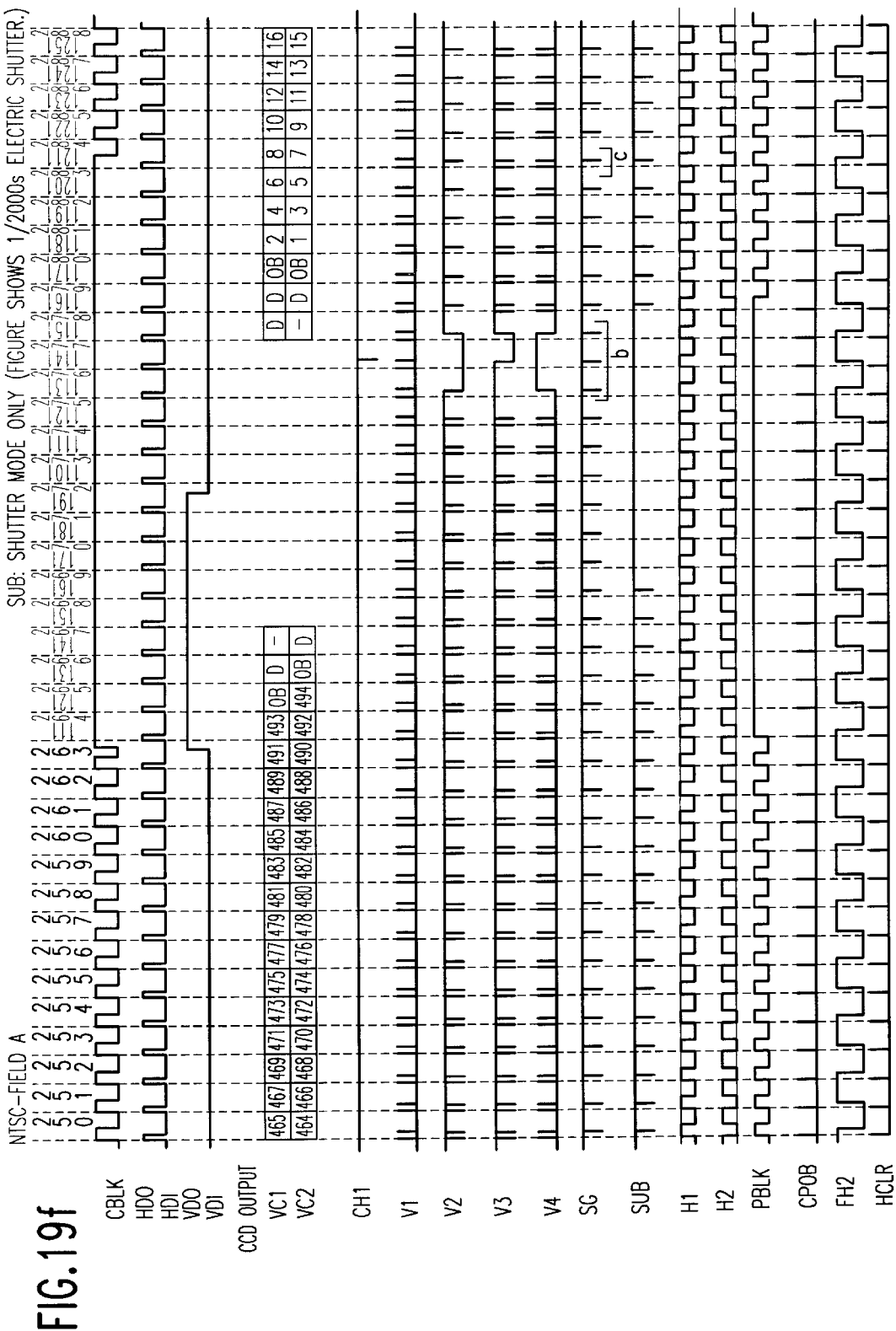

FIGS. 19a–19C illustrate the timing for Frame Progressive Mode I and FIGS. 19d–19f show the timing for Field Progressive Scan Mode. The blanking signal CBLK is high for the first 21 scan lines and then pulses for the next 504 scan lines. The vertical drive signal VDO is high for the first nine scan lines. The video out signals VO1 and VO2 on horizontal shift registers 250 and 251 begin on scan line 16 with three dummy lines, followed by two optical black lines, and then 494 data lines, followed by two more optical black lines and two dummy lines. These signals VO1 and VO2 begin on line 16, and, for each line of data, there are only 659 useful pixels of data in the 780 pixel intervals. FIG. 19g shows the timing for Frame Progressive Scan Mode 2.

Figure 20A:
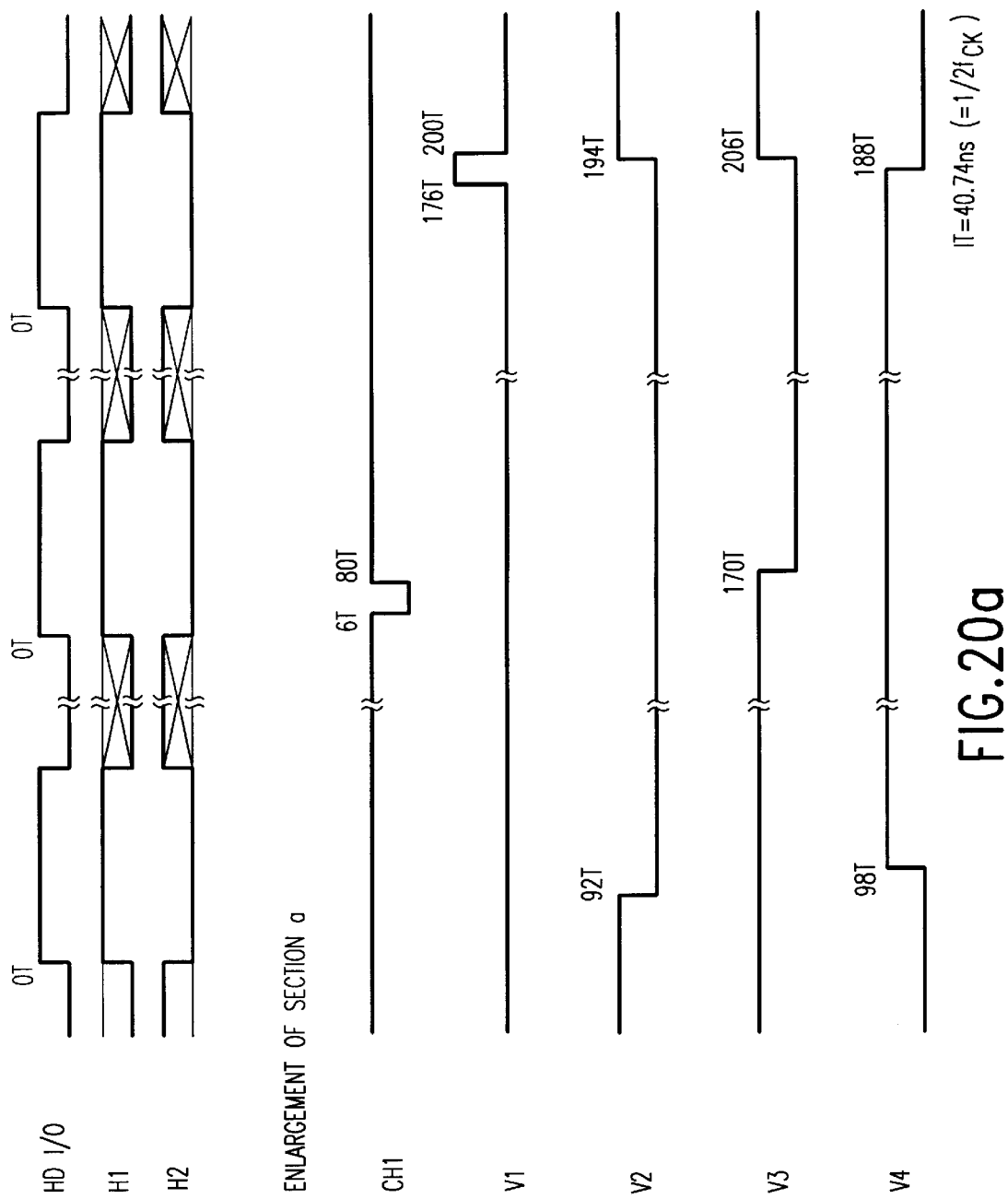
FIGS. 20a–20c and 21a–21b are enlargements of sections "a", "b" and "c" shown in FIGS. 19a and 19b.
Figure 20B:
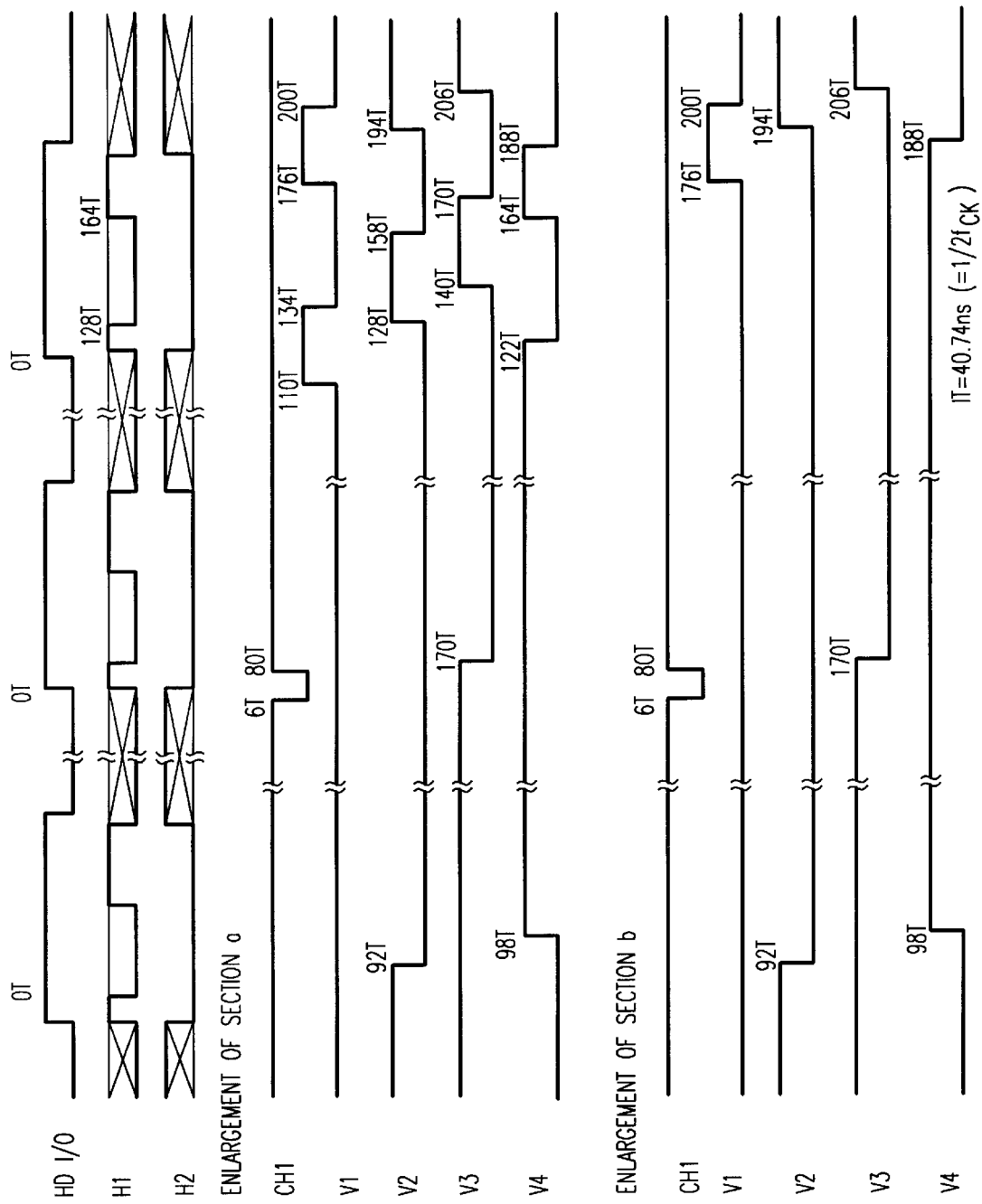
Figure 20C:
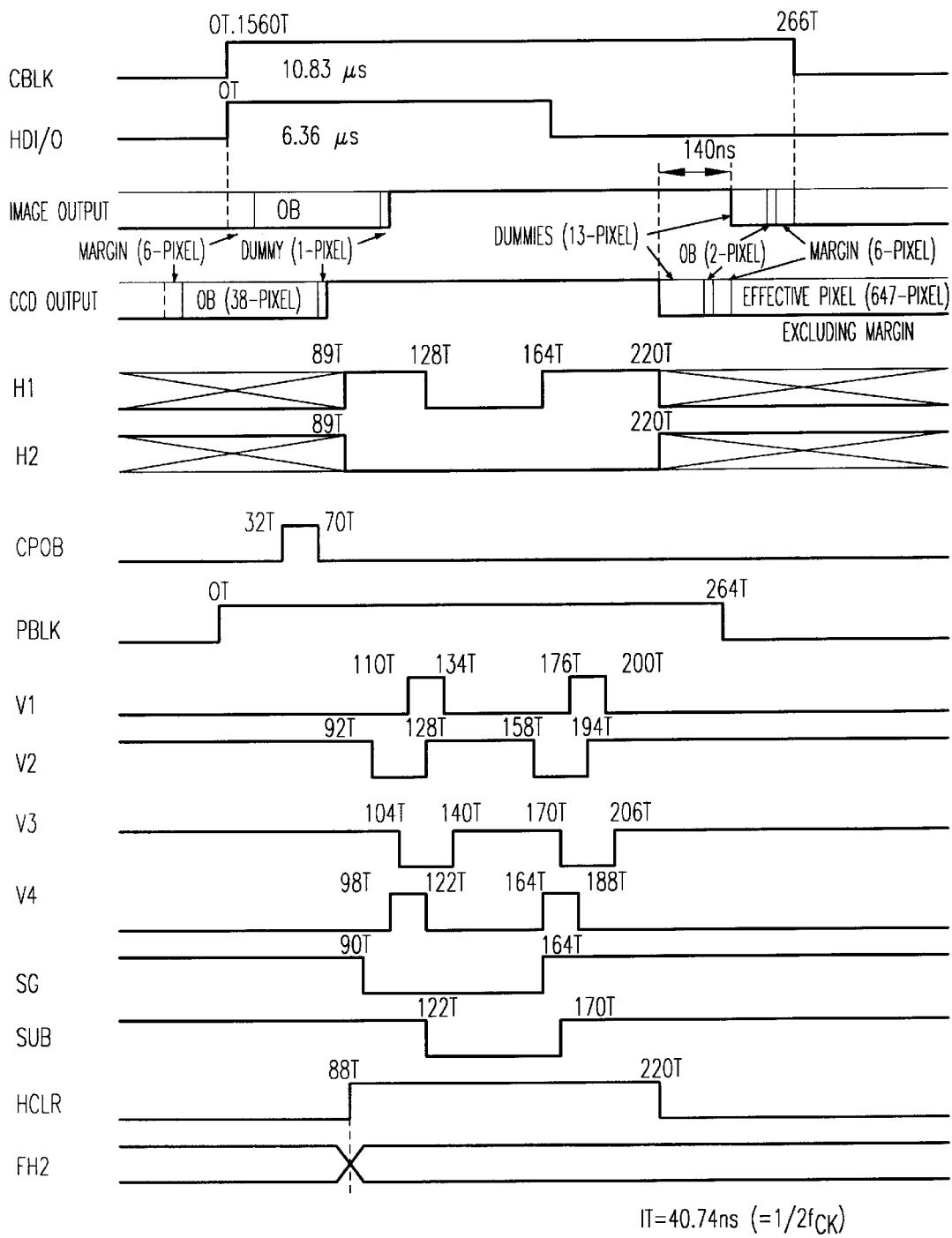
Figure 21A:
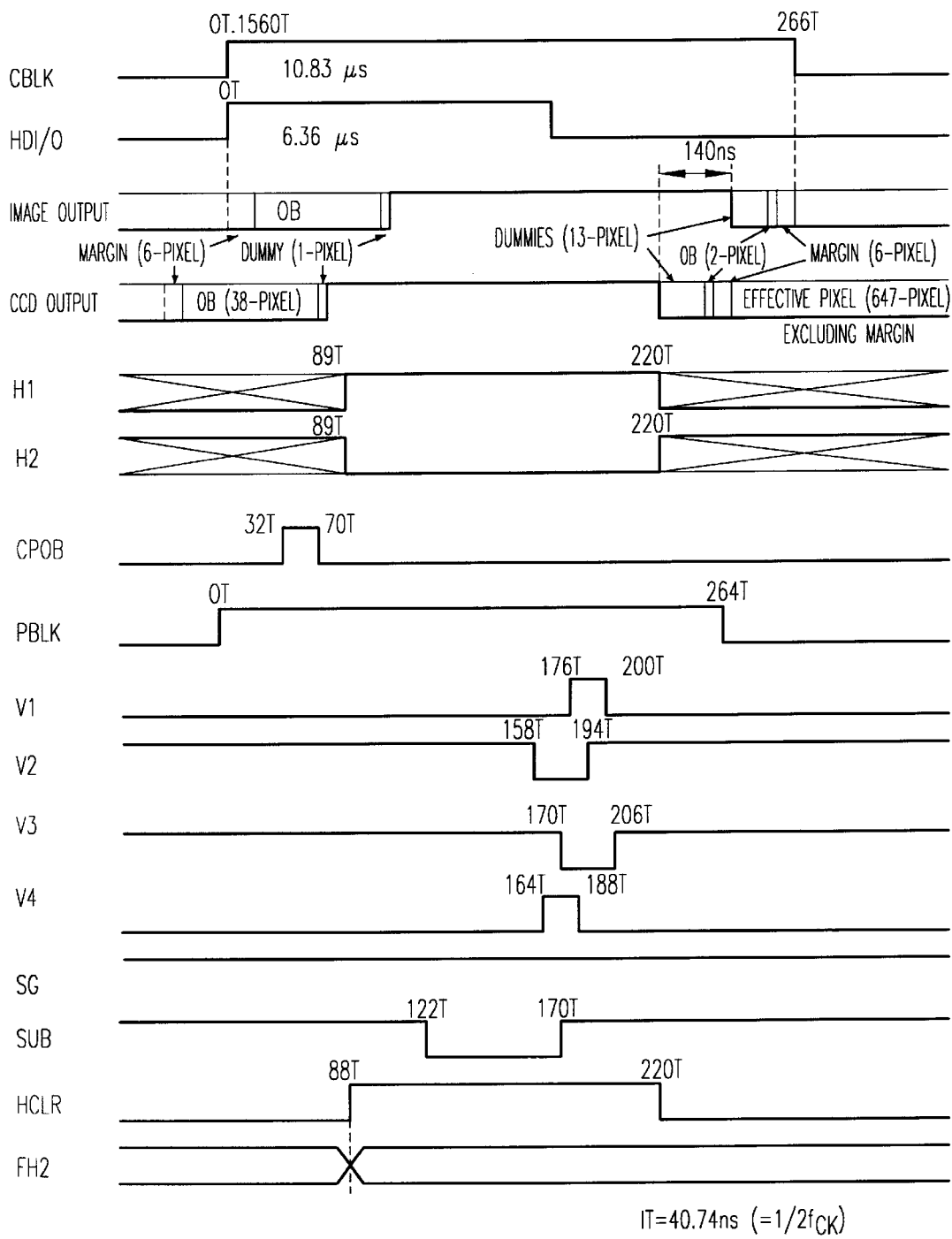
Figure 21B:
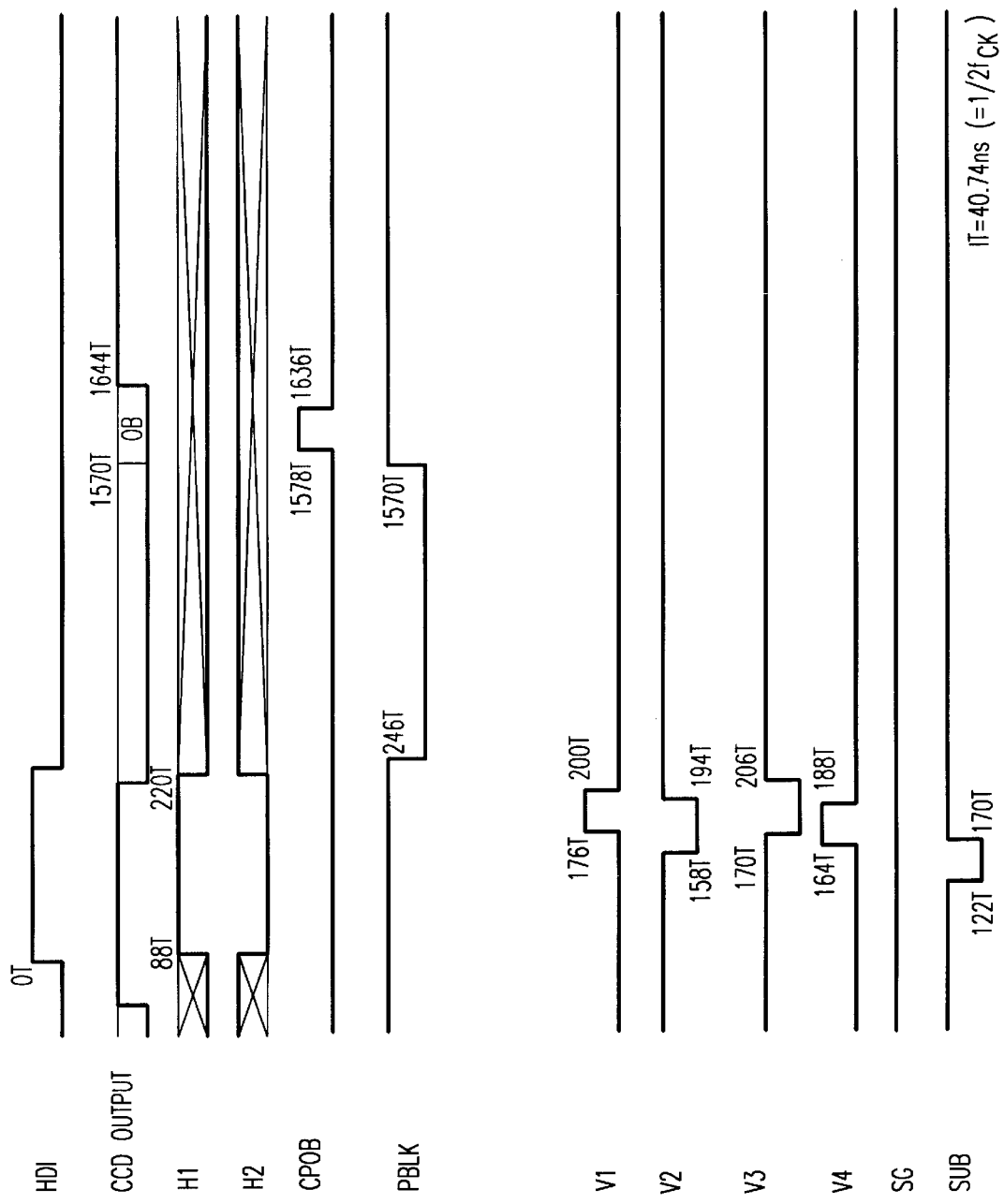

Referring to FIGS. 20a and 21a, which are enlargements of sections "a" and "b" shown in FIGS. 19a and 19b, the horizontal rate timing is shown in greater detail. Each scan line takes 1560T to complete, where T is ½ pixel clock. The actual data for one scan line begins at 220T. FIG. 20b is an enlargement of sections "a" and "b" in FIGS. 19d–19f, while FIG. 20c is an enlargement of section "c". FIG. 21b is an enlargement of section "b" in FIG. 19g.

For operation of the CCD 93a reference is made to the table shown in FIG. 22 which sets forth the operating scan line types and their respective times. It should be understood that if two pixels of data are transferred to each horizontal CCD cell then four scan lines can be transferred simultaneously, using the two shift registers 250 and 251.

Scan lines start1a (s1a), start1b (s1b) and start1c (s1c) are to transfer of charge from the photodiodes 256 to the vertical CCD 254. Scan line (p1) is for shifting the pixel signals. Black (b2v) is a medium speed sample black scan line, and black fast (b4v) is a rapid speed sample black scan line. Finally, the skip slow (y2x1), skip med (y2x2), and skip fast (y4x2) are vertical quick skipping scan line types.

The "v pulses" column indicates the number of vertical pulses for the scan line, either 1, 2 or 4 pulses, although more are possible. The "x pulses" column indicates the number of horizontal pulses per pixel interval. The scan lines s1a, s1b and s1c all have one vertical pulse and two horizontal pulses per pixel. For p1 there is one vertical pulse and one horizontal pulse per pixel. Scan line b2v has two vertical pulses per line and scan line b4v has 4 vertical pulses per line, and both have one horizontal pulse per pixel. Lines y2x1 and y2x2 both have 2 vertical pulses per line, while y2x1 has one horizontal pulse per pixel and y2x2 has two horizontal pulses per pixel. The line y4x2 has 4 vertical pulses and two horizontal pulses per pixel.

The column "clk T" indicates the scan line length for each of the foregoing signals, and can vary. Scan lines s1a, s1b, s1c and y2x2 all take 834T. Scan lines p1, b2v, and y2x1 take 1548T. Scan lines bv4 takes 1656T, while scan line y4x2 takes 942T.

The next five items: "reset", "idle", "normal", "fast" and "ntsc" are modes of operation for the CCD 93a using the foregoing scan lines fully employing both horizontal shift registers 250 and 251. Ntsc is the normal television driving mode, and is included for comparison purposes. At the start of operation of the imager 10, the CCD is powered up and there is no charge in the cells or photodiodes 256. The imager 10 then goes into reset mode. Reset mode utilizes line types y2x2 and y2x1, which combined take 8.547 milliseconds. The imager 10 then enters idle mode, which repeats the y2x1 signal, thus basically maintaining the imager in reset mode.

Normal mode utilizes scan lines s1a, s1b, s1c, followed by the skip slow line y2x1, the black line b2v, pixel line p1, and black line b2v again. The total time to shift 501 vertical scan lines is thus 31.84 milliseconds.

Comparing with an NTSC Frame, the first 13 lines are non-required padding, scan lines s1a, s1b, and s1c correspond to lines 14–16. The line y2x1 corresponds to lines 17 and 18. The black line b2v corresponds to lines 19 and 20. Pixel line p1 corresponds to lines 21–514, and line b2v is lines 515 and 516. Lines 517–525 are dummy line, like lines 1–13, and are riot needed. By taking only 31.84 seconds to scan 501 lines in normal mode power savings is achieved and the frame rate is increased.

In fast mode the imager 10 utilizes lines s1a, s1b, s1c, followed by black line b4v, skip fast line y4x2, black line b2v, pixel line p1, and skip fast line y4x2 again. The total time for fast mode is 5.5 milliseconds.

Once again, as explained earlier the first 13 lines are dummy values which are non-required padding, and lines s1a, s1b and s1c correspond to lines 14–16, respectively. Lines b4v follows, and takes four vertical scan lines 17–20. Lines 17–18 (dummy) are sent through one horizontal shift register while lines 19–20 (optical black) are sent to the other horizontal shift register.

Skip fast line y4x2 is next and is used to skip through lines 21–245. This skipping takes only 2.30 milliseconds to go through 224 lines. The black line b2v corresponding to lines 246 and 247 follows to set the black reference. Pixel signal p1 corresponding to ten lines 248–257, the lines of interest for focusing and illumination operations, is next. Finally, line y4x2 is used for lines 258–501 to skip through these lines quickly in only 2.34 milliseconds.

The imager 10 goes back into reset mode after either normal or fast mode operation, and is thereby immediately ready to perform another scan. The foregoing fast mode operation enables the imager to obtain the ten lines of image data of concern in only 5.5 milliseconds, a significant time savings. This operation can be performed from some or all of the multiple optical positions 132. Even if there are twenty optical positions, the entire operation takes only 0.11 seconds.

While the illustrated example utilizes lines 248–257 as the data of interest for focusing and illumination, other sets of lines may be used. Such other sets of lines may be earlier or later in the set of 500 lines. Furthermore, multiple areas located in different regions may be used. The spaces between areas of concern may be passed through in the accelerated mode, and then the CCD can be reset after the last area of concern.

Figure 23A:
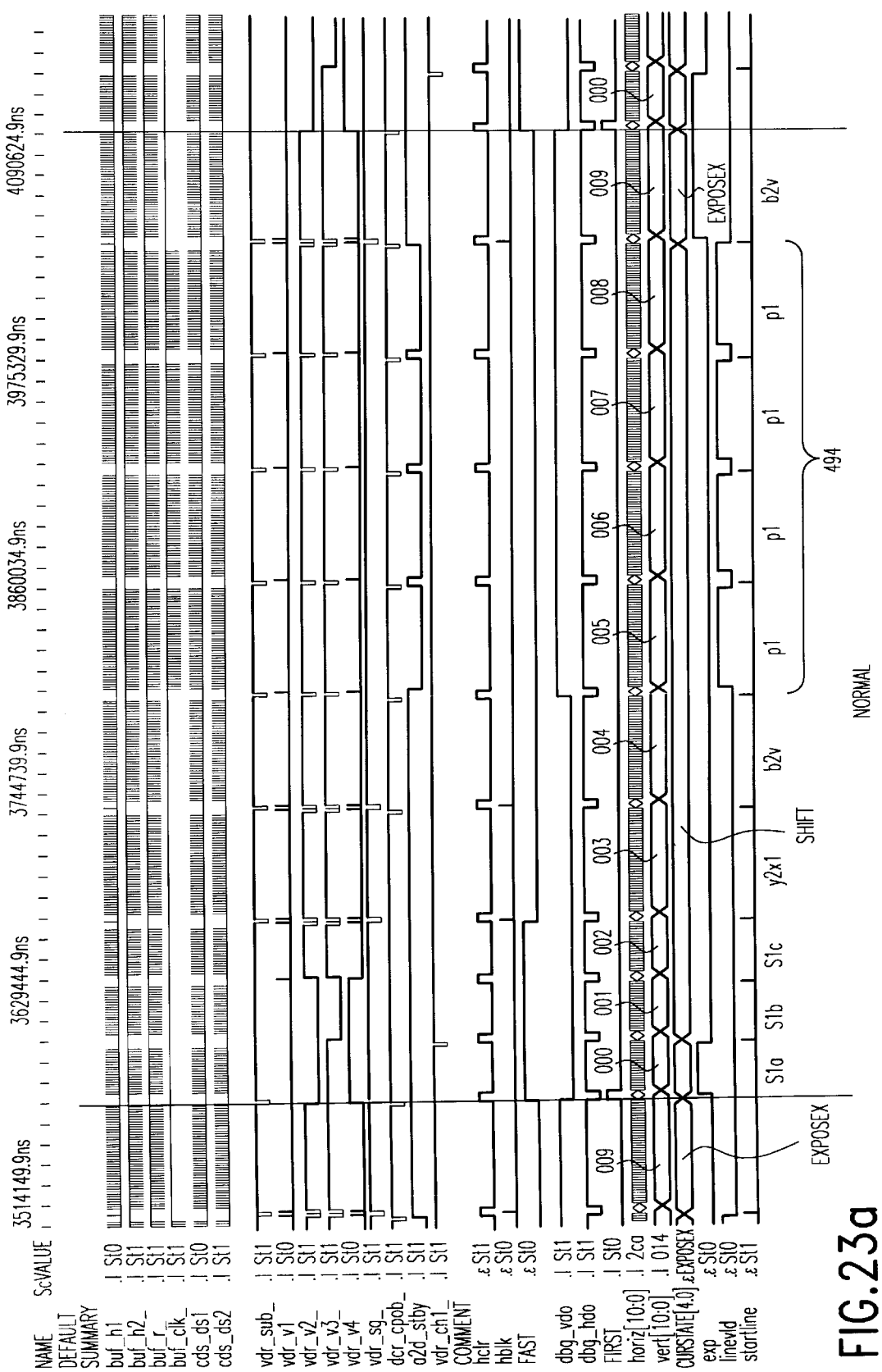
FIGS. 23a–23c illustrate the normal, fast and ntsc operating modes in detail.
Figure 23B:
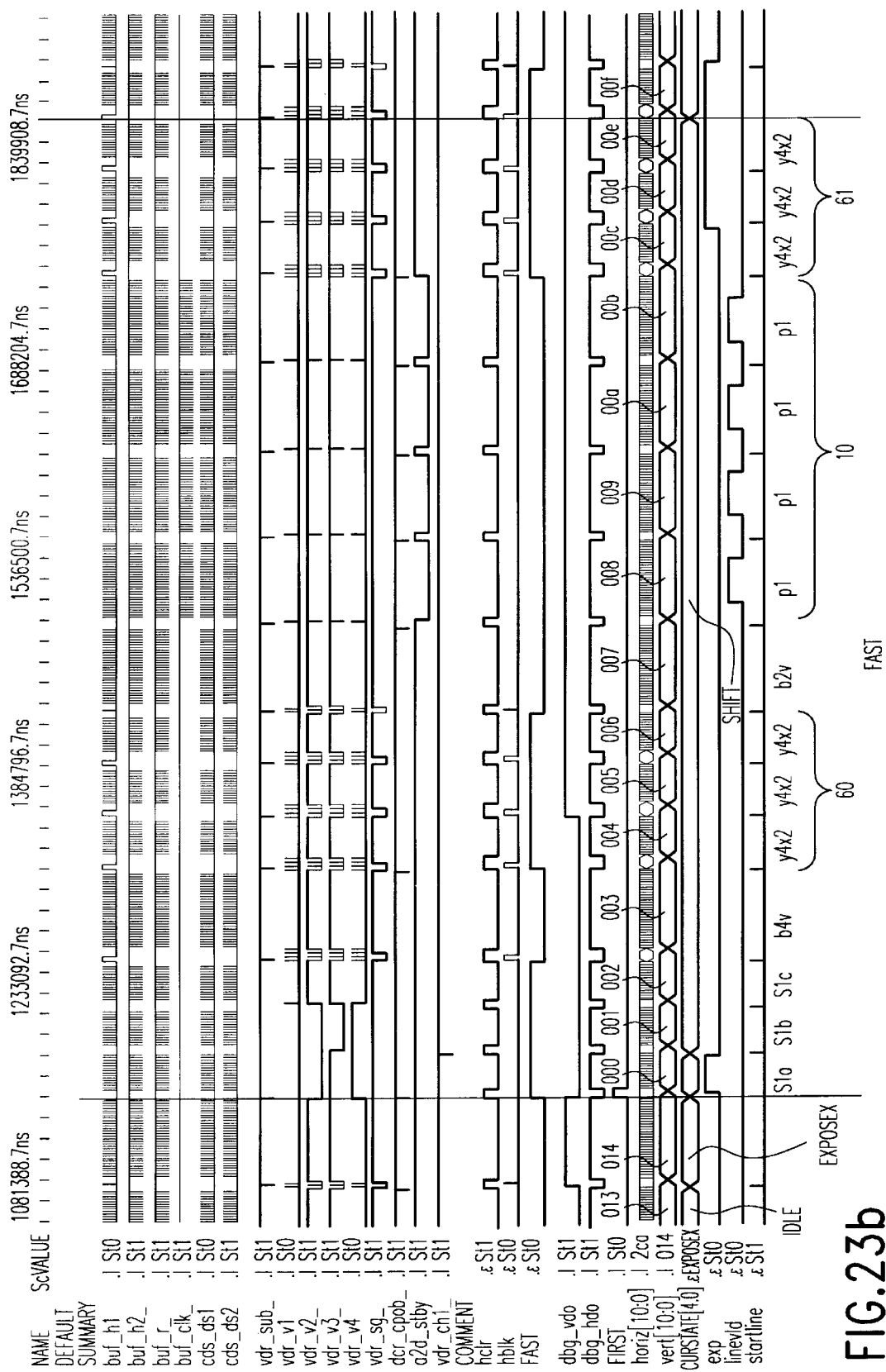
Figure 23C:
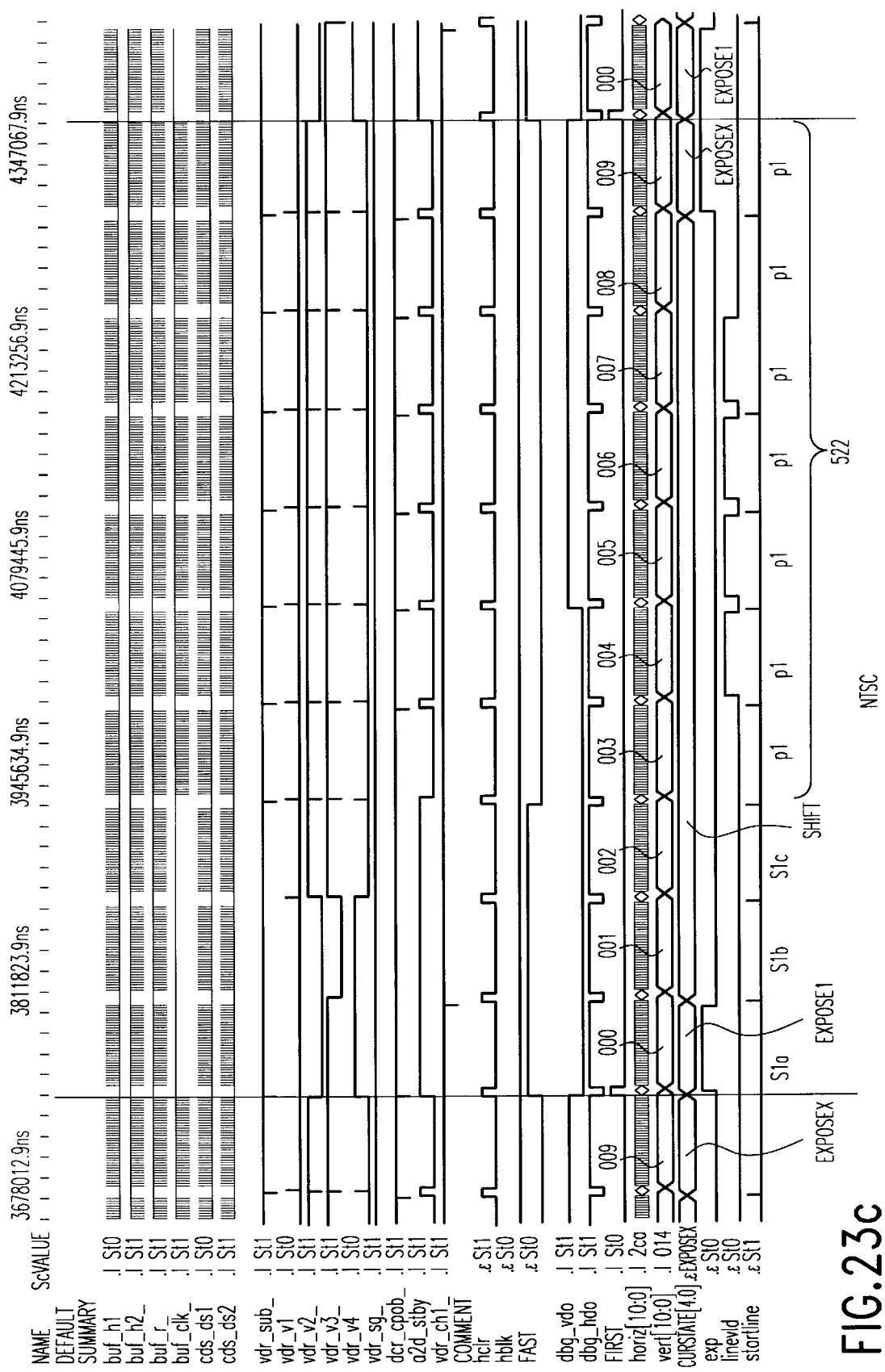
Figure 23D:
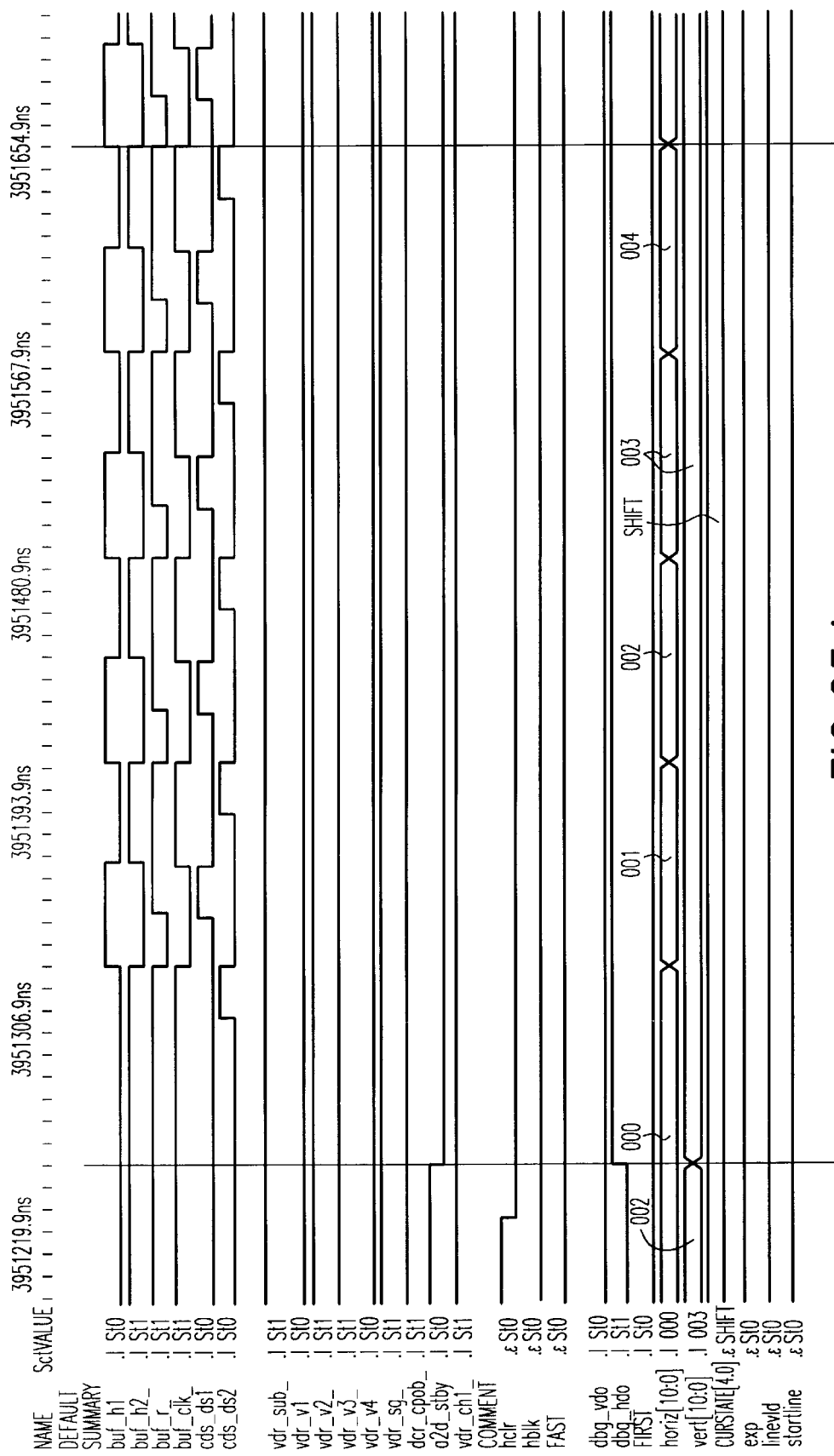
FIGS. 23d–23e illustrate the horizontal pulses at normal (x1) and accelerated (x2)
Figure 23E:
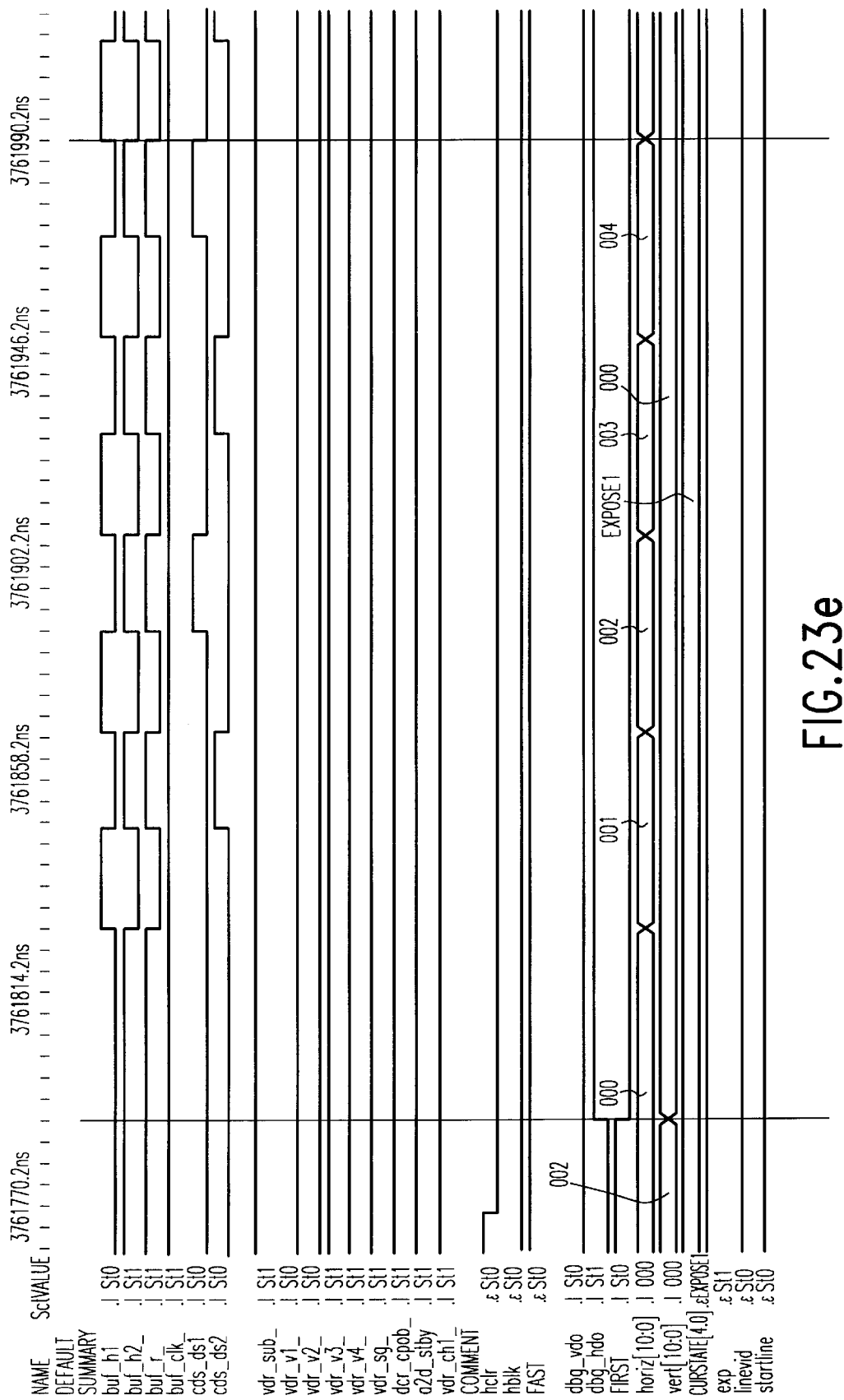
Figure 25A:
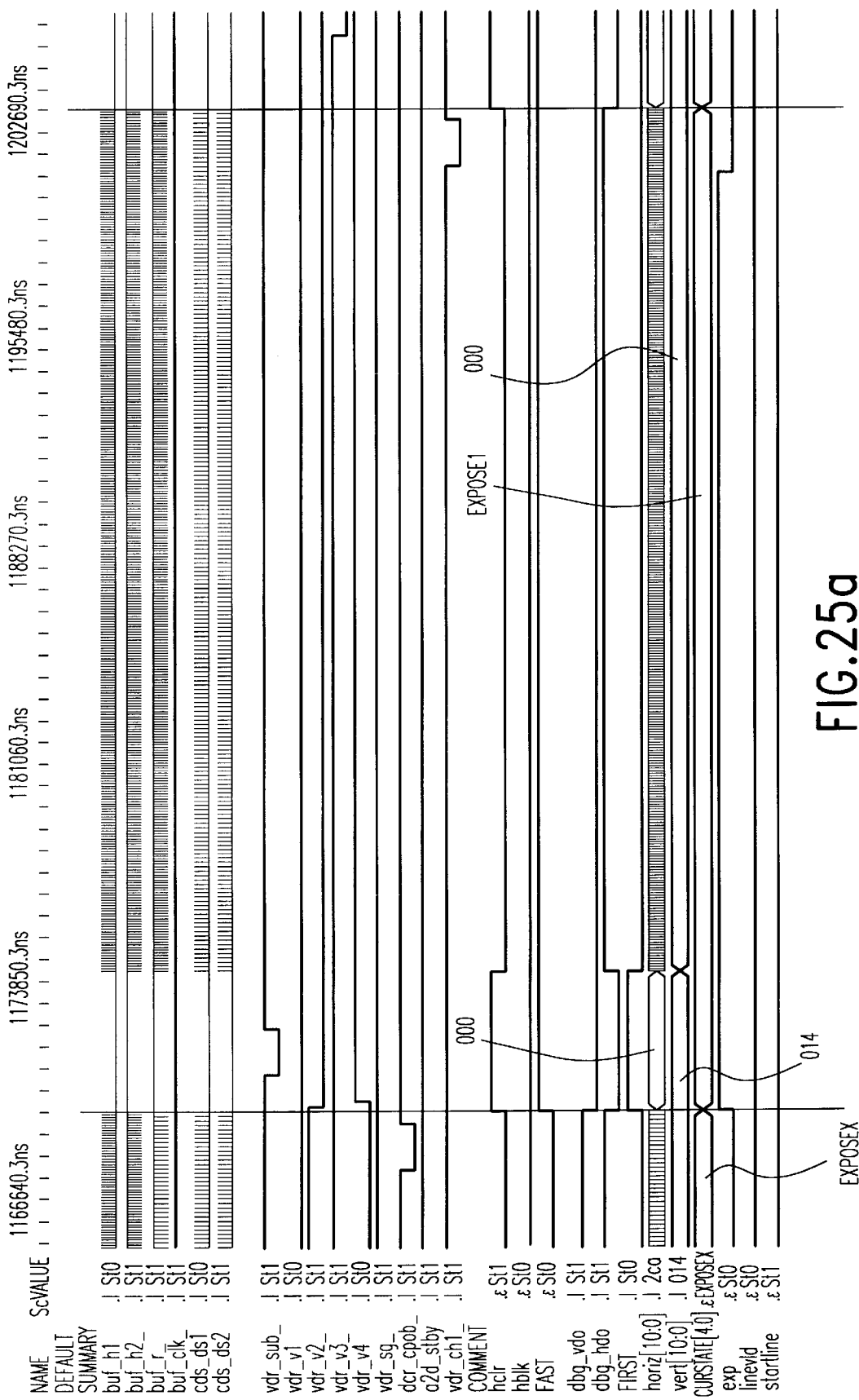
FIGS. 25a–25i are graphs of the scan line types s1a, s1b, s1c, p1, b2v, b4v, y2x1, y2x2 and y4x2 shown in FIGS. 24a–24i.
Figure 25B:
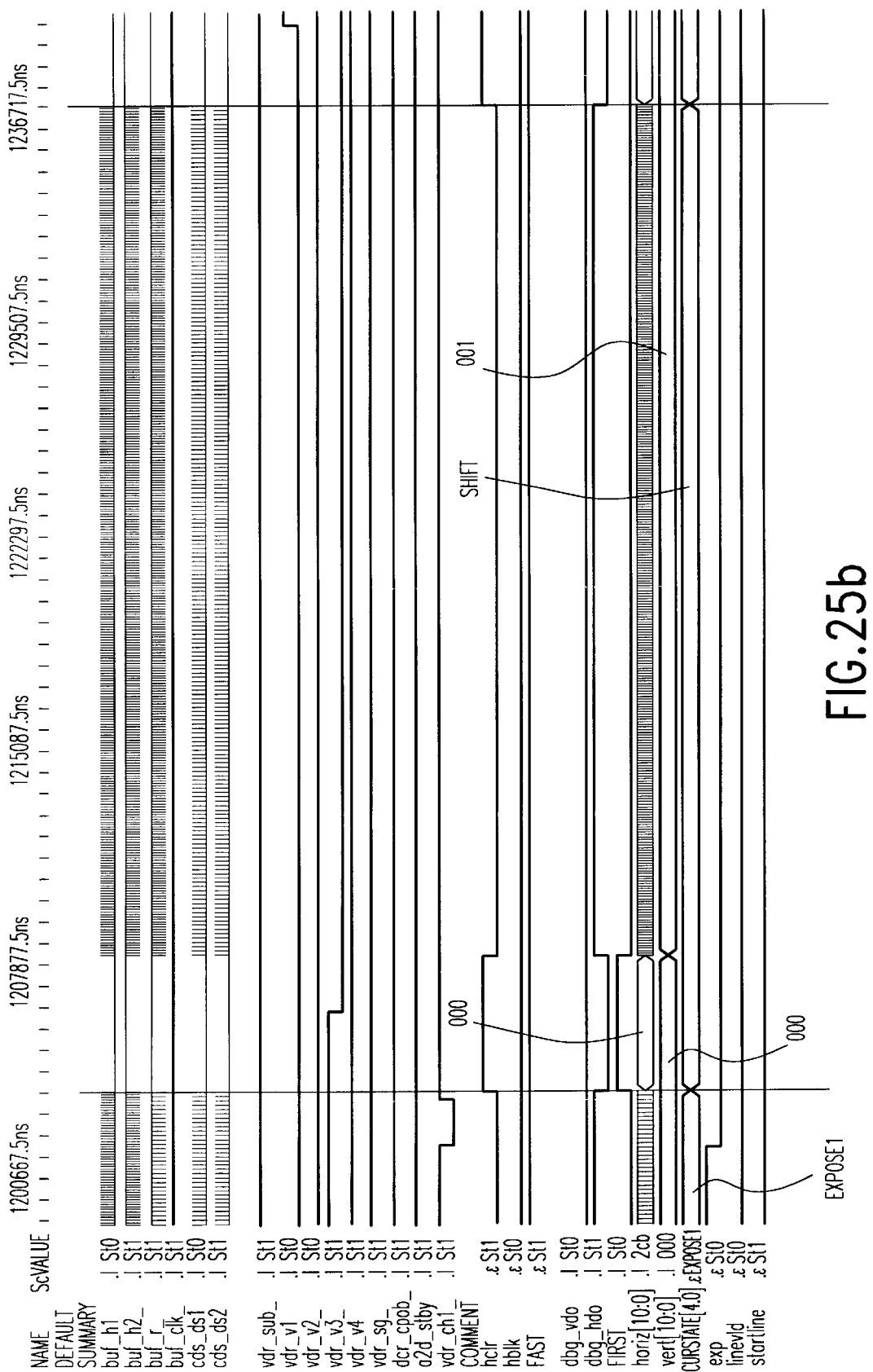
Figure 25C:
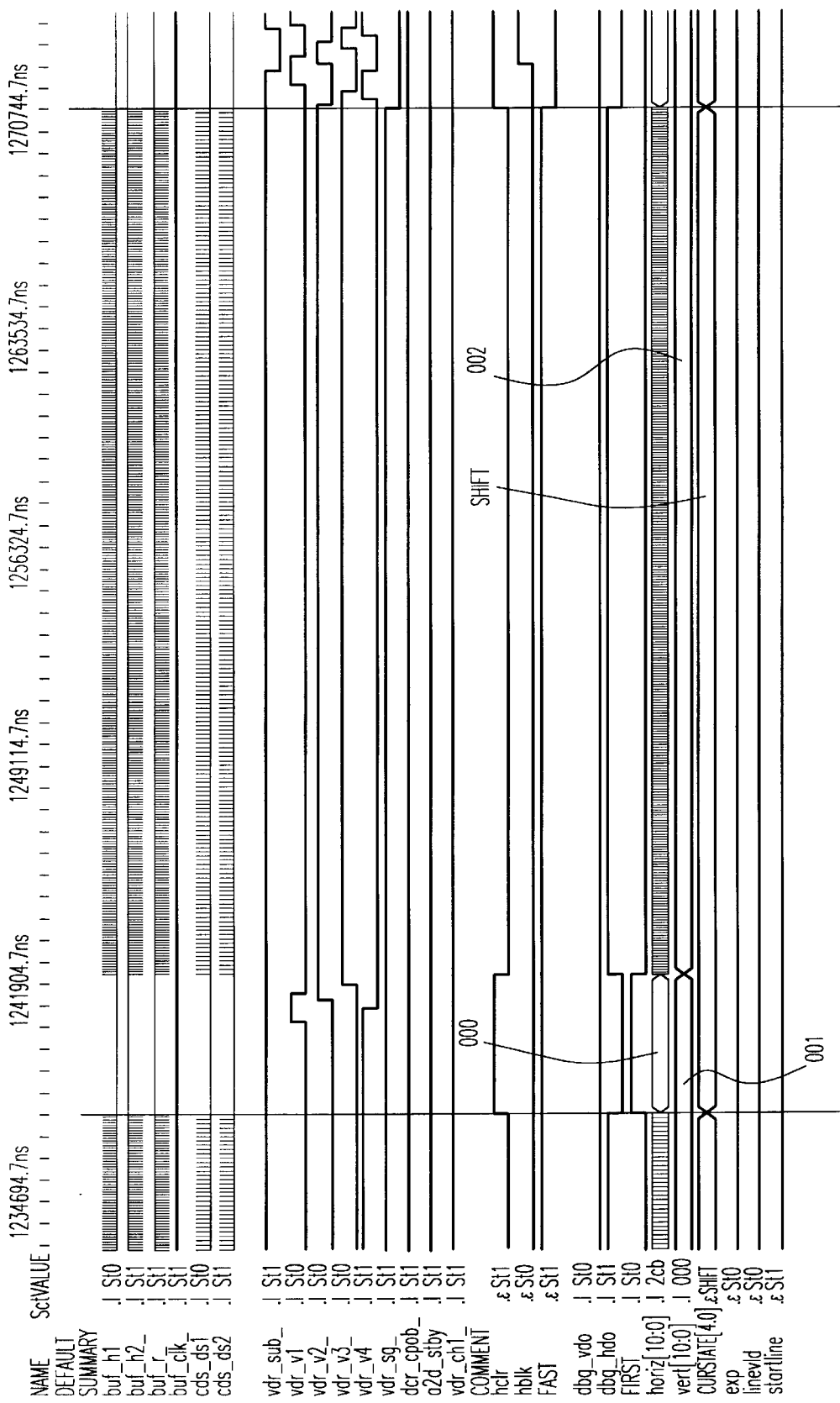
Figure 25D:
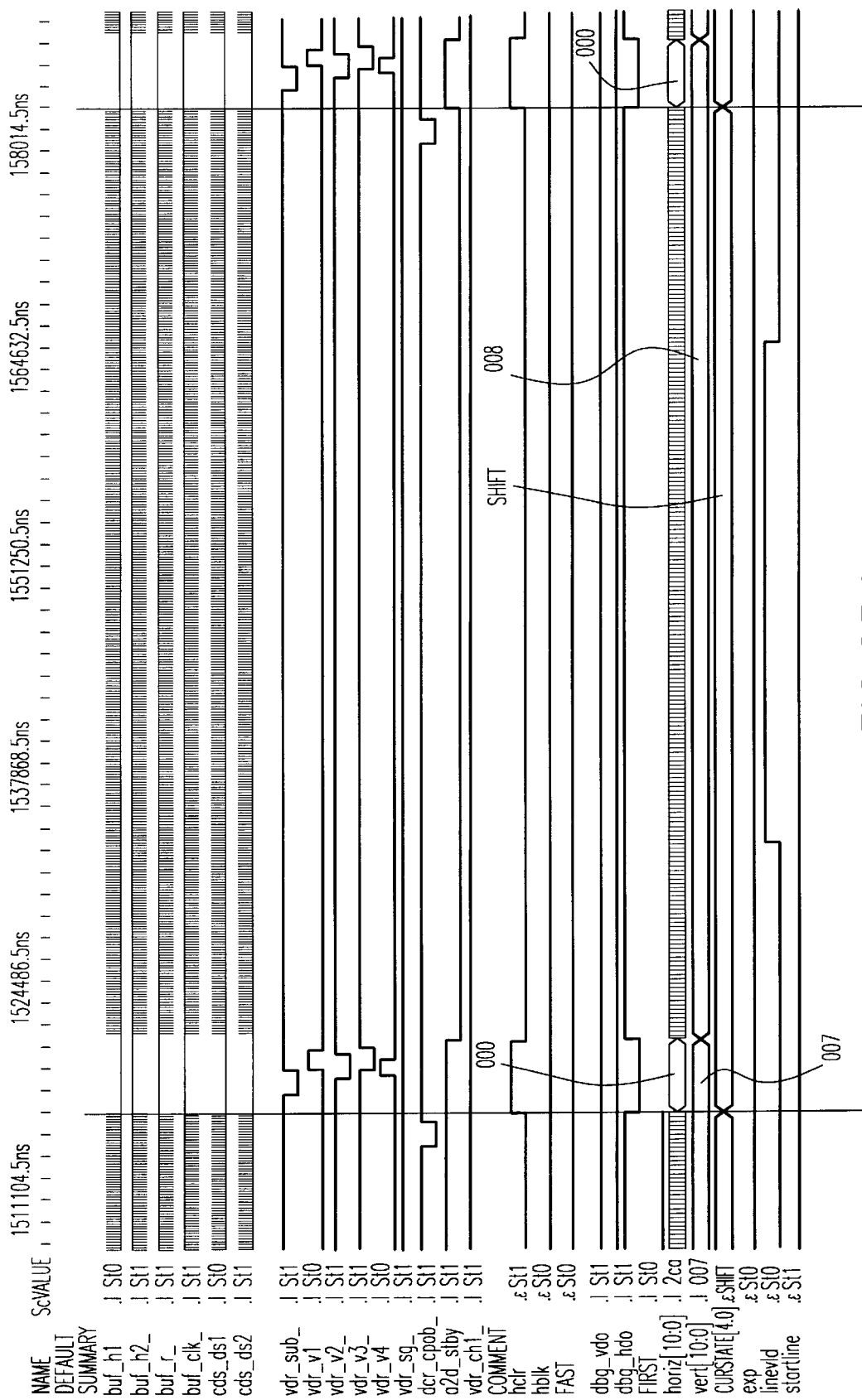
Figure 25E:
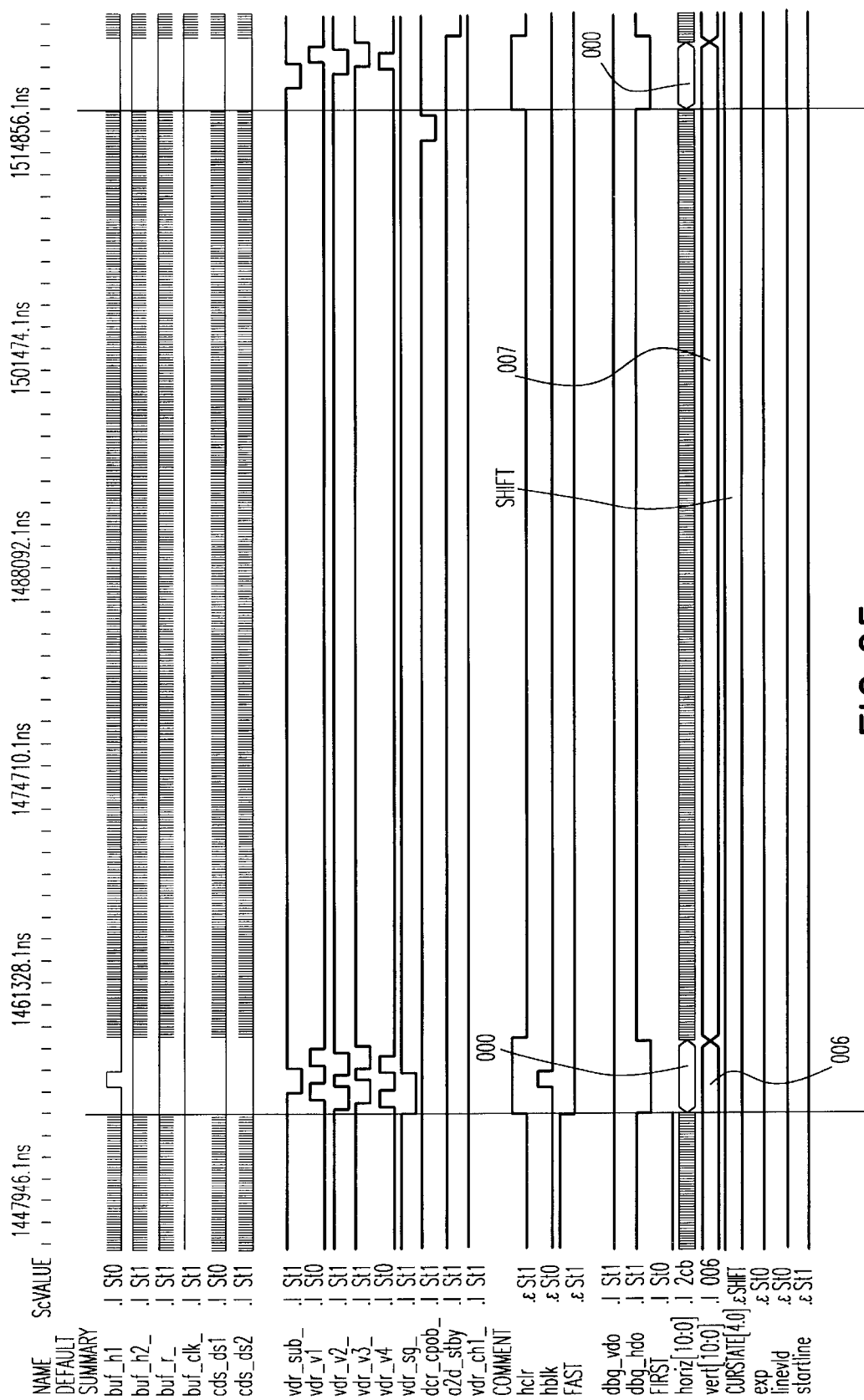
Figure 25F:
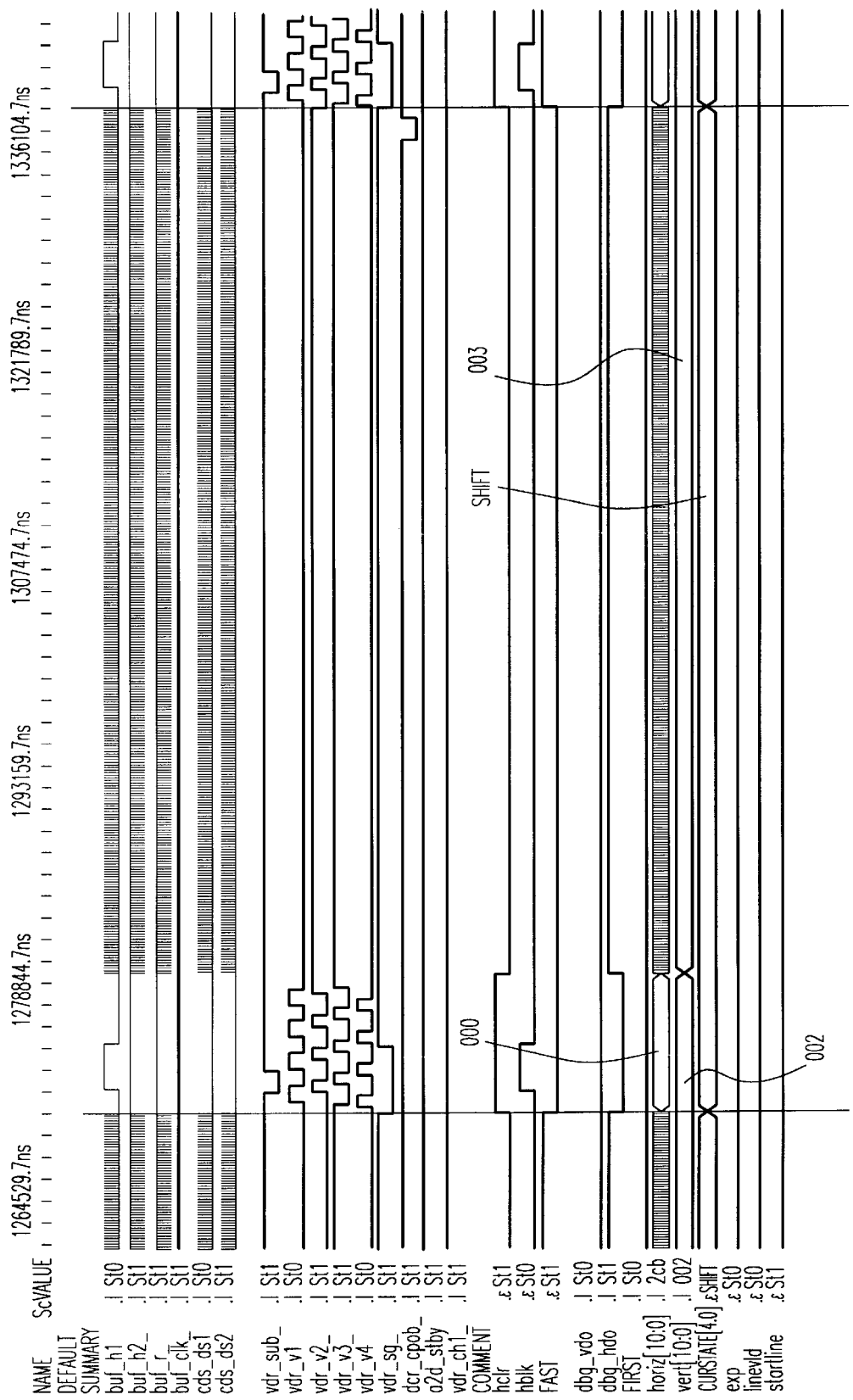
Figure 25G:
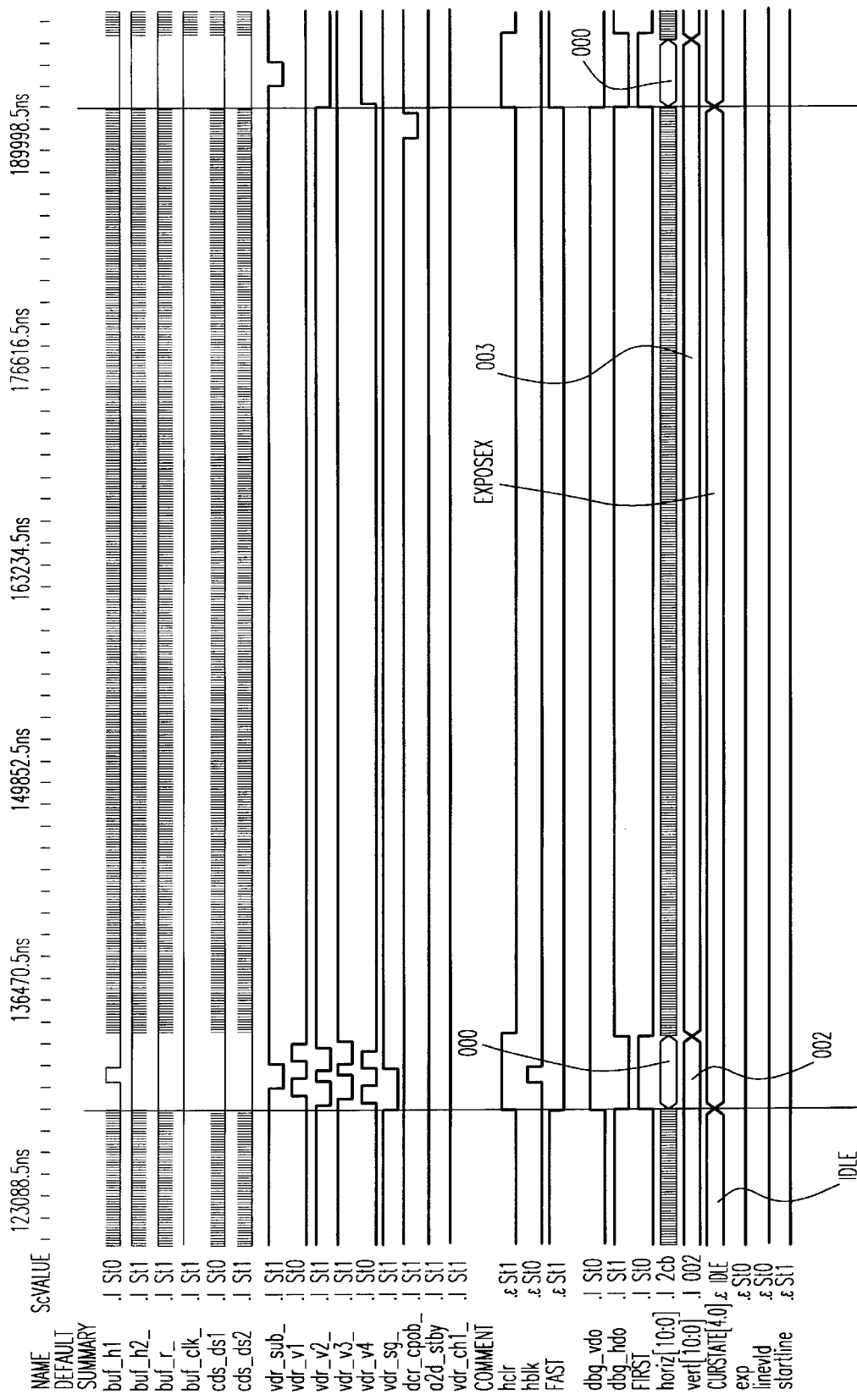
Figure 25H:
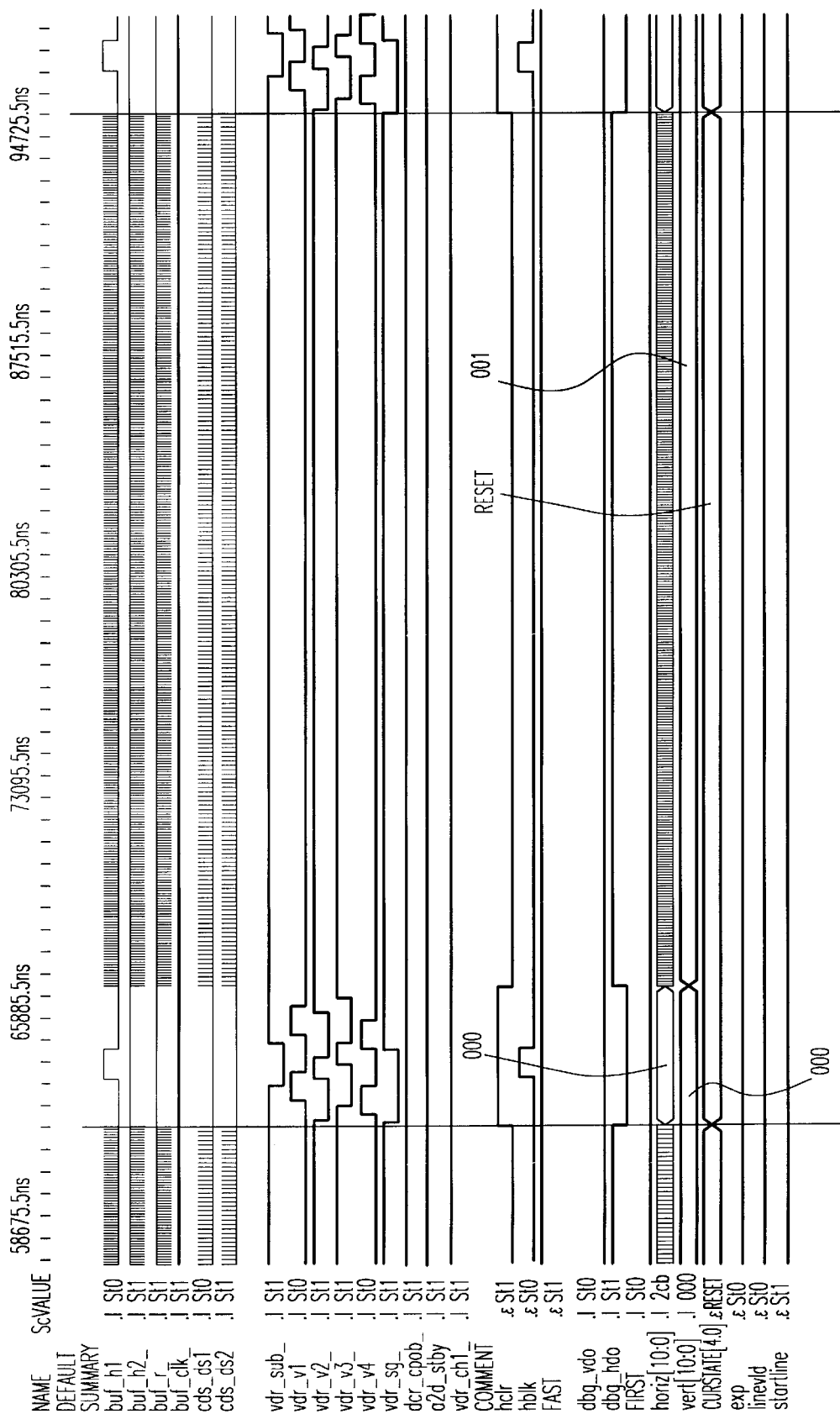
Figure 25I:
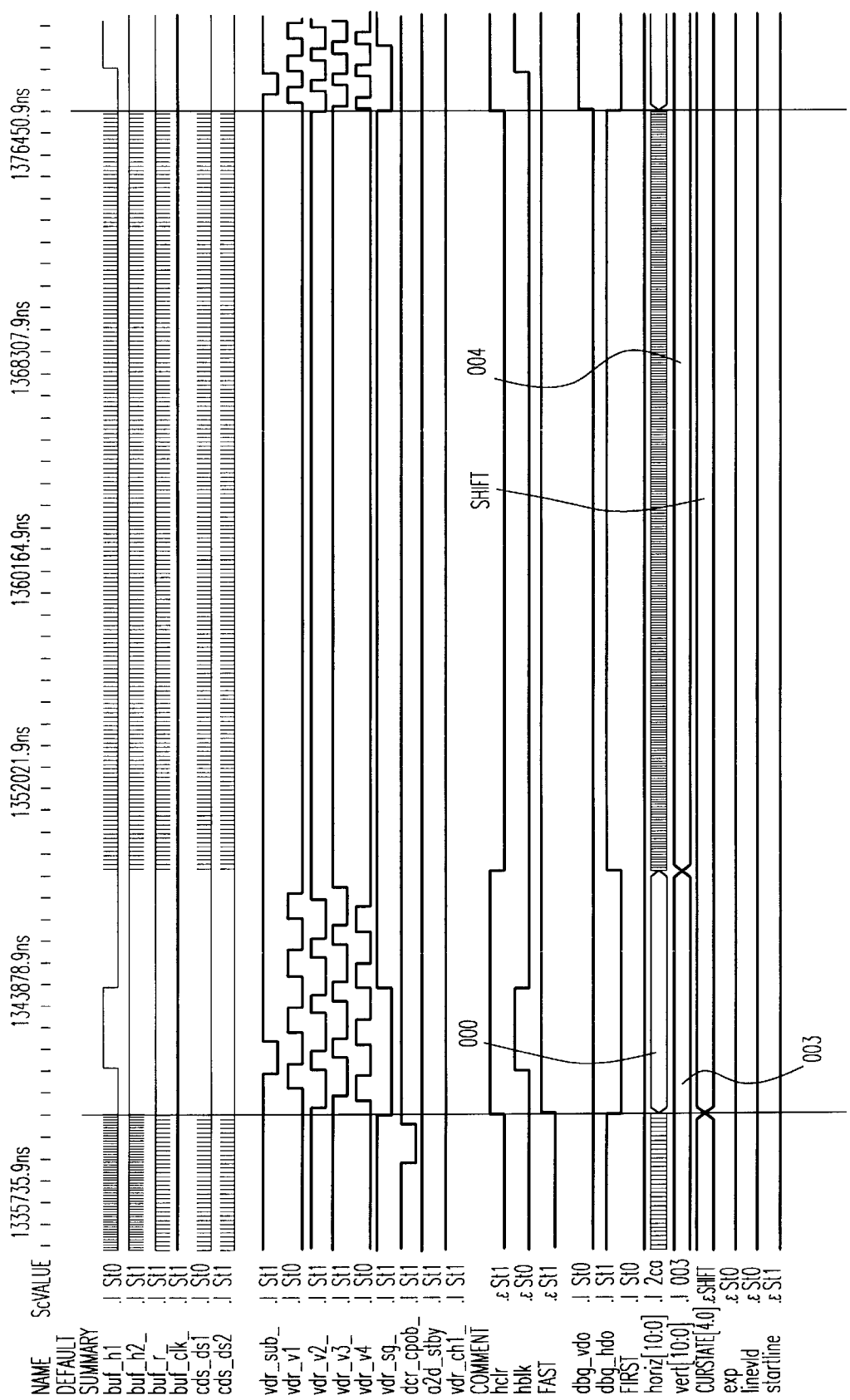

FIGS. 23a–23c illustrate the normal, fast and ntsc operating modes in detail. Similarly, FIGS. 23d–23e illustrate the normal horizontal pulses x1 and accelerated horizontal x2.

Referring to FIGS. 24a–24i, charts of scan lines s1a, s1b, s1c, p1, b2v, b4v, y2x1, y2x2 and y4x2 are shown. For these charts "pix" is the relative pixel interval. "DT" is the length in unit T of a particular segment, 1560T being normal for a complete scan line. "@T" refers to when a segment ends in units of T, while @ck refers to when a segment ends in terms of signal clock. This demonstrates how a shift in unit T between @T and @ck. The number of nanoseconds is indicated by "ns." The segment number is represented by "seg." "Line" indicates a valid scan line. Exposure is represented by "exp." For "fast" a 1 corresponds to horizontal clocking of type x2, while 0 corresponds to horizontal clocking of type x1. A valid frame is represented by "frame." "Stby" refers to the status of an analog/digital converter. "Ch1" is the transfer clock, and "sg" indicates the second shift register status. FIGS. 25a–25i are graphs of the signals scan lines s1a, s1b, s1c, p1, b2v, b4v, y2x1, y2x2 and y4x2 shown in FIGS. 24a–24i.

While the method of the present invention is demonstrated for two horizontal shift registers it can also be applied to a sensor having one horizontal shift register as can be seen by placing multiple scan lines in one horizontal shift register, as shown by scan lines b4v and y4x2. This requires that the integrated charge be reduced proportionally. This can be done for 3, 4, . . . etc. scan lines.

Having described several embodiments of the method of operating a charge coupled device in an accelerated mode in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A method of operating a charge coupled device in an accelerated mode comprising the steps of:

powering up said charge coupled device so that no charge exists in cells of said charge coupled device, by placing said charge coupled device in a reset mode, and keeping said charge coupled device in an idle mode to maintain said charge coupled device in said reset mode;

exposing said charge coupled device to light;

transferring integrated charge into vertical shift registers from photodiodes;

running said charge coupled device in a fast skipping mode so that a first portion of data received by said charge coupled device is shifted through at an accelerated rate;

operating said charge coupled device at a slower rate to shift a second portion of said data; and performing an abbreviated reset;

wherein multi-speed vertical or horizontal data shifting is accomplished within the readout of a single frame or field.

2. A method of operating a charge coupled device as recited in an accelerated mode as recited in claim 1, wherein said charge coupled device is employed in an optical symbology imager.

3. A method of operating a charge coupled device as recited in an accelerated mode as recited in claim 1, wherein said charge coupled device comprises two horizontal shift registers.

4. A method of operating a charge coupled device in an accelerated mode comprising the steps of:

maintaining said charge coupled device in an idle mode to maintain said charge coupled device in a reset mode;

running said charge coupled device in a fast skipping mode so that a first portion of data received by said charge coupled device is shifted through at an accelerated rate;

operating said charge coupled device at a slower rate to shift a second portion of said data; and performing an abbreviated reset.

5. A method of operating a charge coupled device comprising a plurality of pixels, in an accelerated mode comprising the steps of:

bypassing a first number of pixels produced in the charge coupled device by clocking at an accelerated speed;

analyzing a second number of pixels provided in the charge coupled device by clocking at a speed slower than said accelerated speed; and dumping the remainder of the pixels provided in the charge coupled device without reading said remainder of the pixels.

6. The method in accordance with claim 5 wherein said bypassing step is performed in a vertical direction.

7. The method in accordance with claim 6 wherein said bypassing step is performed in a horizontal direction.

8. The method in accordance with claim 5 wherein said bypassing step is performed in a horizontal direction.

9. A method of operating a charge coupled device in an accelerated mode comprising the steps of:

powering up said charge coupled device so that no charge exists in cells of said charge coupled device, by placing said charge coupled device in a reset mode, and keeping said charge coupled device in an idle mode to maintain said charge coupled device in said reset mode;

exposing said charge coupled device to light;

transferring integrated charge into vertical shift registers from photodiodes;

running said charge coupled device in a fast skipping mode so that a first portion of data received by said charge coupled device is shifted through at an accelerated rate;

operating said charge coupled device at a slower rate to shift a second portion of said data; and performing an abbreviated reset;

wherein said charge coupled device scans 501 lines of data in at most 5.5 milliseconds.

10. A method of operating a charge coupled device as recited in an accelerated mode as recited in claim 9, wherein said charged coupled device scans 501 lines, wherein said step of running said charge coupled device in a fast skipping mode so that a first portion of data received by said charge coupled device is shifted through at an accelerated rate is performed for approximately 240 lines.

11. A method of operating a charge coupled device as recited in an accelerated mode as recited in claim 10, wherein said step of running said charge coupled device in a fast skipping mode so that a first portion of data received by said charge coupled device is shifted through at an accelerated rate takes approximately 2.4 milliseconds.

12. A method of operating a charge coupled device as recited in an accelerated mode as recited in claim 9, wherein said charge coupled device scans 501 lines, wherein said step of operating said charge coupled device at a slower rate to shift a second portion of said data is performed for approximately 10 lines.

13. A method of operating a charge coupled device as recited in an accelerated mode as recited in claim 12, wherein said charged coupled device scans 501 lines, wherein said step of operating said charge coupled device at a slower rate to shift a second portion of said data for approximately 10 lines is performed in approximately 0.63 milliseconds.

14. A method of operating a charge coupled device as recited in an accelerated mode as recited in claim 9, wherein said charge coupled device scans 501 lines, wherein said step of performing an accelerated reset lasts approximately 243 lines.

15. A method of operating a charge coupled device as recited in an accelerated mode as recited in claim 14, wherein said step of performing an accelerated rest is performed in approximately 2.33 milliseconds.

16. A method of operating a charge coupled device as recited in an accelerated mode as recited in claim 9, wherein said charge coupled device scans 501 lines, wherein said step of running said charge coupled device in a fast skipping mode so that a first portion of data received by said charge coupled device is shifted through at an accelerated rate is performed for approximately 240 lines.

17. A method of operating a charge coupled device as recited in an accelerated mode as recited in claim 16, wherein said charge coupled device scans 501 lines, wherein said step of operating said charge coupled device at a slower rate to shift a second portion of said data is performed for approximately 10 lines.

18. A method of operating a charge coupled device as recited in an accelerated mode as recited in claim 17, wherein said charge coupled device scans 501 lines, wherein said step of performing accelerated reset lasts approximately 243 lines.

19. A method of operating a charge coupled device as recited in an accelerated mode as recited in claim 9, wherein said step of operating said charge coupled device at a slower rate to shift a second portion is performed for approximately 10 lines to perform focusing and illumination operations.

20. A method of operating a charge coupled device as recited in an accelerated mode as recited in claim 19, wherein said operation of said charge coupled device is performed for multiple optical positions in said optical symbology imager.

21. A method of operating a charge coupled device as recited in an accelerated mode as recited in claim 20, wherein said operation of said charge coupled device is performed for multiple illumina-tion conditions in said optical symbology imager.

* * * * *